(12) United States Patent
Ouchi et al.

(10) Patent No.: US 7,104,893 B2
(45) Date of Patent: Sep. 12, 2006

(54) WHEEL DRIVE UNIT

(75) Inventors: Hideo Ouchi, Kanagawa (JP); Takeo Ohkuma, Kanagawa (JP); Kiyoshi Okubo, Gunma (JP)

(73) Assignee: NSK Ltd., Tokyo (JP)

( * ) Notice: Subject to any disclaimer, the term of this patent is extended or adjusted under 35 U.S.C. 154(b) by 34 days.

(21) Appl. No.: 11/079,170

(22) Filed: Mar. 15, 2005

(65) Prior Publication Data
US 2005/0159227 A1 Jul. 21, 2005

Related U.S. Application Data

(62) Division of application No. 10/296,126, filed as application No. PCT/JP01/04375 on May 24, 2001, now abandoned.

(30) Foreign Application Priority Data

| May 31, 2000 | (JP) | .......................... P.2000-162573 |
| Jun. 2, 2000 | (JP) | .......................... P.2000-165872 |
| Jul. 28, 2000 | (JP) | .......................... P.2000-228946 |
| Aug. 25, 2000 | (JP) | .......................... P.2000-255173 |
| Aug. 29, 2000 | (JP) | .......................... P.2000-258537 |
| Nov. 2, 2000 | (JP) | .......................... P.2000-335642 |
| Jan. 17, 2001 | (JP) | .......................... P.2001-009249 |

(51) Int. Cl.
*F16D 3/223* (2006.01)

(52) U.S. Cl. ....................... 464/178; 464/906
(58) Field of Classification Search ................ 464/145, 464/178, 906; 384/544; 301/105.1; 403/359.4, 403/359.5, 359.6, DIG. 7
See application file for complete search history.

(56) References Cited

U.S. PATENT DOCUMENTS 2,038,554 A   4/1936   Edgar 3,527,120 A * 9/1970 Duer et al. .......... 403/359.5 X
4,175,404 A   11/1979 Schopf
4,881,842 A   11/1989 Farrell et al.
6,135,571 A   10/2000 Mizukoshi et al.
6,413,008 B1   7/2002 Van Dest et al.
6,634,951 B1  10/2003 Sahashi et al.
6,692,157 B1   2/2004 Sahashi et al.
6,851,865 B1 * 2/2005 Nomura et al. ............. 384/544

FOREIGN PATENT DOCUMENTS

| JP | 63-235029 A | 9/1988 |
| JP | 4-46233 | 4/1992 |
| JP | 6-234302 | 8/1994 |
| JP | 7-83242 | 3/1995 |
| JP | 2551702 Y2 | 6/1997 |
| JP | 10-264605 A | 10/1998 |
| JP | 2000-135903 | 5/2000 |
| WO | WO 99/27267 A1 | 6/1999 |

* cited by examiner

*Primary Examiner*—Greg Binda
(74) *Attorney, Agent, or Firm*—Sughrue Mion, PLLC

(57) ABSTRACT

A wheel-driving unit and a method for manufacturing the same. The circumferential-direction widths of teeth respectively constituting a male spline portion (47a) and a female spline portion (48a) are varied gradually in the respective axial directions of the male and female spline portions (47a), (48a). The directions where the widths of the teeth respectively constituting the male and female spline portions (47a), (48a) increase in the axial direction are set so as to differ from each other, whereby the spline teeth are engaged with each other in a wedge-like manner. A retaining ring (33b) is bridgingly interposed between the outer peripheral surface of the outer end portion of the spline shaft (17) and the inner peripheral surface of the near-to-outer-end portion of the spline hole (14) to thereby prevent the spline shaft (17) from slipping out of the spline hole (14).

1 Claim, 33 Drawing Sheets

WHEEL DRIVE UNIT

This is a divisional of U.S. application Ser. No. 10/296,126 filed Nov. 22, 2002, and now abandoned, which was the National Stage of International Application No. PCT/JP01/04375 filed May 24, 2001.

TECHNICAL FIELD

A wheel-driving unit according to the present invention is used not only to support drive wheels {the front wheels of an FF car (a front-engine front-wheel-drive car), the rear wheels of an FR car (a front-engine rear-wheel-drive car) and an RR car (a rear-engine rear-wheel-drive car), and all wheels of a 4WD car (a four-wheel-drive car)} supported on the independent suspension in such a manner that the drive wheels can be rotated with respect to the suspension, but also to drive or rotate these drive wheels. That is, in order not only to support the drive wheels on the independent suspension but also to drive and rotate these drive wheels, there is used a wheel-driving unit consisting of a combination of a wheel-driving bearing unit and a constant velocity joint unit structured such that a differential-side constant velocity joint and a wheel-side constant velocity joint are respectively connected to the both end portions of a drive shaft. The present invention relates to a wheel-driving unit of the above type.

BACKGROUND ART

To construct a wheel-driving unit of the above type and support the wheels on the suspension so as to be rotatable with respect to the suspension, there are used various bearing units in which outer and inner rings are rotatably combined together through rolling elements. Also, in the case of a wheel-driving bearing unit which is used not only to support drive wheels on the independent suspension but also to drive and rotate the drive wheels, it is necessary that it is combined with a constant velocity joint and, through this combination, it transmits the rotary motion of the drive shaft to these drive wheels smoothly (that is, while securing the constant velocity property of the rotary motion) regardless of not only the mutual shift between the differential gears and drive wheels but also the steering angles that are applied to the drive wheels. Now, FIG. 39 shows an ordinary wheel-driving bearing unit structured for the above purpose such that a wheel-supporting bearing unit 1 and a wheel-side constant velocity joint 2 are combined together.

The wheel-supporting bearing unit 1 is structured such that a hub 4 and an inner ring 5 are rotatably supported on the inside diameter side of an outer ring 3 through a plurality of rolling elements 6, 6. The outer ring 3 is connected and fixed to a knuckle 8 (see FIG. 40 which will be discussed later), which constitutes the suspension, through an outwardly-facing flange-shaped mounting portion 7 formed in the outer peripheral surface of the outer ring 3, while the outer ring 3 does not rotate even when it is in use. By the way, conventionally, there is also known a structure in which the outer peripheral surface of the outer ring 3 is formed as a simple cylindrical surface (which does not include the mounting portion 7) and is fitted with and fixed to the inner surface of a support hole formed in the knuckle 8. Also, in the inner peripheral surface of the outer ring 3, there are formed a double row of outer raceways 9, 9; and, the hub 4 and inner ring 5 are supported on the inside diameter side of the outer ring 3 in such a manner that they are concentric with the outer ring 3 and can be rotated.

In the case of the hub 4, on the portion thereof that is situated near to the outer (with respect to the axial direction thereof, when the wheel-supporting bearing unit 1 is incorporated into a car, the width-direction outer side of the car: and, this applies similarly in the whole of the present specification; that is, the left side of the respective figures except for FIGS. 4, 7, 10, 13, 25, 26, 28, 32, 37 and 38) end of the outer peripheral surface of the hub 4, there is disposed a flange 10 which is used to support wheels (drive wheels). Also, in the middle portion of the outer peripheral surface of the hub 4, there is formed a first inner raceway 11 and, similarly, the inner ring 5 having a second inner raceway 13 formed in the outer peripheral surface thereof is fitted with and fixed to the outer surface of a small-diameter stepped portion 12 formed in the portion that is near to the inner (with respect to the axial direction thereof, when the wheel-supporting bearing unit 1 is incorporated into a car, the width-direction central side of the car: and, this applies similarly in the whole of the present specification; that is, the right side of the respective figures except for FIGS. 4, 7, 10, 13, 25, 26, 28, 32, 37 and 38) end portion of the outer peripheral surface of the hub 4. And, in the central portion of the hub 4, there is formed a spline hole 14.

On the other hand, the wheel-side constant velocity joint 2 comprises an outer ring 15 for a constant velocity joint, an inner ring 16 for a constant velocity joint, and a spline shaft 17. The outer ring 15 for a constant velocity joint and spline shaft 17 form a drive member 18. That is, the spline shaft 17 is disposed on the outer end portion of the drive member 18 and can be engaged with the spline hole 14; and, the outer ring 15 for a constant velocity joint is disposed on the inner end portion of the drive member 18. In a plurality of portions in the circumferential direction of the inner peripheral surface of the outer ring 15 for a constant velocity joint, there are formed outside engaging grooves 19, 19 in such a manner that they respectively extend at right angles to the present circumferential direction. Also, in the case of the inner ring 16 for a constant velocity joint which forms the wheel-side constant velocity joint 2, in the central portion thereof, there is formed a second spline hole 20 and, in the portions of the outer peripheral surface thereof that correspond to the outside engaging grooves 19, 19, there are formed inside engaging grooves 21, 21 in such a manner that they respectively extend at right angles to the circumferential direction of the outer peripheral surface of the inner ring 16. Balls 22, 22 are interposed between the inside engaging grooves 21, 21 and outside engaging grooves 19, 19 and are held by a retainer 23 in such a manner that they are allowed to roll along these engaging grooves 21, 19. By the way, the shapes of the composing parts of the wheel-side constant velocity joint 2 are similar to those of a constant velocity joint of a Rzeppa type or a Birfield type and are not related to the gist of the invention and, therefore, the detailed description thereof is omitted here.

In the case of the above-mentioned wheel-side constant velocity joint 2 and the previously-mentioned wheel-supporting bearing unit 1, the spline shaft 17 is inserted into the spline hole 14 of the hub 4 from the inside to the outside with respect to the axial direction of the hub 4. And, a nut 25 is threadedly engaged with a male screw portion 24 formed in such portion of the outer end portion of the spline shaft 17 that projects from the outer end face of the hub 4 and, by fastening the nut 25 and male screw portion 24 further, they can be connected and fixed to each other. In this state, the inner end face of the inner ring 5 is contacted with the outer end face of the outer ring 15 for a constant velocity joint, thereby preventing the inner ring 5 from shifting in a direction where it can slip out of the small-diameter stepped portion 12. At the same time, a proper preload is applied to the respective rolling elements 6, 6.

Further, in a state where the present wheel-driving unit is assembled into the suspension of the car, a male spline portion 27 formed in the outer end portion of a drive shaft 26 is spline engaged into the second spline hole 20 formed in the central portion of the inner ring 16 for a constant velocity joint. And, a retaining ring 29, which is secured to a securing groove 28 formed so as to exist over the entire periphery of the outer peripheral surface of the outer end portion of the male spline portion 27, is engaged with a securing stepped portion 30 formed in the peripheral edge portion of the outer end of the second spline hole 20, thereby preventing the male spline portion 27 from slipping out of the second spline hole 20.

By the way, the inner end portion of the drive shaft 26 is connected to the output portion of a tripod-type constant velocity joint which is a differential-side constant velocity joint. And, the tripod-type constant velocity joint, the drive shaft 26 and the wheel-side constant velocity joint 2 cooperate together in forming the above-mentioned constant velocity joint unit. In a state before the present wheel-driving unit is assembled into the suspension of the car, the present constant velocity joint unit is combined with the wheel-supporting bearing unit 1 to thereby form the above-mentioned wheel-driving unit.

Also, in the specification of U.S. Pat. No. 4,881,842, there is disclosed such a wheel-driving bearing unit as shown in FIG. 40. In the second example of the conventional structure shown in FIG. 40 as well, a hub 4a is rotatably supported inside an outer ring 3 fixed to a knuckle 8 by a double row of rolling elements 6, 6. And, the spline shaft 17 of a drive member 18a is spline engaged into a spline hole 14 formed in the central portion of the hub 4a. In the outer end face of the spline shaft 17, there is formed a securing portion 31 for securing thereto a tool which is used to draw the spline shaft 17 into the spline hole 14. An incomplete-circular-ring-shaped retaining ring 33 is bridgingly interposed between a securing groove 32, which is formed in the near-to-leading-end portion of the outer peripheral surface of the spline shaft 17 and serves as an inside engaging portion, and a securing stepped portion 35 which is formed in such portion of the inner peripheral surface of the hub 4a that is opposed to the securing groove 32 and also which serves as an outside engaging portion, thereby preventing the spline shaft 17 from slipping out of the hub 4a. Also, in this state, an elastic ring 34 is elastically compressed between the hub 4a and an outer ring 15 for a constant velocity joint disposed on the drive member 18a.

Also, an inner ring 5 having a second inner raceway 13 formed in the outer peripheral surface thereof is fitted with the outer surface of the near-to-inner-end portion of the hub 4a and, at the same time, a retaining ring 37 is secured to a securing groove 36 formed over the entire periphery of the outer peripheral surface of such portion of the inner end portion of the hub 4a that projects inwardly in the axial direction beyond the inner end face of the inner ring 5. And, the retaining ring 37 holds the inner end face of the inner ring 5 to thereby prevent the inner ring 5 from shifting in the axial direction thereof.

According to the second example of the conventional structure disclosed in the above-cited U.S. Pat. No. 4,881,842, it is easy to connect together a wheel-supporting bearing unit 1a and a wheel-side constant velocity joint 2a. That is, in the case of the first example of the conventional structure shown in FIG. 39, to connect together the wheel-supporting bearing unit 1 and wheel-side constant velocity joint 2, there is necessary the troublesome operation in which the nut 25 is threadedly engaged with the male screw portion 24 formed in the leading end portion of the spline shaft 17 and they are then fastened further. In case where the operation to connect together the wheel-supporting bearing unit 1 and wheel-side constant velocity joint 2 is troublesome, the operation gives rise to an increase in the cost necessary for assembling of the wheel-driving bearing unit. Also, separate provision of the male screw portion 24 and nut 25 increases both size and weight of the wheel-driving bearing unit. On the other hand, in the case of the second example of the conventional structure, to connect together the wheel-supporting bearing unit 1a and wheel-side constant velocity joint 2a, the retaining ring 33 may only be interposed between the inner peripheral surface of the outer end portion of the hub 4a and the outer peripheral surface of the outer end portion of the spline shaft 17. For this reason, in the case of the second example of the conventional structure, the operation to connect together the wheel-supporting bearing unit 1a and wheel-side constant velocity joint 2a can be executed easily, which only can reduce the cost necessary for assembly of the structure but also can reduce the size and weight thereof.

Further, in JP-A-10-264605, there is disclosed such a wheel-driving bearing unit as shown in FIG. 41. In the case of a wheel-supporting rolling bearing unit 1b forming part of the present wheel-driving bearing unit, to the inner end portion of a hollow hub 4b, there is connected through an intermediate seat 38 an outer ring 15a for a constant velocity joint which corresponds to a drive member set forth in the appended claims thereof and forms a wheel-side constant velocity joint 2b. Of the two inner and outer peripheral surfaces of the intermediate seat 38 which is formed in a short-cylindrical shape, in the inner peripheral surface thereof, there is formed an inside-diameter-side female spline portion 39; and, in the outer peripheral surface thereof, there is formed an outside-diameter-side male spline portion 40 which corresponds to a first spline portion set forth in the appended claims of the present specification. The intermediate seat 38 is assembled to the inner end portion of the hub 4b by spline engaging an inside-diameter-side male spline portion 41 formed in the outer peripheral surface of the inner end portion of the hub 4b with the inside-diameter-side female spline portion 39 with no shaky motion between them. And, the inner end face of the intermediate seat 38 is held by a caulk portion 42 formed in the inner end portion of the hub 4b, thereby fixing the intermediate seat 38 to the inner end portion of the hub 4b with no shaky motion between them. By the way, in the above-cited JP-A-10-264605, there is also disclosed a structure in which the inner ring and intermediate seat are formed as an integral body. This structure is also the subject of the present invention.

On the other hand, with the outside-diameter-side male spline portion 40 formed in the outer peripheral surface of the intermediate seat 38, there is spline engaged an outside-diameter-side female spline portion 43 which is formed in the inner peripheral surface of the outer end portion of the outer ring 15a for a constant velocity joint and corresponds to a second spline portion set forth in the appended claims of the present specification. And, a retaining ring 33a is bridgingly interposed between the outside-diameter-side female spline portion 43 and outside-diameter-side male spline portion 40 that are mutually spline engaged, thereby preventing the outer ring 15a for a constant velocity joint and the intermediate seat 38 from being separated from each other. That is, the incomplete-circular-ring-shaped retaining ring 33a is bridgingly interposed between an inside securing groove 44, which is formed over the entire periphery of the outer peripheral surface of the intermediate seat 38 and corresponds to a first engaging portion set forth in the appended claims of the present specification, and an outside securing groove 45 formed over the entire periphery of the inner peripheral surface of the outer end portion of the outer ring 15a for a constant velocity joint and corresponding to a second engaging portion set forth in the appended claims of the present specification, thereby preventing the outer ring 15a for a constant velocity joint and the intermediate seat 38 from moving in the axial direction of the present wheel-driving bearing unit.

While the structure of the connecting portion between the hub 4b and the outer ring 15a for a constant velocity joint is as described above, the hub 4b is rotatably supported on the inside diameter side of the outer ring 3 by a double-row angular-type ball bearing. An inner ring 5 forming this ball bearing is held and fixed by and between the outer end face of the intermediate seat 38 and a stepped surface 46 existing in the outer end portion of a small-diameter stepped portion 12 formed in the outer peripheral surface of the middle portion of the hub 4b.

In the case of the above-structured wheel-driving bearing unit disclosed in the above-cited JP-A-10-264605, since the spline shaft 17 can be omitted from the second example of the conventional structure shown in FIG. 40, the cost and weight thereof can be reduced further by an amount corresponding to the omission of the spline shaft 17.

In all of the above-mentioned conventional structures, due to a slight clearance existing in the spline engaged portion for transmission of the rotary power, there is a possibility that there can be generated shaky motion in the circumferential direction thereof. Firstly, in the case of the first and second conventional structures shown respectively shown in FIGS. 39 and 40, there is a possibility that, in a neutral state (in a state where torque is not transmitted between the spline shaft 17 and hub 4, 4a), there can be generated a slight clearance between the side surfaces (which are opposed to each other in the circumferential direction) of the respective teeth of the spline engaged portion 49 composed of a male spline portion 47, which is formed in the outer peripheral surface of the spline shaft 17 and corresponds to a second spline portion set forth in the appended claims of the present specification, and a female spline portion 48 which is formed in the spline hole 14 formed in the central portion of the hub 4 and corresponds to a first spline portion as set forth in the appended claims of the present specification.

Between the spline shaft 17 and hub 4, 4a, there is transmitted torque through the spline engaged portion 49. However, as described above, in case where there is generated a slight clearance between the side surfaces of the respective teeth of the male and female spline portions 47, 48, in the speed increasing or reducing time of the car, the male and female spline portions 47, 48 are shifted with respect to each other in the circumferential direction, although slightly. And, because of this relative shift, the male and female spline portions 47, 48 can be collided with each other, which raises a possibility that there can be generated teeth striking sounds which are offensive to the ear of an occupant of the car or a pedestrian present in the periphery of the car. Such problem can be found also in the case of the third conventional structure shown in FIG. 41, that is, in the spline engaged portion 49a composed of the outside-diameter-side male spline portion 40 formed in the outer peripheral surface of the intermediate seat 38 and the outside-diameter-side female spline portion 43 formed in the inner peripheral surface of the outer end portion of the outer ring 15a for a constant velocity joint.

In view of the above, there has been made a proposal that, when enforcing the first conventional structure shown in FIG. 39, for example, each of the teeth of the male spline portion 47 may be inclined (for example, about 10 min.) with respect to the center axis of the spline shaft 17, that is, each tooth may be shaped so as to have such torsion angle. Also, in this case, the respective teeth of the female spline portion 48, which is to be spline engaged with the male spline portion 47, are formed so as to be parallel to the center axis of the spline shaft 17. By the way, the surface of the male spline portion 47 is hardened in the following manner: that is, the outer peripheral surface of the spline shaft 17 is rolled to thereby form a given shape having the above-mentioned torsion angle and, after then, it is high frequency quenched. On the other hand, in the case of the female spline portion 48, the inner peripheral surface of the spline hole 14 is broached to thereby form a given shape and, after then, it is left un-quenched.

In a state where, while the male and female spline portions 47, 48, which have been formed into the above-mentioned respective shapes, are spline engaged with each other, the wheel-supporting bearing until 1 and wheel-side constant velocity joint 2 are connected to each other, the side surfaces of the respective teeth of the male and female spline portions 47, 48 are pressed against each other in the axial-direction two end portions thereof, thereby being able to prevent generation of the above-mentioned teeth striking sounds in the running operation of the car. On the other hand, there can also be expected a structure in which the respective teeth of the male and female spline portions 47, 48 are formed parallel to the axial direction and the clearances between the teeth mutually adjoining in the circumferential direction are regulated to thereby cause the side surfaces of the respective teeth of the male and female spline portions 47, 48 to be strongly pressed against each other over the entire length thereof in the axial direction. In the case of this structure as well, generation of the teeth striking sounds can be prevented. However, in this structure, the shapes and dimension accuracy must be regulated very strictly, which unfavorably not only increases the cost of the structure but also requires an excessively large force (pressure insertion force) for pressure insertion of the spline shaft 17 into the spline hole 14. In this respect, in the case of the previously-described structure in which the male spline portion 47 is formed into a shape having a torsion angle to thereby prevent occurrence of the teeth striking sounds, since the side surfaces of the respective teeth of the male and female spline portions 47, 48 are pressed against each other only in the axial-direction two end portions thereof, the pressure insertion force can be reduced.

However, in case where, in order to prevent occurrence of the teeth striking sounds, the male spline portion 47 is formed into a shape having a torsion angle, the pressure insertion force can vary greatly due to the delicate variations of the torsion angle. For this reason, in case where the male spline portion 47 varies in shape, there is also a possibility that the pressure insertion force can increase up to an excessive value. Therefore, the shapes and dimension accuracy must be secured to a certain degree, which makes it difficult to reduce the cost of the structure sufficiently. By the way, according to the first conventional structure shown in FIG. 39, even in case where the pressure insertion force becomes excessively large in the above manner, by tightening the nut 25 with respect to the male screw portion 24 strongly, the nut 25 is able to generate an axial-direction force (axial force), thereby being able to obtain the pressure insertion force that is necessary. However, as in the second conventional structure shown in FIG. 40, in case where, in order to facilitate the assembling of the wheel-driving bearing unit, the connection between the wheel-supporting bearing unit 1a and wheel-side constant velocity joint 2a is carried out by the retaining ring 33, the retaining ring 33 is not allowed to generate the above axial force. In the case of the third conventional structure shown in FIG. 41 as well, there aries a substantially similar problem.

Also, in case where the male spline portion 47 is formed into a shape having a torsion angle, since the mutually associated teeth of the male and female spline portions 47, 48 are pressed against each other only in the axial-direction two end portions thereof, there is a possibility that the contact surface pressure acting on the side surfaces of these teeth can increase up to an excessively high value. And, in case where the contact surface pressure becomes excessively high, there is a possibility that the teeth can be worn or plastically deformed in a relatively early stage. For this reason, the sufficient durability of the male and female spline portions 47, 48 cannot be secured, which makes it difficult to prevent occurrence of the teeth striking sounds for a long period of time.

A wheel-driving unit and a method for manufacturing the same according to the invention are invented in view of the above-mentioned circumstances of the prior art.

DISCLOSURE OF THE INVENTION

Of a wheel-driving unit and a method for manufacturing the same according to a first aspect of the invention, similarly to a conventionally known wheel-driving unit, is composed of a wheel-supporting bearing unit and a constant velocity joint unit combined together through a retaining ring.

The wheel-supporting bearing unit comprises: an outer ring including a double row of outer raceways formed in the inner peripheral surface thereof and unrotatable even when it is in use; a hub including a flange formed in the near-to-outer-end portion of the outer peripheral surface thereof for supporting the wheels of a car, and a first inner raceway formed directly or through a separately produced inner ring in the middle portion of the outer peripheral surface thereof, with an inner ring having a second inner raceway formed in the outer peripheral surface thereof fitted with and fixed to the near-to-inner-end portion of the outer peripheral surface of the hub; rolling elements respectively interposed between one of the above-mentioned two outer raceways and the above-mentioned first inner raceway as well as between the other outer raceway and the above-mentioned second inner raceway respectively by twos or more; and, a first spline portion disposed in a portion of the hub or in a portion of the peripheral surface of a member connected and fixed to the hub.

Also, the constant velocity joint unit is composed of a combination of a differential-side constant velocity joint and a wheel-side constant velocity joint respectively connected to the both end portions of a drive shaft; and, the constant velocity joint unit further comprises a drive member including a second spline portion formed in the outer end portion thereof to be spline engaged with the first spline portion, while the inner end portion of the drive member is formed as an outer ring for a constant velocity joint which forms the wheel-side constant velocity joint.

Also, the retaining ring is formed such that it has an incomplete circular-ring-like shape as a whole and it can be enlarged and reduced in diameter. In a state where the first spline portion is spline engaged with the second spline portion, the retaining ring is bridgingly interposed between a first engaging portion disposed in a portion of the hub or in a portion of the peripheral surface of a member connected and fixed to the hub and a second engaging portion disposed in a portion of the peripheral surface of the outer end portion of the drive member to thereby prevent removal of the engagement between the first and second spline portions.

Especially, in the wheel-driving unit according to the invention, of a plurality of teeth forming at least one of the first and second spline portions, the circumferential-direction widths of at least part of the teeth are set to vary gradually in the axial direction thereof, so that, as the second spline portion is inserted into the first spline portion, the present teeth can bite into the groove portions of their mating spline portion.

Operation

According to the above-structured wheel-driving unit of the invention, not only the assembling operation can be facilitated but also generation of teeth striking sounds in the mutual spline engaged portion between the first and second spline portions can be prevented. That is, according to the invention, since a member including a first spline portion and a member including a second spline portion are connected together by a retaining ring, the assembling operation thereof can be facilitated. Further, in case where there is properly regulated the direction in which the circumferential-direction widths of the teeth of one or both of the first and second spline portions vary in the axial direction thereof, by shifting the first and second spline portions with respect to each other in the axial direction thereof with a relatively small force to thereby bring the first and second spline portions into spline engagement with each other, generation of the above-mentioned teeth striking sounds can be prevented. And, according to the invention, even in case where the teeth of the first and second spline portions vary a little in shape accuracy, only the mutual engagement depth of the teeth of the first and second spline portions is caused to change but the above-mentioned shifting force can be kept from increasing excessively, thereby being able to prevent occurrence of the teeth striking sounds.

Figure 1:
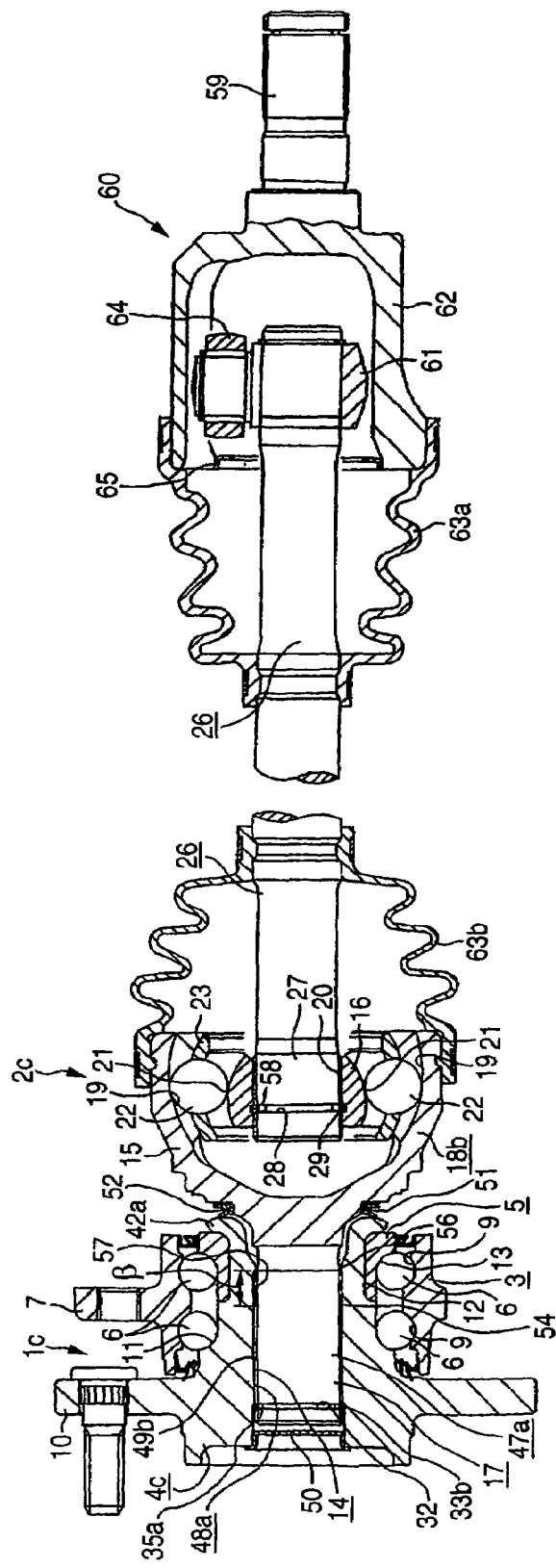
FIG. 1 is a section view of a first embodiment of a wheel-driving unit according to the invention.

By the way, in the drawings, reference character 1, 1a, 1b, 1c designates a wheel-supporting bearing unit, 2, 2a, 2b, 2c a wheel-side constant velocity joint, 3 an outer ring, 4, 4a, 4b, 4c a hub, 5 an inner ring, 6 a rolling element, 7 a mounting portion, 8 a knuckle, 9 an outer raceway, 10 a flange, 11 a first inner raceway, 12 a small-diameter stepped portion, 13 a second inner raceway, 14 a spline hole, 15, 15a an outer ring for a constant velocity joint, 16 an inner ring for a constant velocity joint, 17 a spline shaft, 18, 18a, 18b a drive member, 19 an outside engaging groove, 20 a second spline hole, 21 an inside engaging groove, 22 a ball, 23 a retainer, 24 a male screw portion, 25 a nut, 26 a drive shaft, 27 a male spline portion, 28 a securing groove, 29 a retaining ring, 30 a securing stepped portion, 31a securing portion, 32, 32a a securing groove, 33, 33a, 33b, 33c a retaining ring, 34 an elastic ring, 35, 35a, 35b, 35c, 35d a securing stepped portion, 36 a securing groove, 37 a retaining ring, 38 an intermediate seat, 39 an inside-diameter-side female spline portion, 40 an outside-diameter-side male spline portion, 41 an inside-diameter-side male spline portion, 42, 42a a caulk portion, 43 an outside-diameter-side female spline portion, 44 an inside securing groove, 45 an outside securing groove, 46 a stepped surface, 47, 47a, 47b a male spline portion, 48, 48a a female spline portion, 49, 49a, 49b a spline engaging portion, 50, 50a, 50b a cap, 51 a shoulder, 52 a seal ring, 53, 53a a male spline tooth, 54 a male-spline-side taper portion, 55 a groove portion, 56 an incomplete portion, 57 a female-spline-side taper portion, 58 a securing groove, 59 an output shaft portion, 60 a tripod-type constant velocity joint, 61a trunnion, 62a housing, 63a, 63b a boot, 64 a roller, 65 a stopper, 66 a securing groove, 67 an O ring, 68 a cylindrical portion, 69 a retaining ring, 70 a securing collar portion, 71 a chamfer, 72 a female spline tooth, 73 an incomplete portion, 74 an incomplete portion, 75 a groove portion, 76 a male-side gauge, 77, 77a a chuck, 78 a spline shaft portion for gauging, 79a positioning block portion, 80 a male spline shaft portion for gauging, 81 a base end face, 82, 82a an end face, 83 a reference cylindrical surface, 84 a reference cylindrical surface, 85 a seal ring, 86a, 86b a cylindrical surface, 87 a female-side gauge, 88 a female spline portion for gauging, 89 a base end face, 90 a reference cylindrical surface, 91a–91c a cylindrical surface, 92 a concave groove, 93 a flat surface, 94 an inclined surface, 95 a boss portion, 96 a spline hole, 97 a male spline portion, 98 a male spline portion, 99 a differential gear, 100 an output gear, 101 a spline hole, 102 a connecting shaft, 103 a blank material, 104 a taper shaft, 105 a pushing jig, 106 a die, 107 a working hole, 108 a blank hole, 109 a support jig, 110 a ram, 111 a punch, 112, 112a a retaining ring, 113 an inwardly projecting portion, 114 an outwardly projecting portion, 115 a bent portion, 116 a straight line portion, 117 an O ring, 118 a cylindrical surface portion, 119 a partition wall portion, 120 a recessed portion, 121, 121a, 121b an outside securing groove, 122 a cylindrical surface portion, 123, 123a an inside engaging groove, 124 a cylindrical portion, 125 an escape portion, 126 a flat surface, 127 an inner end face, 128 a recessed groove, 129 a diameter reducing jig, 130 a projecting piece, 131 a guide inclined surface, 132 a cylindrical-shaped base portion, 133 a recessed groove, 134 a discontinuous portion, 135, 135*a* a stepped portion, 136 a securing groove, 137 a retaining ring, 138 a securing groove, 139 a securing groove, 140 a retaining ring, and 141 a circular ring, respectively.

BEST MODE FOR CARRYING OUT THE INVENTION

Figure 39:
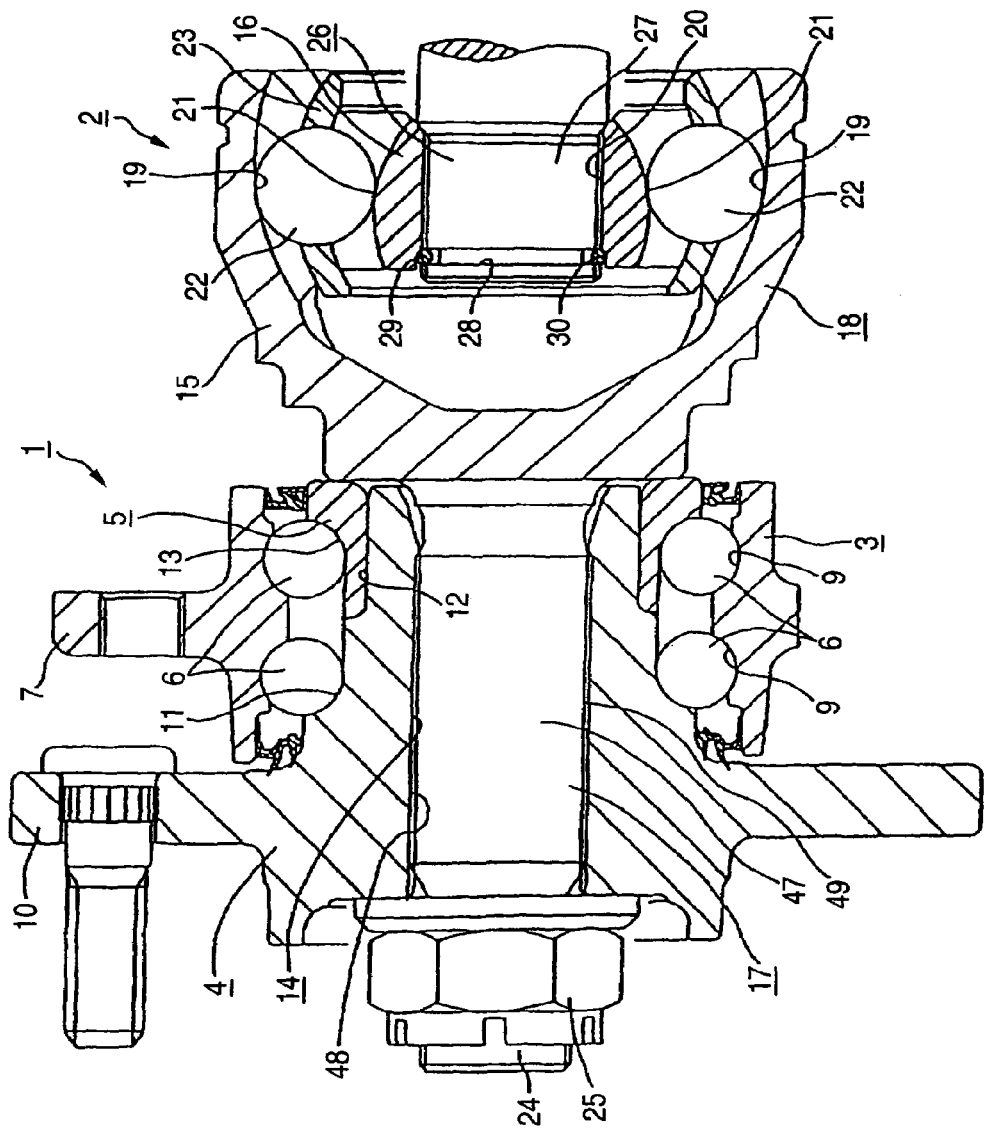
FIG. 39 is a section view of a first example of a conventional structure.

Now, FIGS. 1 to 5 shows a first embodiment of a wheel-driving unit according to the first aspect of the invention. By the way, the invention is characterized in that, in order not only to facilitate the connecting operation of a wheel-supporting bearing unit 1*c* and a wheel-side constant velocity joint 2*c* but also to prevent teeth striking sounds from being generated in a spline engaged portion 49*b* between a spline shaft 17 and a spline hole 14, the mutually connecting portion between a hub 4*c* and spline shaft 17 as well as the spline engaged portion 49*b* are respectively improved in structure. The arrangements and operations of the remaining portions of the invention are almost similar to those of the first and second conventional structures previously shown in FIGS. 39 and 40. Therefore, the equivalent portions of the invention are given the same designations and thus the duplicate description thereof is omitted or simplified here. Accordingly, description will be given below mainly of the characteristic portions of the invention as well as the portions thereof that are different from the above-described conventional structures.

In the case of the present embodiment, an inner ring 5 including a second inner raceway 13 formed in the outer peripheral surface thereof is fitted with the outer surface of a small-diameter stepped portion 12 formed in the near-to-inner-end portion of the hub 4*c* which constitutes the wheel-supporting bearing unit 1*c*. And, in order to prevent the inner ring 5 from slipping out of the small-diameter stepped portion 12, there is formed a caulk portion 42*a* in the inner end portion of the hub 4*c*. That is, after the inner ring 5 is fitted with the outer surface of the small-diameter stepped portion 12, such portion of the inner end portion of the hub 4*c* that projects from the inner end face of the inner ring 5 is plastically deformed outwardly in the diameter direction of the hub 4*c* to thereby form the caulk portion 42*a*, so that the caulk portion 42*a* can be used to hold the inner end face of the inner ring 5.

Also, a securing groove 32, which corresponds to a second engaging portion as set forth in the claims that are appended to the present specification, is formed so as to extend over the entire periphery of the outer peripheral surface of the outer end portion of the spline shaft 17 which constitutes a drive member 18*b*. In a state where the spline shaft 17 is inserted into the spline hole 14 formed in the central portion of the hub 4*c*, the outside-diameter-side half section of a retaining ring 33*b*, the inside-diameter-side half section of which is secured to the securing groove 32, is engaged with a securing stepped portion 35*a* which is formed in the near-to-outer-end portion of the inner peripheral surface of the hub 4*c* and corresponds to a first engaging portion set forth in the appended claims of the present specification, thereby preventing the spline shaft 17 from slipping out of the spline hole 14. By the way, in the case of such portion of the central hole of the hub 4*c* that is situated nearer to the outer end opening of the hub central hole than the securing stepped portion 35*a*, there is not formed a female spline portion 48*a* but such central hole portion is formed as a simple cylindrical surface.

Here, the retaining ring 33*b* is previously mounted onto the securing groove 32 before the spline shaft 17 is inserted into the spline hole 14. When inserting the spline shaft 17 into the spline hole 14, the retaining ring 33*b*, while reducing the diameter thereof elastically, passes through the spline hole 14. And, in a state where the retaining ring 33*b* is matched in position to the securing stepped portion 35*a*, the diameter of the retaining ring 33*b* is elastically restored to its original size; and, after then, the retaining ring 33*b* is bridgingly interposed between the securing stepped portion 35*a* and securing groove 32.

Also, the outer-end-side opening of the central hole of the hub 4*c* is closed with a cap 50. On the other hand, a seal ring 52 is fitted with the outside of the outer peripheral surface of a shoulder portion 51 formed in the base end portion of an outer ring 15 for a constant velocity joint which constitutes the drive member 18*b*. And, the seal ring 52 is elastically compressed between the inner surface of the caulk portion 42*a* and the outer end face of the outer ring 15 for a constant velocity joint, thereby closing a clearance existing between the caulk portion 42*a* and the outer end face of the outer ring 15 for a constant velocity joint. In the present embodiment, the cap 50 and seal ring 52 prevent foreign substances such as rainwater from getting into the spline engaged portion 49*b* between a male spline portion 47*a* formed in the outer peripheral surface of the spline shaft 17 and a female spline portion 48*a* formed in the inner peripheral surface of the spline hole 14, thereby being able to keep the spline engaged portion 49*b* from rusting.

Figure 2:
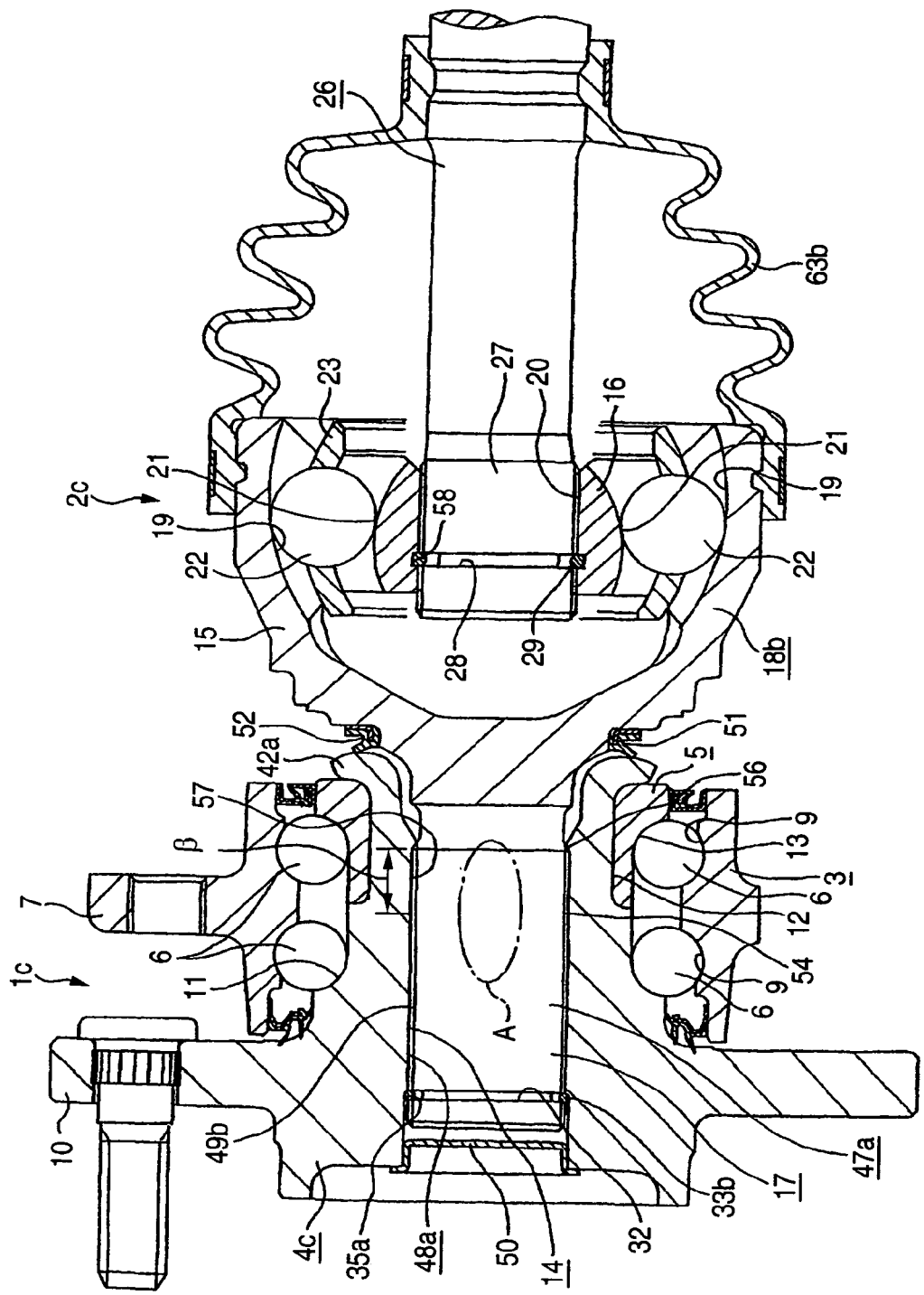
FIG. 2 is an enlarged view of the left section of FIG. 1.
Figure 3:
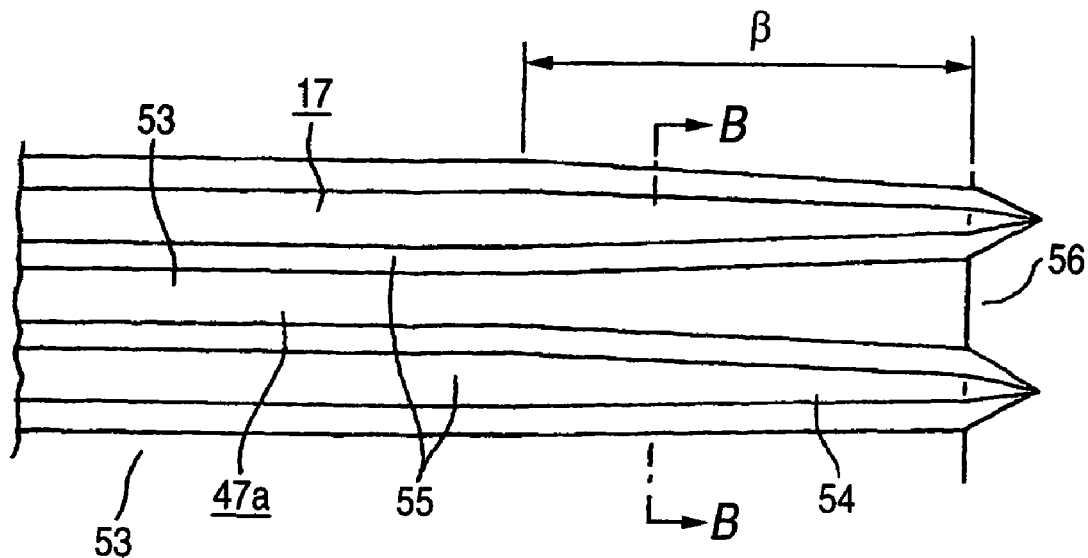
FIG. 3 is an enlarged view of the A portion of FIG. 2, showing the details of a male spline portion.
Figure 4:
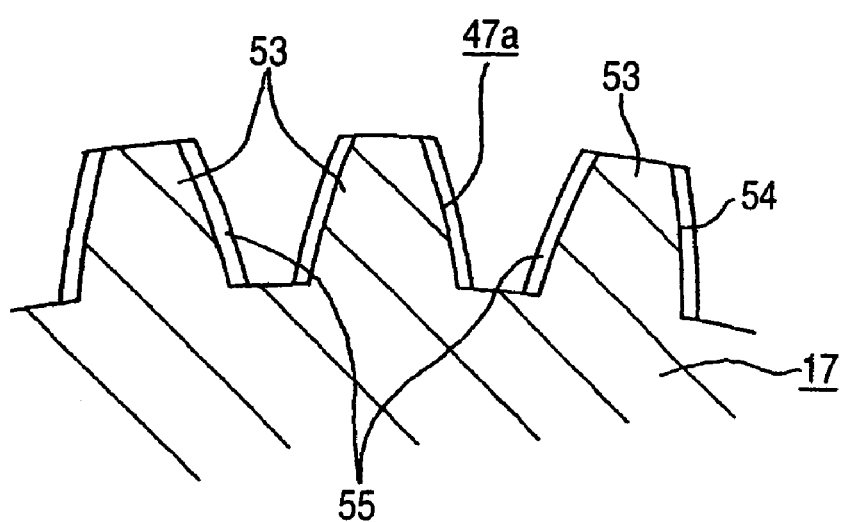
FIG. 4 is a section view taken along the line B—B shown in FIG. 3.
Figure 5:
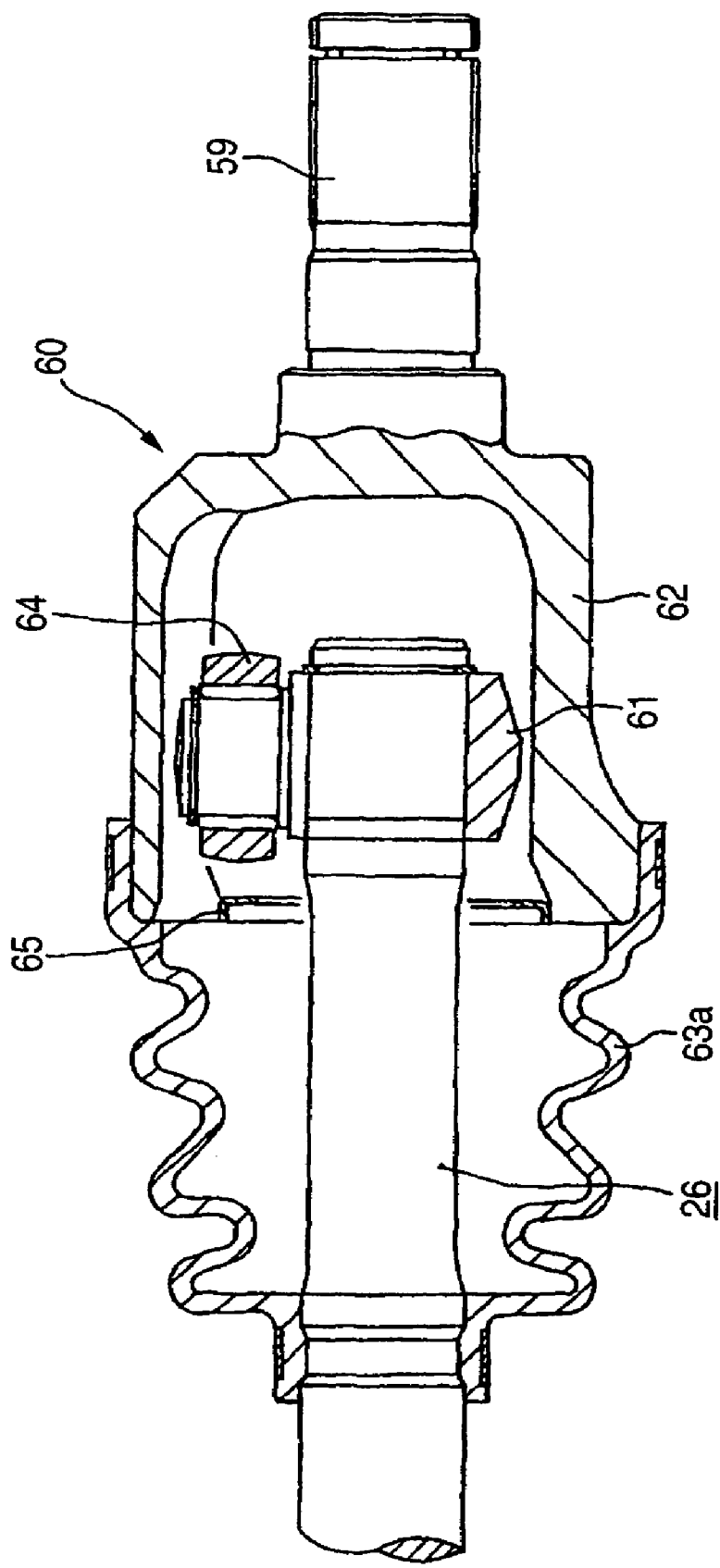
FIG. 5 is an enlarged view of the right section of FIG. 1.

Further, in the case of the wheel-driving bearing unit which constitutes the wheel-driving unit according to the present embodiment, the near-to-inner-end portion of a male spline portion 47*a* which is formed in the outer peripheral surface of the spline shaft 17 and corresponds to a second spline portion set forth in the appended claims of the present specification, that is, the β portion, the range of which is shown by the arrow mark in FIGS. 1 to 3, is formed as a male-spline-side taper portion 54 in which the circumferential-direction widths of the respective spline teeth 53, 53 (FIGS. 3 and 4) are set to vary gradually in such a manner that the widths increase as they go backwardly in the insertion direction of the spline shaft 17, that is, inwardly in the axial direction. Therefore, the circumferential-direction widths of groove portions 55, 55 (FIGS. 3 and 4) existing between the male spline teeth 53, 53 adjoining each other in the circumferential direction, in the male-spline-side taper portion 54, decrease gradually as they go toward the inner end side of the spline shaft, that is, toward the backward side of the insertion direction of the spline shaft. In view of this, the circumferential-direction both-side surfaces of the male spline teeth 53, 53 existing in the male-spline-side taper portion 54 are respectively inclined in the opposite directions by the same angle with respect to the axial direction. By the way, the angle at which the both-side surfaces of the male spline teeth 53, 53 are inclined with respect to the axial direction (the inclination angle) is set of the order of 0.5–2°. Here, the inclination angle is an angle formed by a virtual straight line parallel to the center axis and the one-side surfaces of the respective spline teeth. That is, this inclination angle is defined as a half value of an angle (taper angle) formed between the both-side surfaces of the respective spline teeth.

On the other hand, in such portion of the middle portion or outer half section of the male spline portion 47*a* that is shifted more outwardly in the axial direction than the male-spline-side taper portion 54, the both-side surfaces of the male spline teeth 53, 53 are arranged parallel to the axial direction, while the widths of the male spline teeth 53, 53 and groove portions 55, 55 are set so as not to vary over the entire length of the above-mentioned middle portion or outer half section. By the way, such portion of the axial-direction inner end portion of the male spline portion 47a that is shifted more inwardly in the axial direction than the male-spline-side taper portion 54 are formed as incomplete portion 56 (FIGS. 1 to 3) in which the diameter-direction heights of the respective male spline teeth 53, 53 decrease gradually as they go inwardly in the axial direction. In FIG. 3, in the incomplete portion 56, the widths of the male spline teeth 53, 53 seem to increase suddenly. This is because, in the incomplete portion 56, the diameter-direction heights of the respective male spline teeth 53, 53 each having an almost trapezoidal-shaped section decrease suddenly as they go toward the inner ends in the axial direction. As can be seen from this as well, in the present specification, the expression that the circumferential-direction widths of the male spline teeth 53, 53 vary means that, in the portions where the diameter-direction heights are the same (for example, in the addenda), the widths of the male spline teeth 53, 53 vary.

On the other hand, the near-to-inner-end portion of a female spline portion 48a which is formed in the inner peripheral surface of the spline hole 14 and corresponds to a first spline portion set forth in the appended claims of the present specification, that is, the β portion, the range of which is shown by the arrow mark in FIGS. 1 and 2, is formed as a female-spline-side taper portion 57 in which the circumferential-direction widths of the respective teeth constituting the female spline portion 48a are set to vary gradually in such a manner that the widths decrease as they go backwardly in the insertion direction of the spline shaft 17, that is, inwardly in the axial direction. Therefore, the widths of groove portions existing between the teeth adjoining each other in the circumferential direction, in the female-spline-side taper portion 57, increase gradually as they go toward the inner end side of the spline hole 14, that is, toward the forward side of the insertion direction of the spline shaft. In this manner, the female-spline-side taper portion 57 and male-spline-side taper portion 54 are different from each other in the direction where the circumferential-direction widths of the teeth of the taper portions 54, 57 of the respective spline portions 47a, 48a increase in the axial direction. Also, in such portion of the middle portion or outer half section of the female spline portion 48a that is shifted more outwardly in the axial direction than the female-spline-side taper portion 57, the both-side surfaces of the respective teeth are arranged parallel to the axial direction to thereby prevent the widths of the respective teeth and groove portions from varying over the entire length of the above-mentioned middle portion or outer half section. Further, the circumferential-direction both-side surfaces of the respective teeth of the female-spline-side taper portion 57 are inclined with respect to the axial direction by the same angle as in the case of the male-spline-side taper portion 54.

By the way, to form the above-structured female-spline-side taper portion 57, for example, in the inner peripheral surface of the spline hole 14, there are previously formed a plurality of teeth the widths of which do not vary over the entire axial-direction length thereof and, after then, a punch including a plurality of projecting-strip portions the axial-direction widths of which gradually vary is pushed into the outer peripheral surface of the spline hole 14 from the inner end side of the spline hole 14. On the other hand, the male-spline-side taper portion 54 is formed by rolling at the same time when the shapes of the remaining portions of the male spline portion 47a are formed. Also, the axial-direction lengths of the respective male-spline-side and female-spline-side taper portions 54, 57 are set in the range of 5–15 mm.

When connecting together the wheel-supporting bearing unit 1c and constant velocity joint 2c, the spline shaft 17 is inserted into the spline hole 14 while the male spline portion 47a and male spline portion 48a are spline engaged with each other. And, the male-spline-side taper portion 54 and the female-spline-side taper portion 57 of the female spline portion 48a are regulated in shape and dimension in the following manner: that is, in a state where the spline shaft 17 is inserted by a given length and the retaining ring 33b secured to the securing groove 32 of the outer peripheral surface of the outer end portion of the spline shaft 17 is engaged with the securing stepped portion 35a formed in the inner peripheral surface of the outer end portion of the hub 4c, the two taper portions 54, 57 can be fitted with each other with an interference between them.

Further, according to the present embodiment, in a state where the wheel-driving bearing unit is assembled to a car, to the spline shaft 17, there is always applied an axial force going in a direction to push the spline shaft 17 into the spline hole 14. That is, in the case of the above-mentioned wheel-driving bearing unit, not only the outer end portion of a drive shaft 26 is spline engaged with the inside of an inner ring 16 for a constant velocity joint but also a retaining ring 29 is engaged between a securing groove 28 formed over the entire periphery of the outer peripheral surface of the outer end portion of the drive shaft 26 and a securing groove 58 formed over the entire periphery of the inner peripheral surface of the inner ring 16 for a constant velocity joint, whereby the present wheel-driving bearing unit is assembled to the car. The inner end portion of the drive shaft 26 is connected to the central portion of a trunnion 61 (FIGS. 1 and 5) constituting a tripod-type constant velocity joint 60 which is disposed on the output shaft portion 59 of a differential gear (not shown) and corresponds to such a differential-side constant velocity joint as set forth in the appended claims of the present specification. Also, between the outer peripheral surface of the middle portion of the drive shaft 26 and the outer peripheral surface of the outer end portion of a housing 62 constituting the tripod-type constant velocity joint 60 and the outer peripheral surface of the inner end portion of the outer ring 15 for a constant velocity joint, there are respectively fixed a pair of boots 63a, 63b which are used to prevent grease against leakage. Each of the boots 63a, 63b is structured such that the middle portion thereof has bellows-like shape and the boot is formed in a cylindrical shape as a whole. By the way, the basic structure of the tripod-type constant velocity joint 60 is similar to a structure which is conventionally known and does not relate to the gist of the invention; and, therefore, the detailed description thereof is omitted here.

Especially, in the present embodiment, of the pair of boots 63a, 63b, one boot 63a, which is disposed on the tripod-type constant velocity joint 60 side, is made of synthetic resin, so that the rigidity of one boot 63a can be made relatively high. On the other hand, of the pair of boots 63a, 63b, the other boot 63b, which is disposed on the outer ring 15 for a constant velocity joint side, similarly to a structure which is conventionally generally used, is made of rubber. Therefore, the other boot 63b is relatively low in rigidity. And, in a state where the inner ring 16 for a constant velocity joint is connected and fixed to the outer end portion of the drive shaft 26 and the wheel-driving bearing unit is assembled to the car, the above-mentioned one boot 63a is mounted between the housing 62 and drive shaft 26 in such a manner that it is compressed slightly elastically. And, in this state, to the drive shaft 26, there is applied an elastic force of the order of several-10N in a direction to part away from the housing 62 (in FIGS. 1 and 5, in the left direction) by one boot 63*a*. Therefore, in a state where the wheel-driving bearing unit according to the present embodiment is assembled to the car, to the spline shaft 17, there is always applied an axial force in a direction (in FIGS. 1 and 2, in the left direction) to push the spline shaft 17 into the spline hole 14.

By the way, also before the wheel-driving bearing unit is assembled to the car, to the drive shaft 26, there is applied by one boot 63*a* an elastic force in a direction to part it away from the housing 62. Because of this, a plurality of rollers 64, which are supported on the trunnion 61 connected to the inner end portion of the drive shaft 26, tend to slip outwardly from the outer end opening of the housing 62. In view of this, according to the present embodiment, a stopper 65, which is formed in a circular ring shape as a whole having an L-shaped section and is made of a metal plate, is fitted with and fixed to the inner surface of the outer end opening of the housing 62. And, when the tripod-type constant velocity joint 60 is in transport, the stopper 65 prevents the plurality of rollers 64 from slipping unexpectedly out of the outer end opening of the housing 62.

In a state where, to the spline shaft 17, there is applied a given axial force in a direction to push the spline shaft 17 into the spline hole 14 in the above-mentioned manner, the male and female spline-side taper portions 54, 57 are fitted with each other with a given interference between them. In other words, these two taper portions 54, 57 are engaged with each other in a wedge-like manner. And, the side surfaces (which are opposed to each other in the circumferential direction) of the male spline teeth 53, 53 and female spline teeth of the male and female spline-side taper portions 54, 57 are contacted with each other almost uniformly over the entire axial-direction lengths of these taper portions 54, 57. Also, in this state, the male spline teeth 53, 53 of such portion of the middle portion or outer half section of the male spline portion 47*a* that is shifted more outwardly in the axial direction than the male-spline-side taper portion 54 are spline engaged with the female spline teeth of such portion of the middle portion or outer half portion of the female spline portion 48*a* that is shifted more outwardly in the axial direction than the female-spline-side taper portion 57. By the way, in the case of the present embodiment, the male and female spline portions 47*a*, 48*a* are regulated in shape and dimension accuracy in the following manner: that is, of the male and female spline portions 47*a*, 48*a*, between the side surfaces, which are opposed to each other in the circumferential direction, of the male spline teeth 53, 53 and female spline teeth in such portions that are shifted more outwardly in the axial direction than the male-spline-side taper portion 54 and female-spline-side taper portion 57, there exists a minute clearance equal to or less than 100 μm or there exists no clearance at all.

Figure 40:
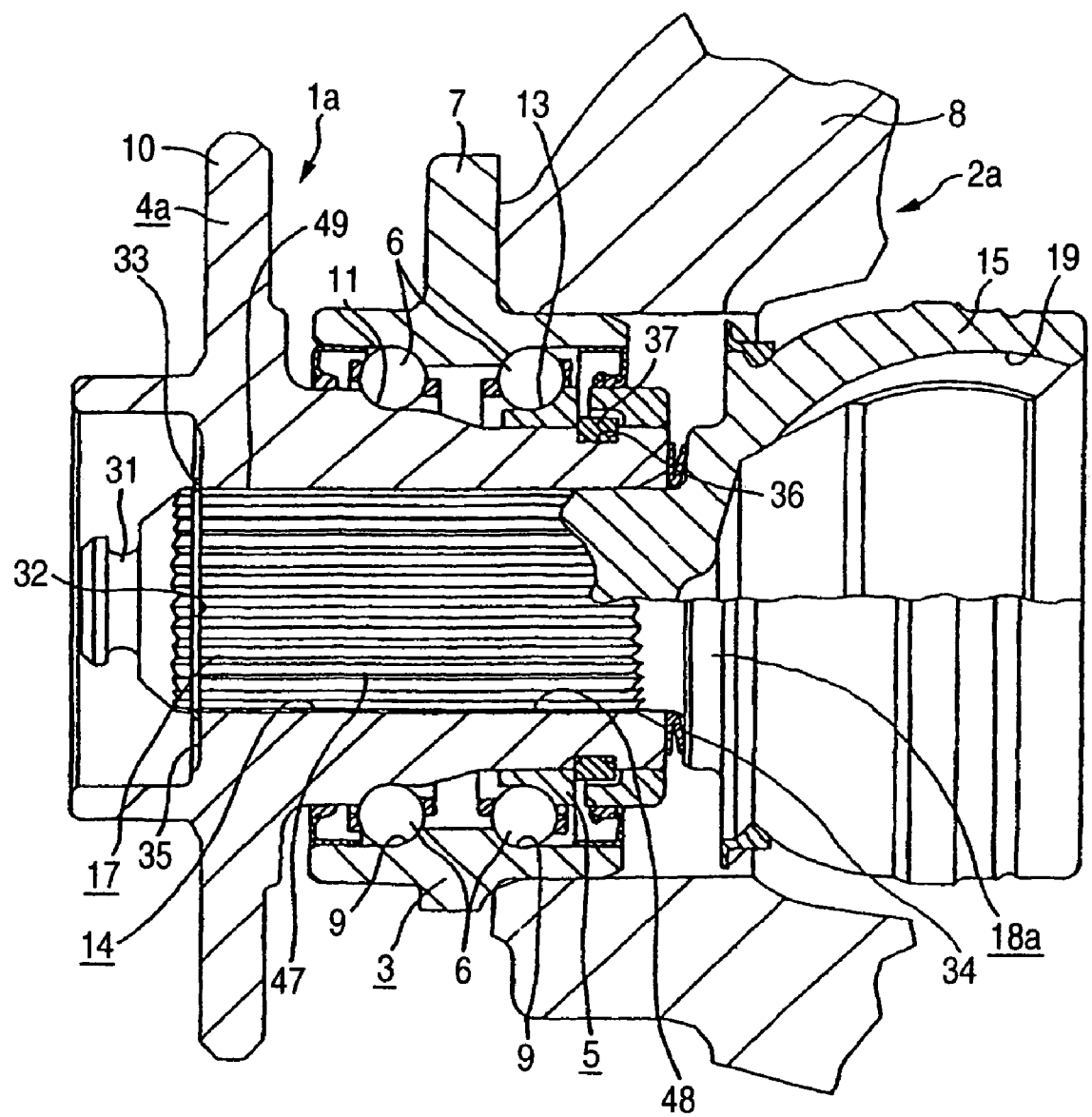
FIG. 40 is a partially omitted section view of a second example of the conventional structure; and, FIG. 41 is a section view of a third example of the conventional structure.

According to the above-structured wheel-driving bearing unit which constitutes the wheel-driving unit of the invention, since connection between the wheel-supporting bearing unit 1*c* and wheel-side constant velocity joint 2*c* is carried out by the retaining ring 33*b*, similarly to the second example of the conventional structure previously shown in FIG. 40, the assembling operation can be facilitated. Further, according to the present embodiment, it is possible to prevent occurrence of teeth striking sounds in the spline engaged portion 49*b* which is composed of the male spline portion 47*a* formed in the outer peripheral surface of the spline shaft 17 and the female spline portion 48*a* formed in the inner peripheral surface of the spline hole 14. That is, in the case of the invention, the circumferential-direction widths of the male spline teeth 53, 53 and female spline teeth of the male and female spline-side taper portions 54, 57 respectively disposed in the male spline portion 47*a* and female spline portion 48*a* are set to vary in such a manner that they increase gradually in the mutually different directions with respect to the axial direction of the wheel-driving bearing unit. Therefore, as in the present embodiment, simply by applying such small axial force of the order of scores of N to the spline shaft 17 that goes in a direction to push the spline shaft 17 into the spline hole 14, the male and female spline-side taper portions 54, 57 can be fitted with each other with a sufficient interference between them, thereby being able to prevent occurrence of the above-mentioned teeth striking sounds while the car is running.

Also, according to the invention, even in case where the male spline teeth 53, 53 and female spline teeth of the male and female spline-side taper portions 54, 57 vary a little in shape accuracy, only the degree of insertion of the spline shaft 17 into the spline hole 14 can be changed and, therefore, without increasing the force necessary to push the spline shaft 17 into the spline hole 14, the male and female spline-side taper portions 54, 57 can be fitted with each other with a sufficient interference between them. As a result of this, according to the invention, not only the cost necessary for assembly can be reduced but also, regardless of existence of variations in the shape accuracy of the male spline portion 47*a* and female spline portion 48*a*, occurrence of the teeth striking sounds can be prevented.

Further, in the case of the present embodiment, the boot 63*a* disposed on the tripod-type constant velocity joint 60 side is able to apply continuously to the spline shaft 17 an axial force going in a direction to push the spline shaft 17 into the spline hole 14. Thanks to this, even in case where the male spline teeth 53, 53 and female spline teeth of the male and female spline-side taper portions 54, 57 are worn through use for a long period of time, the male and female spline-side taper portions 54, 57 can be fitted with each other with a sufficient interference between them, thereby being able to prevent occurrence of the above-mentioned teeth striking sounds for a long period of time.

Also, in a neutral state where torque is not transmitted between the spline shaft 17 and spline hole 14, even in case where there exists a minute clearance between the side surfaces (which are opposed to each other in the circumferential direction) of the male spline teeth 53, 53 and female spline teeth in such portions of the middle portions or outer half portions of the male and female spline portions 47*a*, 48*a* that are shifted more outwardly in the axial direction than the male-spline-side taper portion 54 and female-spline-side taper portion 57, when torque is in transmission, the male spline teeth 53, 53 and female spline teeth of the male-spline-side taper portion 54 and female-spline-side taper portion 57 are elastically deformed. And, the side surfaces of the male spline teeth 53, 53 and female spline teeth in the middle portions or outer half sections of the male and female spline portions 47*a*, 48*a* are in part contacted with each other and, in such contacted portions, torque is in part transmitted. This can eliminate a fear that excessively large torque can be applied to the two taper portions 54, 57.

By the way, in the case of the present embodiment, in part of the male and female spline portions 47*a*, 48*a*, there are formed the male-spline-side taper portion 54 and female-spline-side taper portion 57 in which the widths of the male spline teeth 53, 53 and female spline teeth vary gradually in the axial direction of the wheel-driving bearing unit. However, the male and female spline-side taper portions 54, 57 can also be formed only in one of the male and female spline portions 47a, 48a. What is important is that, as the spline shaft 17 is inserted into the spline hole 14, at least part of the male and female spline portions 47a, 48a can be fitted with each other with an interference between them. However, in case where, in part of the male and female spline portions 47a, 48a, there are formed a male-spline-side taper portion 54 and a female-spline-side taper portion 57 in which the widths of the male spline teeth 53, 53 and female spline teeth increase in mutually different directions with respect to the axial direction of the wheel-driving bearing unit, the side surfaces of the male spline teeth 53, 53 and female spline teeth of the male and female spline-side taper portions 54, 57 can be contacted with each other almost uniformly, thereby being able to reduce the contact surface pressure that is applied to the male spline teeth 53, 53 and female spline teeth. Therefore, in the case of the present embodiment, it is possible to secure the sufficient durability of the male spline teeth 53, 53 and female spline teeth of the male and female spline-side taper portions 54, 57.

Figure 6:
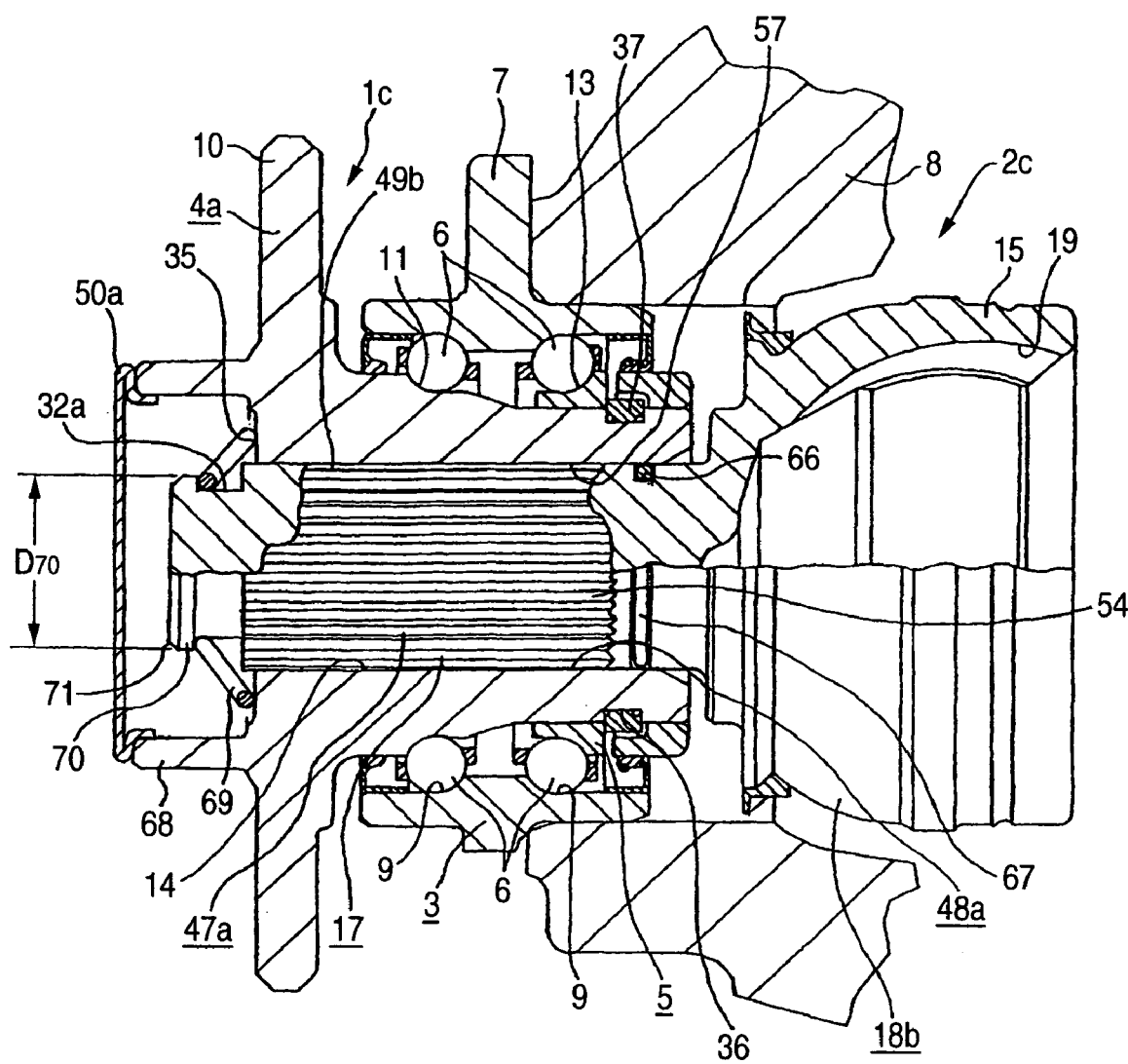
FIG. 6 is a partially omitted section view of a second embodiment of a wheel-driving unit according to the invention.
Figure 7:
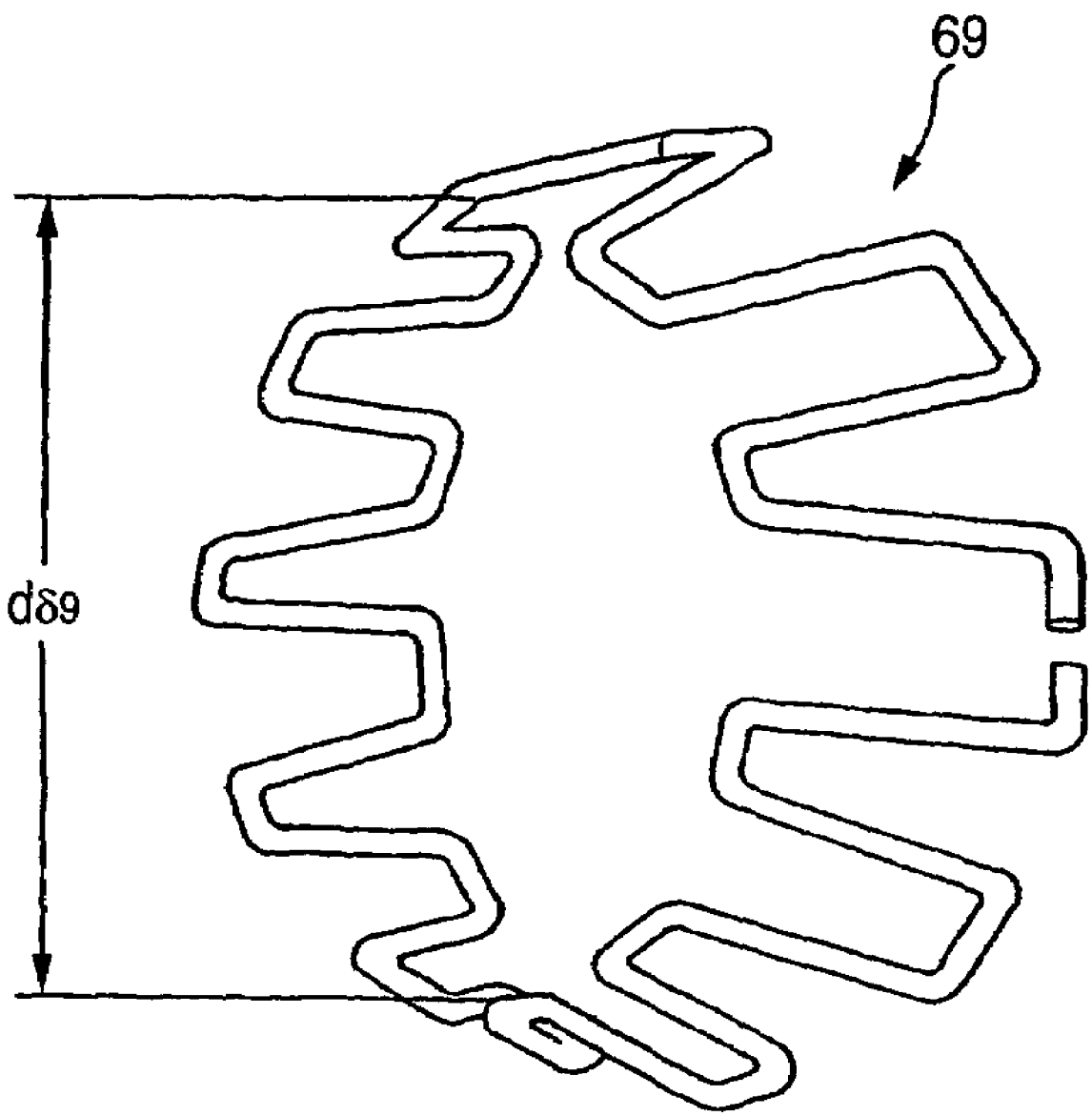
FIG. 7 is a perspective view of a retaining ring used in the second embodiment.
Figure 8:
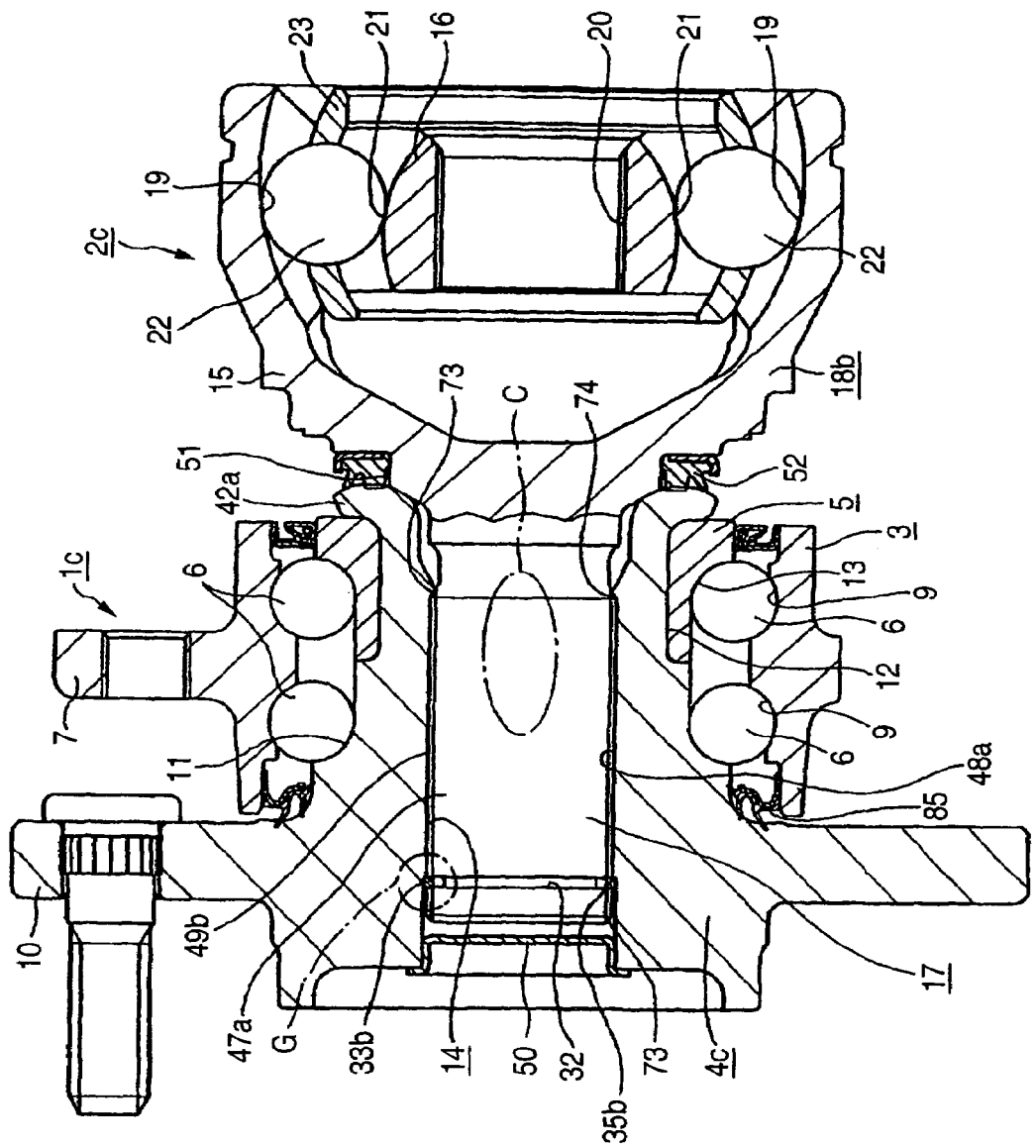
FIG. 8 is a section view of a third embodiment of a wheel-driving unit according to the invention.

Next, FIGS. 6 and 7 show a second embodiment of a wheel-driving unit according to the first aspect of the invention. In the case of the second embodiment, in a male spline portion 47a formed in the outer peripheral surface of a spline shaft 17, there is formed a male-spline-side taper portion 54 in which the widths of the male spline teeth (which are formed over the entire axial-direction length of the taper portion 54) of the taper portion 54 with respect to the circumferential direction thereof vary gradually in such direction that they increase as they go inwardly in the axial direction of the spline shaft 17, that is, backwardly in the insertion direction of the spline shaft 17. Also, in a female spline portion 48a formed in the inner peripheral surface of a spline hole 14, there is formed a female-spline-side taper portion 57 in which the widths of the female spline teeth (which are formed over the entire axial-direction length of the taper portion 57) of the taper portion 57 with respect to the circumferential direction thereof vary gradually in such a manner that they decrease as they go outwardly in the axial direction of the spline shaft 17, that is, forwardly in the insertion direction of the spline shaft 17. And, the two spline portions 47a, 48a are engaged with each other in a wedge-like manner over the axial-direction entire length thereof.

Also, in the case of the present embodiment, in the outer peripheral surface of the base end portion of the spline shaft 17, there is formed a securing groove 66 in such a manner that it extends over the entire periphery of the present outer surface. And, an O ring 67 is secured to the securing groove 66; and, the O ring 67 is elastically compressed between the bottom surface of the securing groove 66 and the inner peripheral surface of a cylindrical surface portion which is formed in the inner end portion of a spline hole 14 opened up in the central portion of a hub 4a and also which is larger in diameter than the root circle of the securing groove 66. On the other hand, a cap 50a is fitted with and fixed to the inner surface of the outer end opening of a cylindrical portion 68 formed in the outer end portion of the hub 4a. In the case of the present embodiment, the cap 50a and O ring 67 cooperate together in preventing foreign substances from getting into a spline engaged portion 49b which is composed of the male spline portion 47a formed in the outer peripheral surface of the spline shaft 17 and the female spline portion 48a formed in the inner peripheral surface of the spline hole 14.

Further, in the case of the present embodiment, a retaining ring 69 is bridgingly interposed between a securing groove 32a, which is formed in the outer peripheral surface of the spline shaft 17 and corresponds to a second engaging portion set forth in the appended claims of the present specification, and a securing stepped portion 35 formed in the peripheral edge portion of the outer end opening of the spline hole 14 and corresponding to a first engaging portion set forth in the appended claims of the present specification. Specifically, a portion of the retaining ring 69 is quenched to thereby form hardened steel wires and these steel wires are bent worked as shown in detail in FIG. 7, so that the retaining ring 69 has a circular-truncated-cone shape as a whole. More specifically, the retaining ring 69 is structured in the following manner: the steel wires are used to form a shape in which a plurality of crank shapes are arranged continuously and, after then, the retaining ring 69 is rounded in such a manner that the diameter of the retaining ring 69 in its free state decreases as it goes toward one end side (in FIGS. 6 and 7, the left end side) in the axial direction of the retaining ring 69. Also, the inside diameter $d_{69}$ of the outer end portion (inside diameter end portion) of the retaining ring 69 in its free state is set smaller than the outside diameter $D_{70}$ of a securing collar portion 70 which is formed in the outer end portion of the spline shaft 17 and is shifted more outwardly in the axial direction of the spline shaft 17 than the securing groove 32a ($d_{69} < D_{70}$).

And, in a state where the spline shaft 17 is inserted into the spline hole 14 and the securing groove 32a formed in the outer end portion of the spline shaft 17 is situated more outwardly in the axial direction than the securing stepped portion 35, the retaining ring 69 is bridgingly interposed between the securing groove 32a and securing stepped portion 35. That is, the retaining ring 69, in a state where the cap 50a is not mounted on the inner end portion of the hub 4a, is passed through the periphery of the securing groove 32a from the outer end side of the spline shaft 17, while the axial-direction other end portion (in FIGS. 6 and 7, the right end portion) of the retaining ring 69 having a larger diameter is arranged as the head of the retaining ring 69. As described above, since the inside diameter $d_{69}$ of the inside diameter end portion of the retaining ring 69 in its free state is set smaller than the outside diameter $D_{70}$ of the securing collar portion 70 of the spline shaft 17 ($d_{69} < D_{70}$), the diameter of the inside diameter end portion of the retaining ring 69 is elastically spread out by the securing collar portion 70.

And, in a state where the outside diameter end portion of the retaining ring 69 is contacted with the securing stepped portion 35 of the hub 4a and the inside diameter end portion of the retaining ring 69 is matched in position to the securing groove 32a, the inside diameter end portion of the retaining ring 69 is elastically returned to thereby reduce the diameter of the present inside diameter end portion. And, not only the inside diameter end portion of the retaining ring 69 is engaged with the outer end portion of the securing groove 32a but also the axial-direction length of the retaining ring 69 is elastically compressed. As a result of this, the retaining ring 69 is bridgingly arranged between the securing groove 32a and securing stepped portion 35 to thereby prevent the spline shaft 17 from slipping out of the spline hole 14 and, at the same time, the elastic force of the retaining ring 69 is able to continue to apply to the spline shaft 17 an axial force going in a direction (in FIG. 6, in the left direction) to pull the spline shaft 17 into the spline hole 14. By the way, in the outer peripheral surface of the outer end portion of the securing collar portion 70 formed in the outer end portion of the spline shaft 17, there is formed a chamfered portion 71, thereby facilitating the passage of the inside diameter end portion of the retaining ring 69 through the periphery of the securing collar portion 70. By the way, in the case of the present embodiment, there is used the retaining ring 69 which is made of steel wires; however, instead of the retaining ring 69, there can also be used a retaining ring consisting of a countersunk spring made of a steel plate or a diaphragm spring.

According to the present embodiment as well, similarly in the case of the previously-described first embodiment of the invention, there can be prevented occurrence of the teeth striking sounds in the spline engaged portion 49b between the male spline portion 47a formed in the outer peripheral surface of the spline shaft 17 and the female spline portion 48a formed in the inner peripheral surface of the spline hole 14. Further, since the retaining ring 69 is able to continue to apply the axial force to the spline shaft 17, when the wheel-driving bearing unit is assembled to and used in a car, as a boot which is fixed between the tripod-type constant velocity joint 60 to be mounted on the differential-gear side and the drive shaft 26 (see FIGS. 1 and 5), there can be used a rubber-made boot which is not excessively large in rigidity and is conventionally generally used.

The remaining portions of the structure and operation of the present embodiment are similar to the second example of the previously described conventional structure shown in FIG. 40 or to the previously described first embodiment of the invention shown in FIGS. 1–5. Therefore, like parts are given the same designations and thus the duplicate description thereof is omitted here.

Next, FIGS. 8 to 16 show a third embodiment of a wheel-driving unit according to a second aspect of the invention. The present embodiment is basically similar in structure to the previously described first embodiment of the invention shown in FIGS. 1–5. Therefore, like parts are given the same designations and thus the duplicate description thereof is omitted here.

In the case of the present embodiment as well, a retaining ring 33b is secured to a securing groove 32 which is formed in the near-to-outer-end portion of the outer peripheral surface of a spline shaft 17 constituting a drive member 18b and also which corresponds to a second engaging portion set forth in the appended claims of the present specification. And, the retaining ring 33b is contacted with or is disposed near to and opposed to a securing stepped portion 35b which is formed in the near-to-outer-end portion of the inner peripheral surface of a hub 4c and corresponds to a first engaging portion set forth in the appended claims of the present specification, thereby preventing the spline shaft 17 from shaking in the axial direction thereof within a spline hole 14 formed in the central portion of the hub 4c as well as from slipping out of the spline hole 14.

Figure 14:
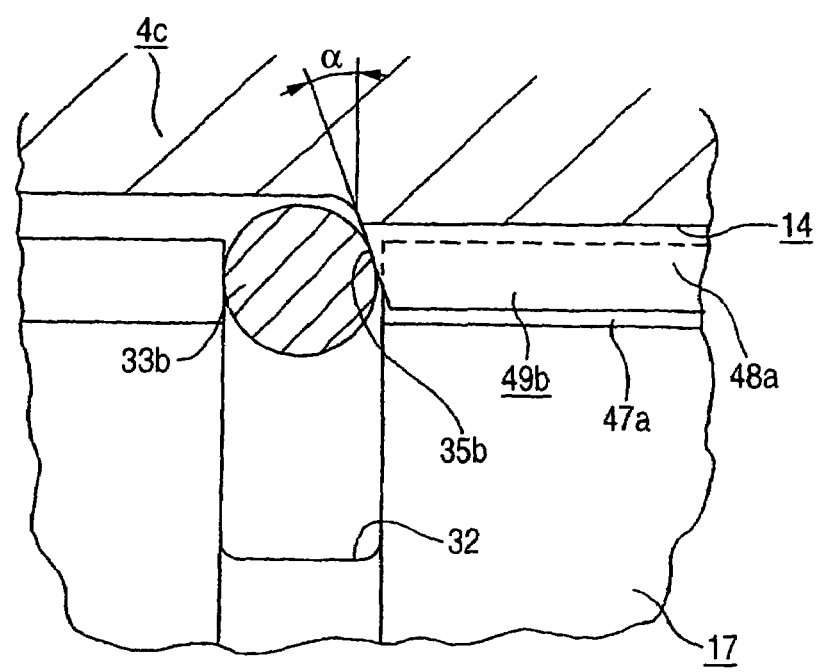
FIG. 14 is an enlarged view of the G portion shown in FIG. 8.

According to the present embodiment, the securing stepped portion 35b, as shown in detail in FIG. 14, is inclined by an angle α in a direction, where it goes outwardly in the axial direction thereof as it goes toward the outside diameter side (in FIG. 14, toward the upward side), with respect to a virtual plane existing at right angles to the center axis of the hub 4c. By the way, the inclination angle α can regulate the diameter of the retaining ring 33b from being reduced even in case where there is applied to the spline shaft 17 a strong force going in a direction to pull the spline shaft 17 out of the spline hole 14. That is, when there is applied a force to pull the spline shaft 17 out of the spline hole 14, the retaining ring 33b receives forces respectively from the securing groove 32 and securing stepped portion 35b; however, in case where these two forces balance, the diameter of the retaining ring 33b is not reduced.

In this case, assuming that a force going in a direction to pull the spline shaft 17 out of the spline hole 14 is expressed as F, a force applied from the securing stepped portion 35b to the retaining ring 33b can be expressed as $F/\cos(\alpha/2)$ and, of the force $F/\cos(\alpha/2)$, a component perpendicular to the inclined surface of the securing stepped portion 35b can be expressed as F, while a component parallel to the present inclined surface can be expressed as $\{F/\cos(\alpha/2)\} \times \sin(\alpha/2) = F \times \tan(\alpha/2)$. On the other hand, where a friction coefficient acting on the contact portion between the inclined surface of the securing stepped portion 35b and retaining ring 33b is expressed as μ, a friction force acting on the present contact portion provides μF; and, therefore, the component parallel to the inclined surface must be equal to or smaller than μF. That is, in case where the equality sign is removed for safety, $F \times \tan(\alpha/2) < \mu F$ provides the condition that can prevent the diameter of the retaining ring 33b from being reduced. By dividing both sides of this expression by F, there is obtained $\tan(\alpha/2) < \mu$, so that there is obtained $\alpha < 2\tan^{-1}\mu$; that is, $\alpha < 2\tan^{-1}\mu$ is the condition that can prevent the diameter of the retaining ring 33b from being reduced. By the way, a metal-made wire member, which constitutes the retaining ring 33b, has a diameter of the order of 1–1.5 mm and thus the elasticity of the wire member is much smaller than the above-mentioned force F (for example, 3500 N or more). Therefore, the elasticity of the wire member can be ignored here.

As will be discussed later, as the angle α increases, there can be enhanced the effect of prevention of the axial-direction shaky motion of a spline engaged portion 49b between a male spline portion 47a formed in the outer peripheral surface of the spline shaft 17 and a female spline portion 48a formed in the inner peripheral surface of the spline hole 14. On the other hand, as the angle α increases, the diameter of the retaining ring 33b is made easier to reduce; and, therefore, the engagement between the retaining ring 33b and securing stepped portion 35b is removed and thus the spline shaft 17 is easier to slip out of the spline hole 14. In view of this, the angle α is regulated in a proper range. Normally, since a steel-to-steel static friction coefficient μ is about 0.18, in case where the angle α when μ is set 0.18 is obtained according to the above-mentioned expression, the angle α is equal to or less than 20.4°. Generally, the angle is empirically obtained in such a manner that the pulling force of the spline shaft 17 can provide 3500N or more; and, normally, it is proper to employ a value in the range of 15–20.

By the way, the retaining ring 33b is previously mounted into the securing groove 32 before the spline shaft 17 is inserted into the spline hole 14. When inserting the spline shaft 17 into the spline hole 14, the retaining ring 33b passes through the interior of the spline hole 14 while reducing its diameter elastically. And, in a state where the retaining ring 33b is matched to the securing stepped portion 35b, the diameter of the retaining ring 33b is elastically returned and, as described above, the retaining ring 33b can be bridgingly interposed between the securing stepped portion 35b and securing groove 32. As will be described later, the positions of these securing stepped portion 35b and securing groove 32 are set according to the shapes of male spline teeth 53, 53 constituting the male spline portion 47a and female spline teeth 72, 72 constituting the female spline portion 48a. Therefore, in a state where the retaining ring 33b is returned elastically, the retaining ring 33b is interposed with no shaky motion between the securing stepped portion 35b and securing groove 32, or, even in case where there exists any shaky motion, the amount of the shaky motion is quite small.

Also, in the case of the present embodiment as well, similarly to the previously described first embodiment of the invention, the seal lip of a seal ring 52 fitted with the outer surface of the outer peripheral surface of a shoulder portion 51 formed in the base end portion of an outer ring 15 for a constant velocity is contacted with the inner surface of a caulk portion 42a formed in the inner end portion of the hub 4c to thereby close a clearance existing between the caulk portion 42a and outer ring 15 for a constant velocity. Especially, in the case of the present embodiment, the portion of the inner surface of the caulk portion 42a with which the leading end edge of the seal lip is contacted is formed as a flat surface existing in a direction at right angles to the center axis of the hub 4c, whereby the present seal lip can be contacted with the inner surface of the caulk portion 42a in a stable manner.

Further, in the case of a wheel-driving bearing unit according to the present embodiment, similarly to the previously described second embodiment of the invention, the widths of the male spline teeth 53, 53 (FIGS. 9 and 10) constituting the male spline portion 47a formed in the outer peripheral surface of the spline shaft 17, substantially over the entire length thereof except for incomplete portions 73 respectively formed in the male spline teeth 53, 53, are set to vary in such a manner that they gradually increase as they go backwardly in the insertion direction of the spline shaft 17, that is, inwardly in the axial direction of the spline shaft 17. Therefore, the circumferential-direction widths of groove portions 55, 55, which are formed between the male spline teeth 53, 53 adjoining each other in the circumferential direction of the spline shaft 17, decrease gradually as they go toward the inner end side of the groove portions. Therefore, the circumferential-direction side surfaces of the male spline teeth 53, 53 existing in the axial-direction middle portion of the male spline portion 47a are inclined with respect to the axial direction by the same angle in the mutually opposite directions. The inclination angle of the side surfaces of the male spline teeth 53, 53 with respect to the axial direction is set in the range of 0.5–1.5° By the way, the axial-direction two end portions of the male spline portion 47a are formed as incomplete portions 73, 73 which are inclined at a relatively large angle in a direction where the diameter-direction heights of the male spline teeth 53, 53 decrease gradually as they go toward the axial-direction two ends of the male spline teeth 53, 53.

On the other hand, the widths of female spline teeth 72, 72 (FIGS. 12 and 13) constituting the female spline portion 48a formed in the inner peripheral surface of the spline hole 14, substantially over the entire length of the female spline teeth 72 except for incomplete portions 74 formed in the end portions of the female spline teeth 72, 72, are set to vary in such a manner that they gradually decrease as they go backwardly in the insertion direction of the spline shaft 17, that is, inwardly in the axial direction of the spline hole 14. Therefore, the widths of groove portions 75, 75, which constitute the female spline portion 48a and exist between the female spline teeth 72, 72 adjoining each other in the circumferential direction of the hub 4c, increase gradually as they go toward the inner end side of the groove portions 75. In this manner, the female spline portion 48a and male spline portion 47a are different from each other in the directions where the widths of the teeth 53, 72 and groove portions 55, 75 of the respective spline portions 48a, 47a increase with respect to the axial direction. Further, the circumferential-direction both-side surfaces of the female spline teeth 72, 72 constituting the female spline portion 48a are inclined with respect to the axial direction by the same angle as in the male spline teeth 53, 53 which constitute the male spline portion 47a.

By the way, the operation to form the above-mentioned female spline portion 48a and male spline portion 47a, for example, can be carried out in the following manner. Firstly, the diameter dimensions of such circles after formation of the teeth that form the sections of the teeth at right angles to the axes of the teeth and are equal to the section area of the spline hole 14 are found at the respective points in the axial direction of the hub 4c. And, the hub 4c is cut to form a blank hole to be worked into the spline hole 14 in such a manner that the blank hole can be equal to the diameter dimensions found at the respective points. Since the widths of the teeth vary gradually in the axial direction of the hub 4c, the thus-cut-formed blank hole provides a conical-shaped taper hole. And, after such taper hole is formed, a punch, which includes on the outer peripheral surface thereof a plurality of projecting strips like male spline teeth the widths of which increase gradually as they go toward the axial-direction inner ends thereof, is pushed into the taper hole, which is to be worked into the spline hole 14, from the inner end side of the taper hole to thereby form the female spline teeth 72, 72 by pressing.

Similarly, in the case of the male spline teeth 53, 53 of the male spline portion 47a, a conical-shaped taper shaft is previously formed by cutting; and, after then, a die, which includes on the inner peripheral surface thereof a plurality of projecting strips like female spline teeth the widths of which increase gradually as they go toward the axial-direction outer ends thereof, is pushed into the taper shaft, which is to be formed into the spline shaft 17, from the outer end side of the present taper shaft to thereby form the male spline teeth 53, 53 by pressing. Also, the male spline portion 47a, after the male spline teeth 53, 53 are formed into their respective given shapes, is heat treated by high frequency quenching to thereby harden the surface thereof. On the other hand, the female spline portion 48a is not heat treated but is left unquenched. The reason why the quenching treatment is enforced only on one of the male spline portion 47a and female spline portion 48a in this manner is that, as the spline shaft 17 is pushed into the spline hole 14, the side surfaces of the respective teeth 53, 57 can be made easy to be closely contacted with each other and, at the same time, when the present wheel-driving bearing unit is in use, the occurrence of cracks in the teeth 53, 72 of the male and female spline portions 47a, 48a can be prevented.

Further, in the case of the present embodiment, the method for forming the securing stepped portion 35b and securing groove 32 is improved in the following manner: that is, in a state where the spline shaft 17 is inserted into the spline hole 14 to thereby form the spline engaged portion 49b and also the spline engaged portion 49b is free from shaky motion (that is, the side surfaces of the male spline teeth 53, 53 constituting the male spline portion 47a are closely contacted with the side surfaces of the female spline teeth 72, 72 constituting the female spline portion 48a), the retaining ring 33b can be bridgingly arranged between the securing stepped portion 35b and securing groove 32 with no shaky motion, or, even in case where any shaky motion exists, the amount of the shaky motion can be made small. This will be discussed below in more detail with reference to FIGS. 15 and 16.

Figure 15:
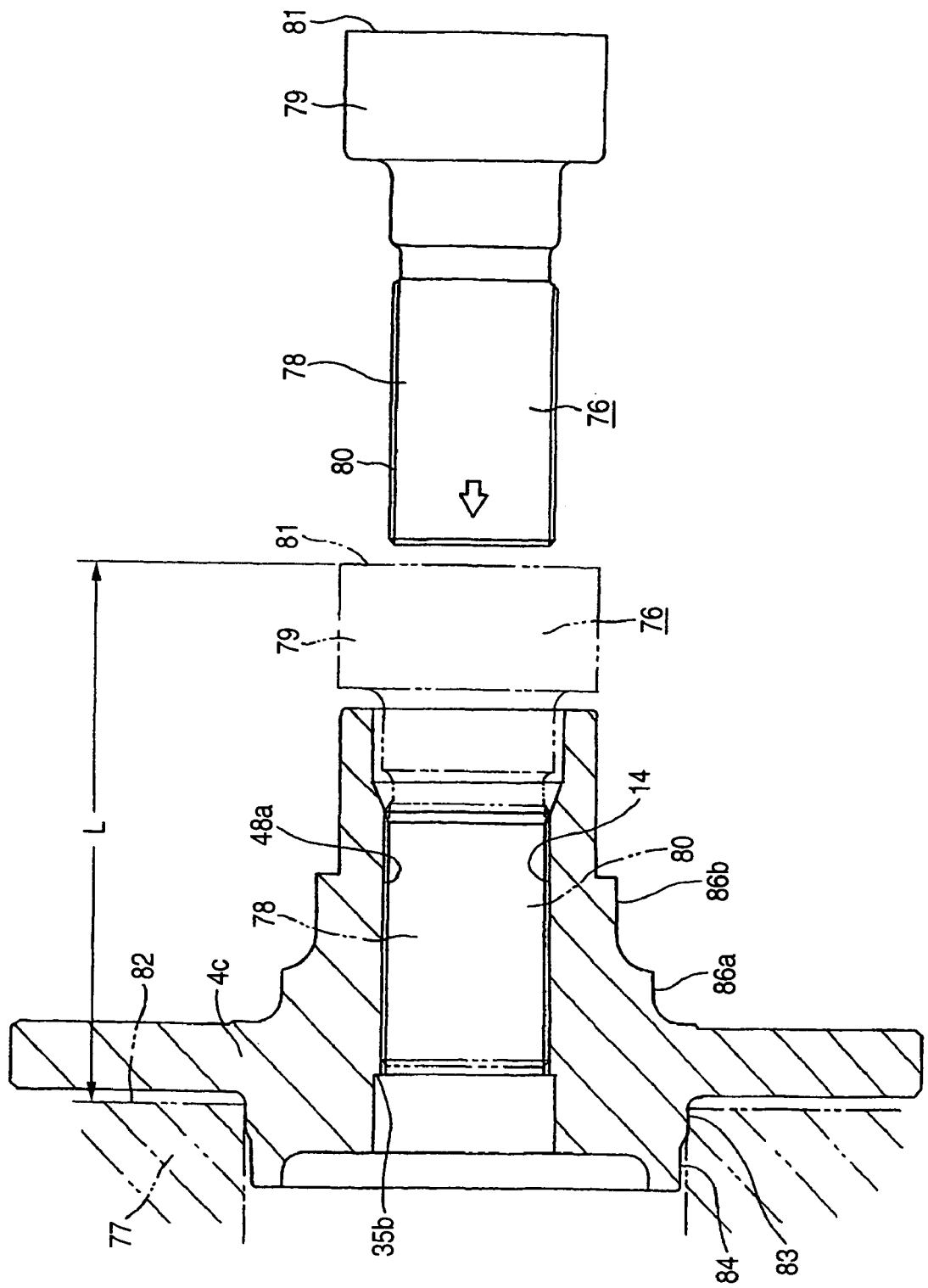
FIG. 15 is a section view to show how to form a securing portion in the inner peripheral surface of the hub on the basis of the female spline portion.

Firstly, FIG. 15 shows how to form the securing stepped portion 35b in the inner peripheral surface of the middle portion of the spline hole 14 formed in the hub 4c. In this case, using a male-side gauge 76, the hub 4c is positioned and held in the chuck 77 of a lathe which is a working apparatus for forming the securing stepped portion 35b. The male-side gauge 76 can be produced by fixing a positioning block portion 79 to the base end portion (inner end portion) of a spline shaft portion 78 for gauging. In the outer peripheral surface of the spline shaft portion 78 for gauging, there is formed a male spline portion 80 for gauging. The male spline portion 80 for gauging is formed to be identical in shape and dimension with the male spline portion 47a formed in the outer peripheral surface of the spline shaft 17 constituting the drive member 18b. For example, each of spline teeth constituting the male spline portion 80 for gauging is an involute tooth in which a module is 1. 5 and, in a direction where the tooth thickness (the thickness in the circumferential direction) toward the inner end of the tooth, the inclination angle of the two side surfaces of the respective teeth is set at 1° (the taper angle is set at 2°). By the way, the male spline portion 47a varies in shape and dimension within a given allowance, whereas the shape and dimension of the male spline portion 80 for gauging are set as the central values in the allowable range of the shape and dimension of the male spline portion 47a. Also, the position relationship between the male spline portion 80 for gauging and the base end face (inner end face) 81 of the positioning block portion 79 is regulated strictly as prescribed.

To form the securing stepped portion 35b using the above-mentioned male-side gauge 76, the male spline portion 80 for gauging of the male-side gauge 76 is inserted into the female spline portion 48a formed in the inner peripheral surface of the spline hole 14 of the hub 4c from the inner-end-side opening of the spline hole 14. And, until the male spline portion 80 for gauging is engaged with the female spline portion 48a with no clearance between them, while the male-side gauge 76 is fitted with the inner surface of the spline hole 14, with the base end face 81 of the male-side gauge 76 as the reference, the hub 4c is assembled to the chuck 77 of a lathe for forming the securing stepped portion 35b by cutting.

That is, in a state where the distance L between the end face 82 of the chuck 77 and the base end face 81 of the male-side gauge 76 is set at a proper value, a reference cylindrical surface 83, which is formed in the outer peripheral surface of the hub 4c and on which a member to be braked (a disk rotor or a drum) can be mounted, is held down by the chuck 77. And, in this state, or, after the male-side gauge 76 is removed from the spline hole 14, the chuck 77 is rotated and a tool (not shown) is butted against the inner peripheral surface of a portion of the hub 4c to thereby form the securing stepped portion 35b (and finish it). The mounting position of the present tool with respect to the chuck 77 is previously regulated strictly. Therefore, in case where the securing stepped portion 35 is finished with the distance L set at a proper value, the position relationship between the securing stepped portion 35b and the female spline portion 48a formed in the inner peripheral surface of the spline hole 14 can be established accurately as designed.

By the way, in the illustrated embodiment, as the cylindrical surface which is used to hold down the hub 4c using the chuck 77, there is used the reference cylindrical surface 83 which is used to mount the member to be braked. However, it is also possible to use another cylindrical surface, provided that it uses the center axis of the hub 4a as the center axis thereof and does not interfere with the working operation of the securing stepped portion 35b. For example, there can be used a second reference cylindrical surface 84 which is used to mount the wheels onto the hub 4a, or a cylindrical surface 86a which is used to slidingly contact the leading end edge of the seal lip of the seal ring (FIG. 8) fitted with and fixed to the inner surface of the outer end portion of the outer ring 3, or a cylindrical surface 86b which is formed in the outer peripheral surface of the middle portion of the hub 4c and exists between the first inner raceway 11 and small-diameter stepped portion 12. Further, the outer peripheral surface of the inner end portion of the hub 4c in a state before the caulk portion 42a (FIG. 8) is worked can be held down by the chuck 77.

Figure 16:
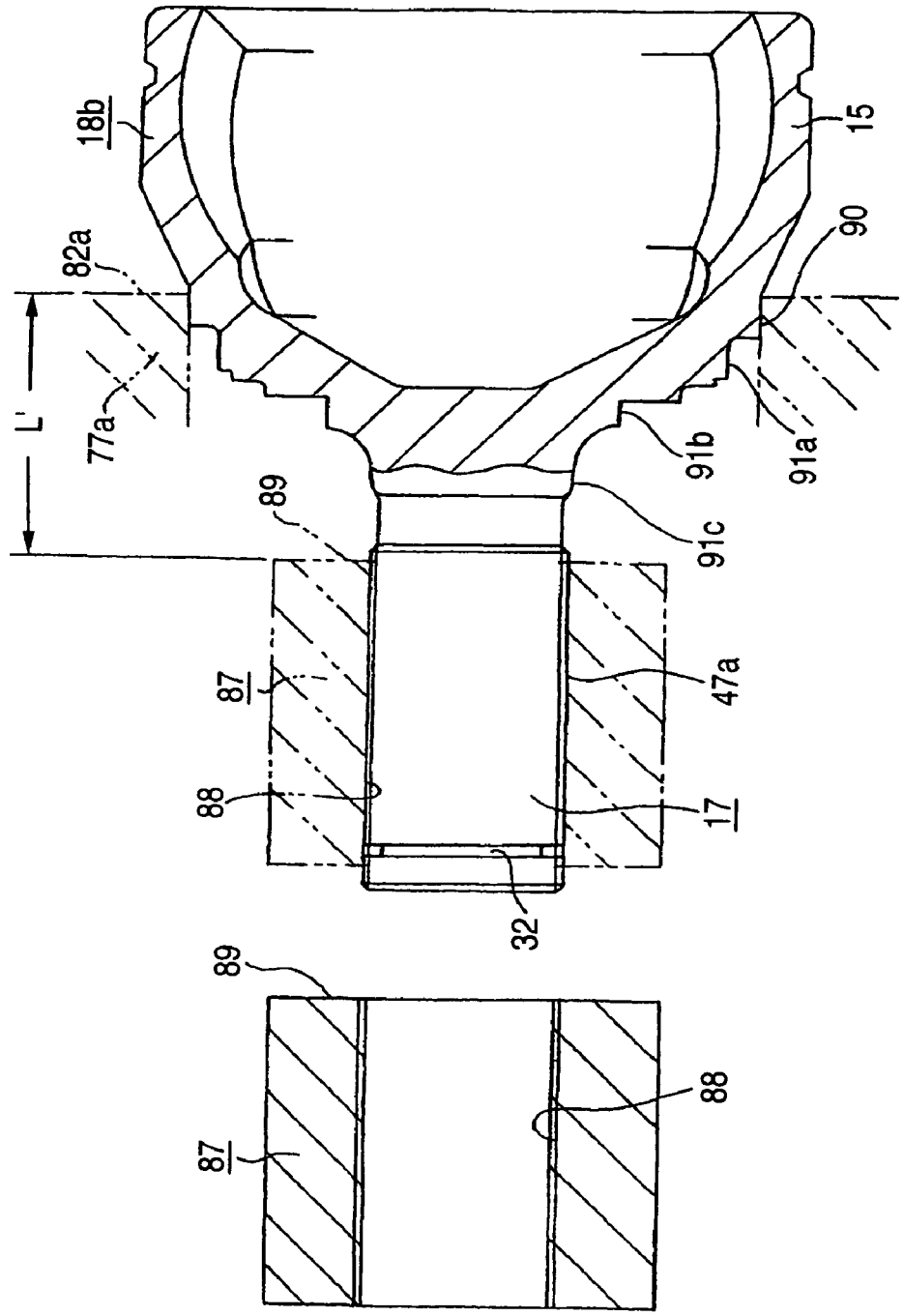
FIG. 16 is a section view to show how to form a securing groove in the outer peripheral surface of a drive member on the basis of a male spline.

Next, description will be given below of the procedure for forming the securing groove 32 at a given position in the leading end portion of the spline shaft 17 constituting the drive member 18b with reference to FIG. 16. By the way, the working operation of the securing groove 32 is carried out in the final stage of the working operation of the drive member 18b. In other words, the forging operation for providing the whole shape, the pressing operation for forming the male spline portion 47a in the outer peripheral surface of the spline shaft 17, the cutting operation for cutting the outer peripheral surface of the male spline portion 47a into a desired shape, the heat treatment operation, the grinding operation and the superfinishing operation must be completed prior to the working operation of the securing groove 32.

When mounting the drive member 18b onto the chuck 77a of a lathe serving as a working apparatus in order to form the securing groove 32, there is used a female-side gauge 87. This female-side gauge 87 is formed as a cylindrical shape as a whole and includes a female spline portion 88 for gauging in the inner peripheral surface thereof. The female spline portion 88 for gauging is formed identical in shape and dimension with the female spline portion 48a formed in the inner peripheral surface of the spline hole 14 of the hub 4c. For example, each of spline teeth constituting the female spline portion 88 for gauging is an involute tooth in which a module is 1.5 and, in a direction where the tooth thickness (the thickness in the circumferential direction) going toward the outer end of the tooth increases, the inclination angle of the two side surfaces of the respective teeth is set at 1° (the taper angle is set at 2°). By the way, the female spline portion 48a varies in shape and dimension within a given allowable range, whereas the shape and dimension of the female spline portion 88 for gauging are set as the central values in the allowable range of the shape and dimension of the female spline portion 49a. Also, the position relationship between the female spline portion 88 for gauging and the base end face (inner end face) 89 of the female-side gauge 87 is regulated strictly as prescribed.

To form the securing groove 32 using the above-mentioned female-side gauge 87, the female spline portion 88 for gauging of the female-side gauge 87 is placed on the male spline portion 47a formed in the outer peripheral surface of the spline shaft 17 of the drive member 18b from the leading end (outer end) side of the spline shaft 17. And, until the female spline portion 88 for gauging is engaged with the male spline portion 47a with no clearance between them, in a state where the female-side gauge 87 is fitted with the outer surface of the spline shaft 17, on the basis of the base end face 89 of the female-side gauge 87, the drive member 18b is assembled to the chuck 77a of a lathe for working the securing groove 32a by cutting.

That is, in a state where the distance L' between the end face 82a of the chuck 77a and the base end face 89 of the female-side gauge 87 is set at a proper value, a reference cylindrical surface 90 formed in the outer peripheral surface of the middle portion of an outer ring 15 for a constant velocity joint constituting the drive member 18b is held down by the chuck 77a. And, after the female-side gauge 87 is removed from the spline shaft 17, the chuck 77a is rotated and a tool (not shown) is butted against the outer peripheral surface of the leading end portion of the spline shaft 17 to thereby form the securing groove 32. The mounting position of the present tool with respect to the chuck 77a is previously regulated strictly. Therefore, in case where the securing groove 32 is finish worked with the distance L' set at a proper value, the position relationship between the securing groove 32 and the male spline portion 47a formed in the outer peripheral surface of the spline shaft 17 can be set accurately as designed.

By the way, in the illustrated embodiment, as the cylindrical surface that is used to hold down the drive member 18b using the chuck 77a, there is used a reference cylindrical surface 90 formed in the outer peripheral surface of the middle portion of the outer ring 15 for a constant velocity joint. However, it is also possible to use another cylindrical surface, provided that it uses the center axis of the hub 4a as the center axis thereof and does not interfere with the working of the securing groove 32. For example, there can be used any one of three cylindrical surfaces 91a–91c respectively formed so as to extend from the outer peripheral surface of the outer end portion of the outer ring 15 for a constant velocity joint to the base end portion (inner end portion) of the spline shaft 17.

An operation to connect together a wheel-supporting bearing unit 1c incorporating therein the hub 4c including the above-formed securing stepped portion 35b and a wheel-side constant velocity joint 2c incorporating therein the drive member 18b including the above-formed securing groove 32 is carried out in the following manner. That is, firstly, the spline shaft 17 is inserted into the spline hole 14 while the male spline portion 47a and female spline portion 48a are spline engaged with each other. And, the spline shaft 17 is pushed until the male and female spline portions 47a, 48a are engaged with each other in a wedge-like manner. In this state, the side surfaces (which are opposed to each other in the circumferential direction) of the male and female spline teeth 53, 72 are contacted with each other almost uniformly over the entire axial-direction length of the male and female spline portions 47a, 48a.

Also, in this state, the side surface of the outside-diameter-side half section of a retaining ring 33b previously secured to the securing groove 32 formed in the outer end portion of the spline shaft 17, as shown in FIG. 14, is contacted with the inclined surface of the securing stepped portion 35b formed in the inner peripheral surface of the outer end portion of the spline hole 14. Therefore, in this state, the retaining ring 33b secured to the securing groove 32 is engaged with the inner peripheral surface of the spline hole 14 to thereby prevent the spline shaft 17 from shifting in a direction to slip out of the spline hole 14. In a state where the retaining ring 33b is matched in position to the securing stepped portion 35b, the diameter of the retaining ring 33b is elastically returned. At the then time, in case where the dimension allowances of the respective parts can be regulated in such a manner that the outside diameter of the retaining ring 33b, shown in FIG. 14, can be prevented from touching the bottom surface of the securing stepped portion 35b (the inner peripheral surface of the cylindrical surface portion existing more outwardly than the securing stepped portion 35b), the axial-direction shaky motion of the spline engaged portion 49b between the male and female spline portions 47a, 48a can be eliminated. In order to eliminate the axial-direction shaky motion of the spline engaged portion 49b, the working method employed in the present embodiment may be enforced to thereby reduce the dimension allowance down to a small value and increase the inclination angle α of the securing stepped portion 35b as much as possible. However, since the inclination angle α must satisfy the condition that the retaining ring 33b is prevented from slipping out of the securing stepped portion 35b, the value of the inclination angle α has a limit.

In the case of the present embodiment, as described above, the securing stepped portion 35b is formed on the basis of the female spline portion 48a, while the securing groove 32 is formed on the basis of the male spline portion 47a. Therefore, in a state where the male and female spline portions 47a, 48a are engaged with each other in the above-mentioned manner, the securing stepped portion 35b and securing groove 32 are matched in position to each other and the retaining ring 33b secured to the securing groove 32, before it is butted against the bottom of the securing stepped portion 35b, is held into between the securing groove 32 and the inclined surface of the securing stepped portion 35b in a wedge-like manner, so that the male and female spline portions 47a, 48a can be engaged with no shaky motion between them. Even in case where any shaky motion is generated, the amount of such shaky motion is very small, so that generation of jarring strange sounds due to the shaky motion can be controlled down to a practically negligible level.

By the way, when the shape and dimension accuracy of the male and female spline portions 47a, 48a are extremely poor, even in case where the securing stepped portion 35b and securing groove 32 are respectively formed on the basis of the male and female spline portions 47a, 48a, before the retaining ring 33b is engaged with the securing stepped portion 35b, the caulk portion 42a formed in the inner end portion of the hub 4c is contacted with the outer end face of the outer ring 15 for a constant velocity joint, which makes it impossible to connect the wheel-supporting bearing unit 1c with the wheel-side constant velocity joint 2c. Also, the interference of the seal lip of the seal ring 52 can be excessively small or excessively large, thereby being unable to obtain the desired seal performance. Therefore, in case where the present embodiment is enforced as well, the shape and dimension accuracy of the male and female spline portions 47a, 48a must be secured to a certain degree.

In the case of the above-structured present embodiment, even when the shapes and dimension accuracy of the male and female spline teeth 53, 72 respectively constituting the male and female spline portions 47a, 48a vary a little, not only the both-side surfaces of these spline teeth 53, 72 can be positively contacted with each other but also the retaining ring 33b can be bridgingly interposed between the securing stepped portion 35b and securing groove 32. Therefore, without requiring a large force to push the spline shaft 17 into the spline hole 14, the male and female spline portions 47a, 48a can be fitted with each other with no shaky motion between them; or even in case where there exists any shaky motion between them, they can be fitted together in a state where the amount of such shaky motion is practically negligible amount. As a result of this, according to the present embodiment, not only the cost necessary for assembly of the present embodiment can be reduced but also, regardless of the existence of variations in the shapes and dimension accuracy of the male and female spline portions 47a, 48a, the occurrence of the above-mentioned teeth striking sounds can be prevented.

Further, according to the present embodiment, the side surfaces of the male and female spline teeth 53, 72 of the male and female spline portions 47a, 48a can be contacted with each other over the entire lengths thereof with almost uniform contact surface pressure, thereby being able to reduce the maximum contact surface pressure that is applied to these spline teeth 53, 72. Therefore, in the case of the present embodiment, the durability of the male and female spline teeth 53, 72 of the male and female spline portions 47a, 48a can be enhanced and, at the same time, the occurrence of the teeth striking sounds can be prevented for a long period of time.

By the way, as in the present embodiment, in the case of a structure in which the circumferential-direction widths of the male and female spline teeth 53, 72 vary in the axial direction, the teeth widths are quite different between the two ends of the respective spline portions 47a, 48a. In view of this, in order to be able to prevent even the circumferential-direction smallest widths of the male and female spline teeth 53, 72 from being excessively thin, according to the present embodiment, the lengths of the spline portions 47a, 48a are set about 30 mm. Also, for the same reason, the module is set at 1.5 which is larger than the normal value (1.0) of the module. In this case, the teeth widths of the two ends of the splines on the pitch circles thereof are respectively 1.829 mm and 2.877 mm, while the difference between them is about 1 mm.

Figure 17:
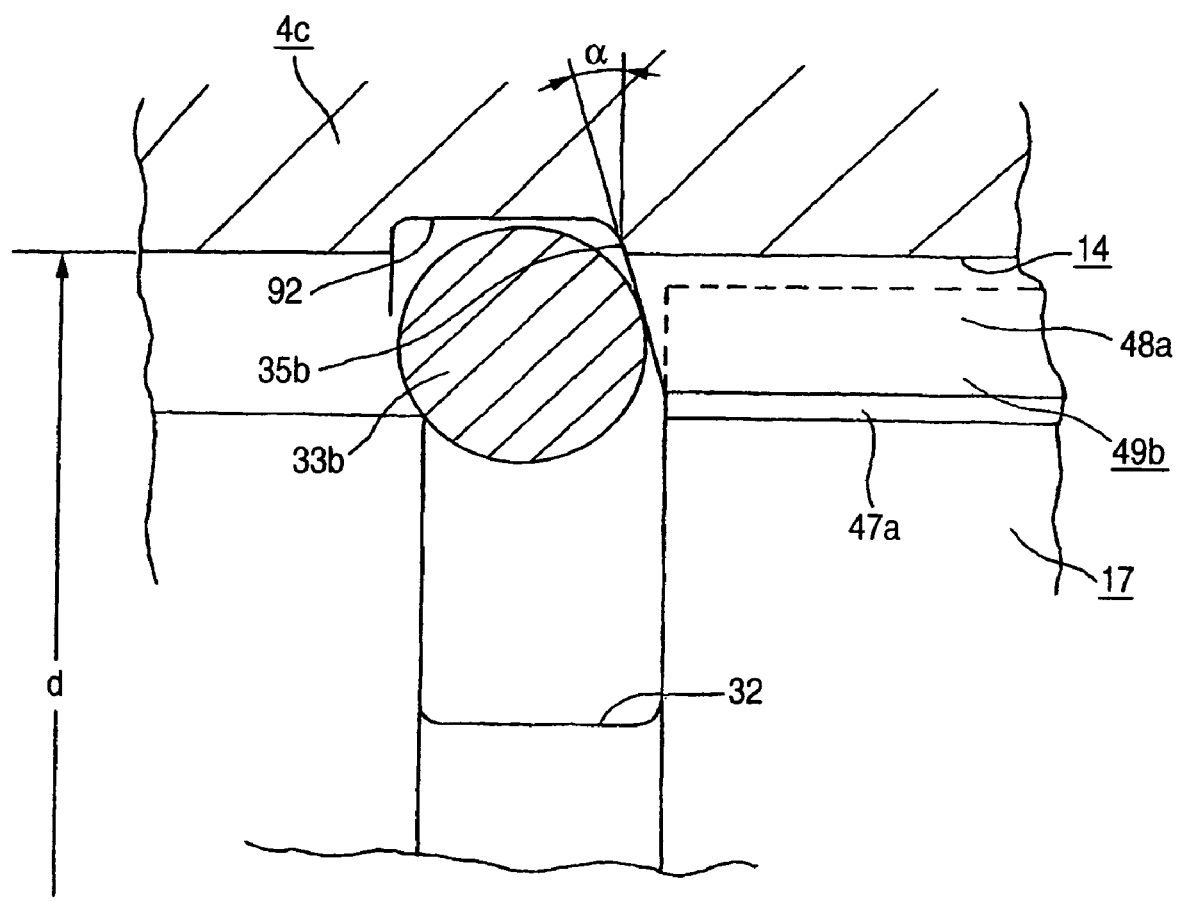
FIG. 17 is a view similar to FIG. 14, showing a fourth embodiment of a wheel-driving unit according to the invention.

Next, FIG. 17 shows a fourth embodiment of a wheel-driving unit according to the invention, similarly to the second aspect. In the case of the present embodiment, in such portion of the inner peripheral surface of a hub 4c that exists in the peripheral portion of a securing stepped portion 35b, there is formed a recessed groove 92. Formation of such recessed groove 92 can increase the diameter-direction width of the securing stepped portion 35b and thus, even in case where the inclination angle α of the securing stepped portion 35b is set at the same angle, the axial-direction width of the securing stepped portion 35b can be set large. Thanks to this, even in case where male and female spline portions 47a, 48a are worsened a little in accuracy, a retaining ring 33b secured to a securing groove 32 can be engaged with the securing stepped portion 35b with no shaky motion between them. By the way, the inside diameter d of the portion of the inner peripheral surface of the hub 4c that is situated nearer to the outer end portion of the hub 4c than the recessed groove 92 is set equal to or larger than the diameter of the root circle of the female spline portion 48a, thereby being able to facilitate the working of the female spline portion 48a. The remaining structures and operations of the present embodiment are similar to those of the previously described third embodiment. Therefore, the illustration and description of the duplicate portions are omitted here.

Figure 18:
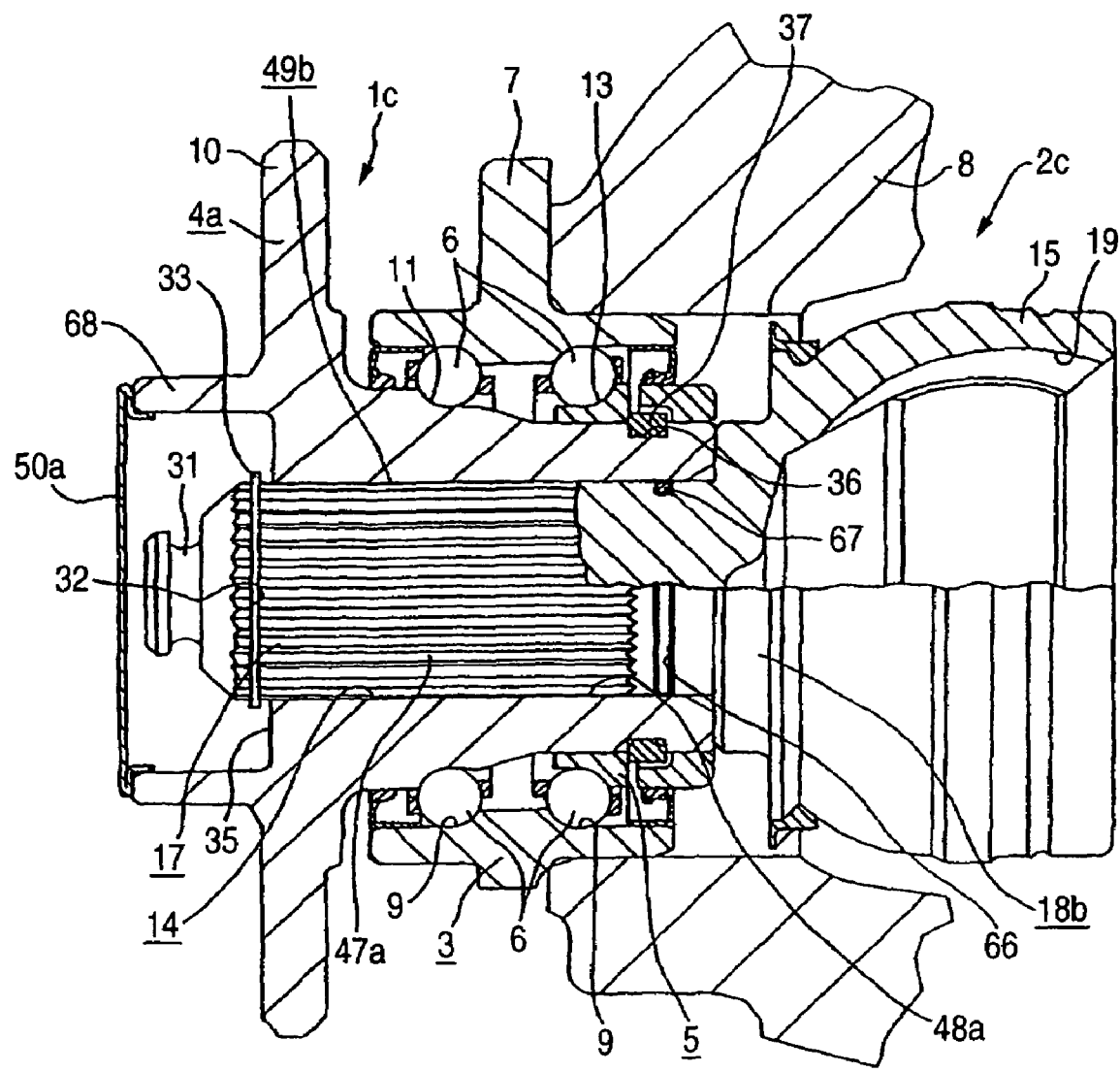
FIG. 18 is a partially omitted section view of a fifth embodiment of a wheel-driving unit according to the invention.

Next, FIG. 18 shows a fifth embodiment of a wheel-driving unit according to a third aspect of the invention. By the way, the basic structure of the present embodiment is similar to the second example of the conventional structure previously shown in FIG. 40, or to the second embodiment of the invention previously shown in FIG. 6. Therefore, equivalent parts are given the same designations and the duplicate description thereof is omitted or simplified. Thus, description will be given below mainly of the characteristic portions of the present embodiment. In the case of the present embodiment, a retaining ring 33 is secured to a securing groove 32 which is formed in the outer peripheral surface of the outer end portion of a spline shaft 17 and also which corresponds to a second engaging portion set forth in the appended claims of the present specification. And, in the outer end portion of a hub 4a, between the securing groove 32 and a securing stepped portion 35 which is formed in the peripheral edge portion of the outer end opening of a spline hole 14 and corresponds to a second engaging portion set forth in the appended claims of the present specification, there can be bridgingly interposed the retaining ring 33. In the case of the present embodiment as well, similarly to the third embodiment of the invention previously shown in FIGS. 8 to 13, the circumferential-direction widths of male spline teeth constituting a male spline portion 47a formed in the outer peripheral surface of the spline shaft 17 are set to vary almost over the entire axial-direction length of the spline shaft 17 in such a manner that they increase as they go inwardly in the axial direction of the spline shaft 17 (that is, backwardly in the insertion direction of the spline shaft 17). Also, the circumferential-direction widths of female spline teeth constituting a female spline portion 48a formed in the outer peripheral surface of the spline hole 14 are set to vary almost over the entire axial-direction length of the spline hole 14 in such a manner that they decrease as they go inwardly in the axial direction thereof.

And, the spline shaft 17 is inserted into the spline hole 14 while the male spline portion 47a is spline engaged with the female spline portion 48a, whereby not only the two spline portions 47a, 48a are fitted with each other with an interference between them but also the inner end face of the hub 4a is contacted with the outer surface of an outer ring 15 for a constant velocity joint. In this state, a given pre-load is applied to a spline engaged portion 49b between the spline shaft 17 and spline hole 14, thereby applying a frictional force to the spline engaged portion 49b which prevents the spline shaft 17 from shifting in a direction to slip out of the spline hole 14. Also, in this state, the retaining ring 33 secured to the securing groove 32 of the spline shaft 17 is situated more outwardly in the axial direction than the outer surface of the securing stepped portion 35.

In the case of the thus-structured present embodiment as well, similarly to the previously described embodiments, not only there can be prevented, for a long period of time, the occurrence of the teeth striking sounds in the spline engaged portion 49b between the male spline portion 47a formed in the outer peripheral surface of the spline shaft 17 and the female spline portion 48a formed in the inner peripheral surface of the spline hole 14, but also the male and female spline teeth constituting the spline engaged portion 49b can be enhanced in durability. Also, in a state where the spline shaft 17 shifts in the direction to slip out of the spline hole 14 and the outside-diameter-side half section of the retaining ring 33 secured to the securing groove 32 of the hub 4a is contacted with the outer surface of the securing stepped portion 35, the spline shaft 17 can be prevented from shifting further in the direction to slip out of the spline hole 14.

By the way, in the case of the present embodiment as well, similarly to the first embodiment previously shown in FIGS. 1 to 5, in case where there is applied an elastic force using a boot, in a state where the wheel-driving bearing unit is assembled to a car, it is possible to continue to apply an axial force to the spline shaft going in a direction to push the spline shaft into the spline hole. And, even in case where, due to use for a long period of time, the teeth of the male and female spline portions 47a, 48a are worn, these two male and female spline portions 47a, 48a can be continuously engaged with each other with a sufficient interference between them, so that prevention of the occurrence of the above-mentioned teeth striking sounds for a long period of time can be attained with more accuracy.

Figure 19:
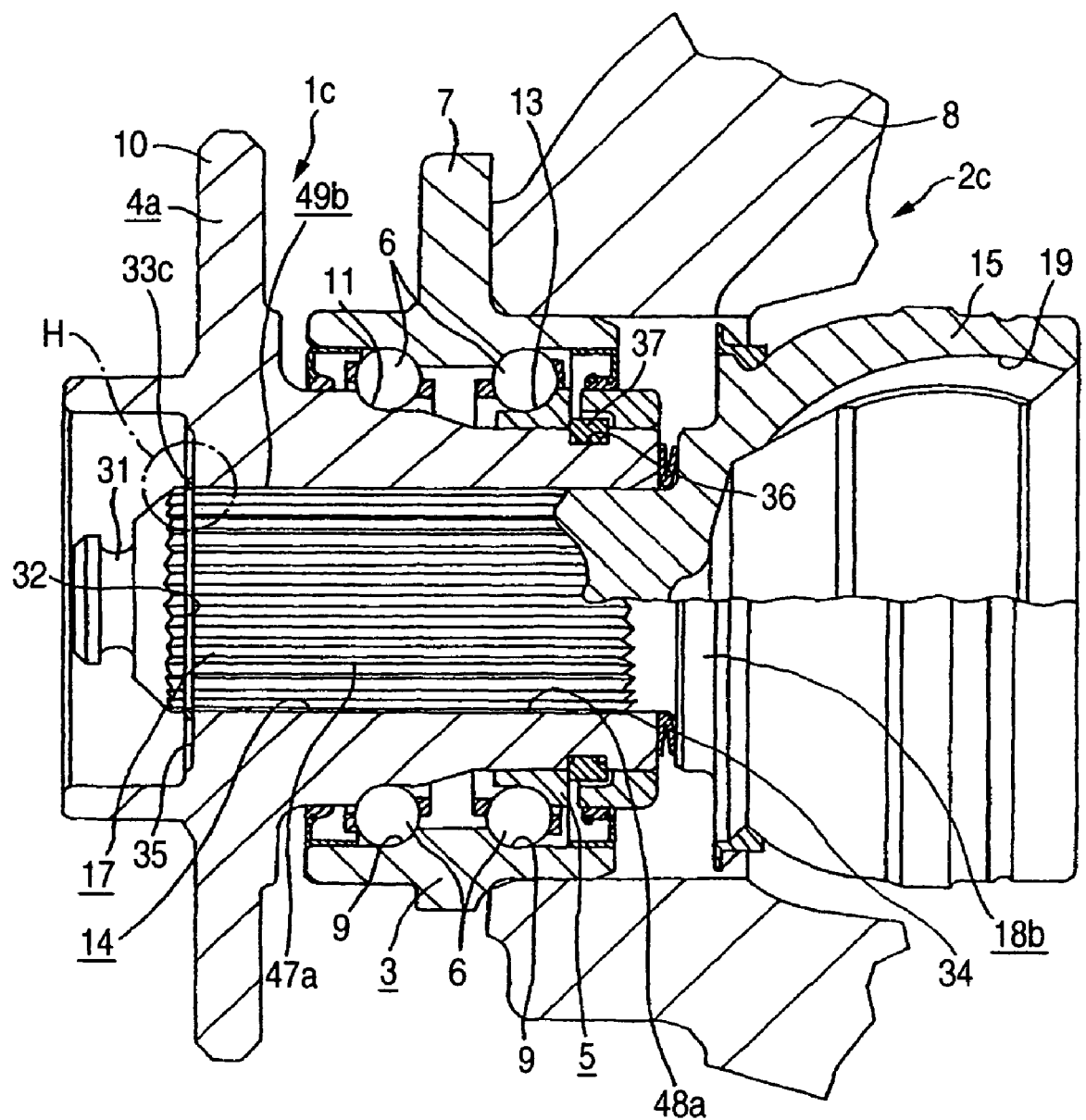
FIG. 19 is a partially omitted section view of a sixth embodiment of a wheel-driving unit according to the invention.
Figure 20:
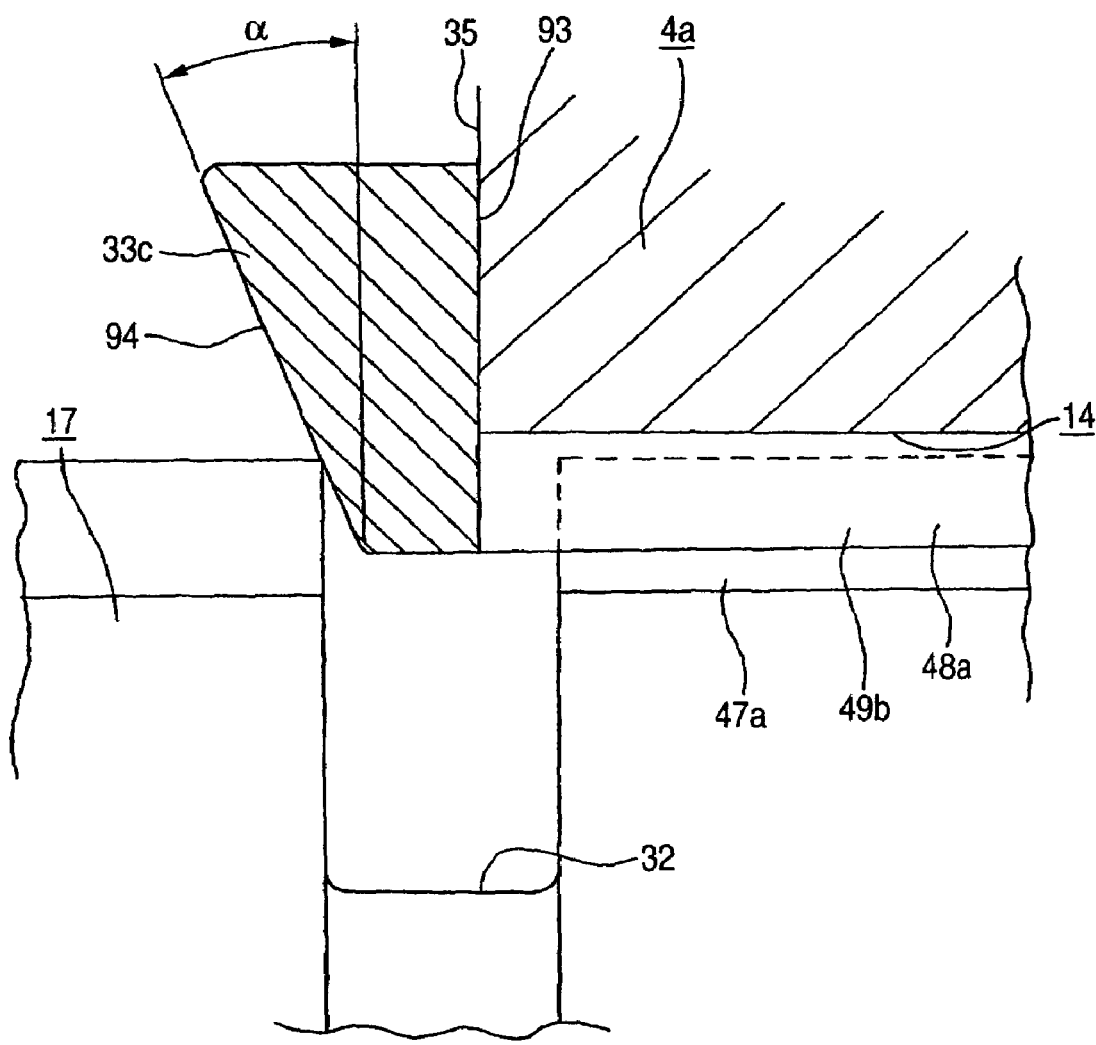
FIG. 20 is an enlarged view of the H portion shown in FIG. 19.

Next, FIGS. 19 and 20 show a sixth embodiment of a wheel-driving unit according to the second aspect of the invention. By the way, the basic structure of the present embodiment is similar to the second example of the conventional structure previously shown in FIG. 40, or to the second embodiment of the invention previously shown in FIG. 6, or to the fifth embodiment of the invention previously shown in FIG. 18. Therefore, equivalent parts are given the same designations and the duplicate description thereof is omitted or simplified. Thus, description will be given below mainly of the characteristic portions of the present embodiment.

In the case of the present embodiment, a securing stepped portion 35, which is formed in the inner peripheral surface of a hub 4a, is disposed in a direction intersecting at right angles to the center axis of the hub 4a. Also, a retaining ring 33c, which is bridgingly interposed between the securing stepped portion 35 and a securing groove 32 formed in the outer peripheral surface of the leading end portion (outer end portion) of a spline shaft 17, is formed so as to be elastic in a direction where the diameter thereof can be reduced. The retaining ring 33c is structured in the following manner: that is, its surface disposed opposed to the securing stepped portion 35 is formed as a flat surface 93 which is parallel to the securing stepped portion 35; and, the opposite surface thereof is formed as a conically concave-shaped inclined surface 94 which is inclined by angle $\alpha$ with respect to the flat surface 93. Therefore, the thickness of the retaining ring 33c decreases as it goes toward the inside diameter side thereof.

Also, in the present embodiment as well, similarly to the third embodiment of the invention previously shown in FIGS. 8 to 13, the circumferential-direction widths of male spline teeth constituting a male spline portion 47a formed in the outer peripheral surface of the spline shaft 17 are set to vary in such a manner that they increase as they go inwardly in the axial direction of the spline shaft 17. Also, the circumferential-direction widths of female spline teeth constituting a female spline portion 48a formed in the outer peripheral surface of the spline hole 14 are set to vary in such a manner that they decrease as they go inwardly in the axial direction thereof.

And, the spline shaft 17 is inserted into the spline hole 14 while the male spline portion 47a is spline engaged with the female spline portion 48a, whereby, in a state where the two spline portions 47a, 48a are fitted with each other with an interference between them, the flat face 93 of the retaining ring 33c secured to the securing groove 32 of the spline shaft 17 is contacted with the securing stepped portion 35. In this state, the retaining ring 33c bites in a wedge-like manner into between the securing stepped portion 35 and the outer surface of the securing groove 32 to thereby prevent the spline shaft 17 from shifting in a direction to slip out of the spline hole 14. The inclination angle $\alpha$ of the inclined surface 94, similarly to the previously described third embodiment, is restricted to a value, for example, in the range of 15–20° so that the friction force can exceed a pull-out-direction force applied to the spline shaft 17; and, therefore, the inner peripheral edge portion of the retaining ring 33c can be surely prevented from slipping out of the securing groove 32.

When constructing the structure according to the present embodiment as well, similarly to the previously described third embodiment, the securing groove 32 is formed on the basis of the male spline portion, and the finish working of the securing stepped portion 35 is executed on the basis of the female spline portion 48a. Accordingly, as described above, in a state where the two spline portions 47a, 48a are fitted with each other with no clearance between them, the flat surface 93 of the retaining ring 33c secured to the securing groove 32 of the spline shaft 17 can be contacted with the securing stepped portion 35. And, not only there can be prevented for a long period of time the occurrence of teeth striking sounds in a spline engaged portion 49b composed of the male spline portion 47a formed in the outer peripheral surface of the spline shaft 17 and the female spline portion 48a formed in the inner peripheral surface of the spline hole 14, but also male and female spline teeth constituting the spline engaged portion 49a can be enhanced in durability.

Figure 21:
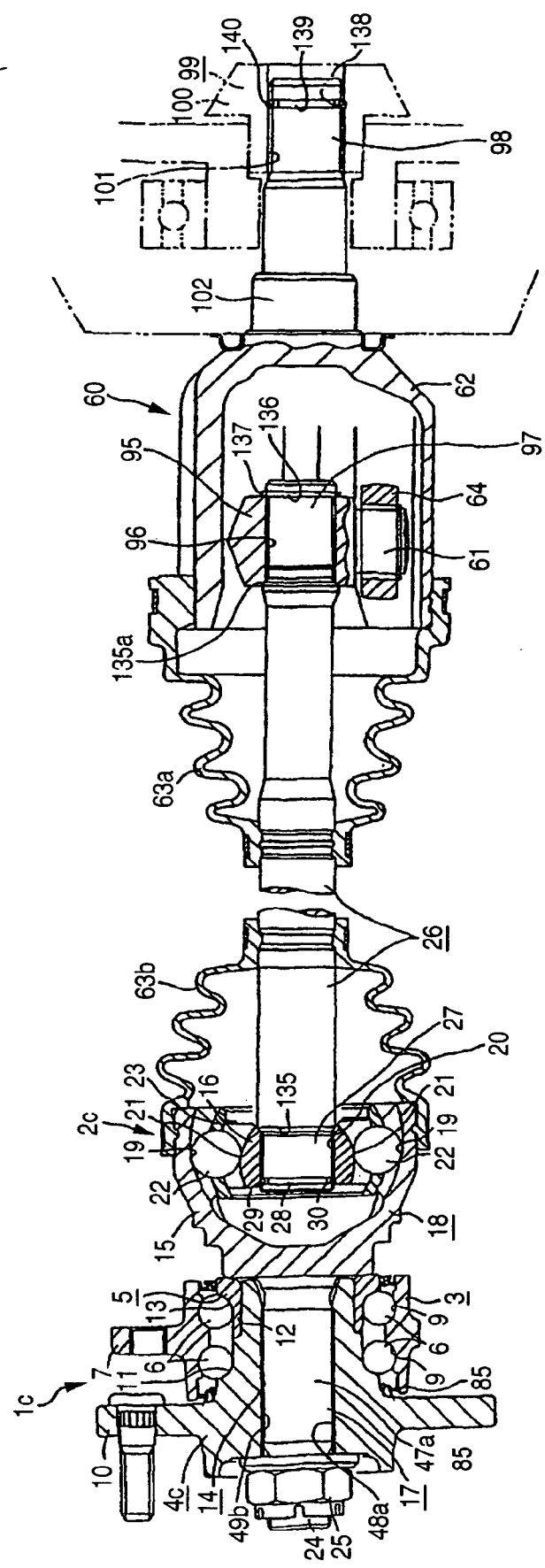
FIG. 21 is a partially omitted section view of a seventh embodiment of a wheel-driving unit according to the invention.
Figure 22:
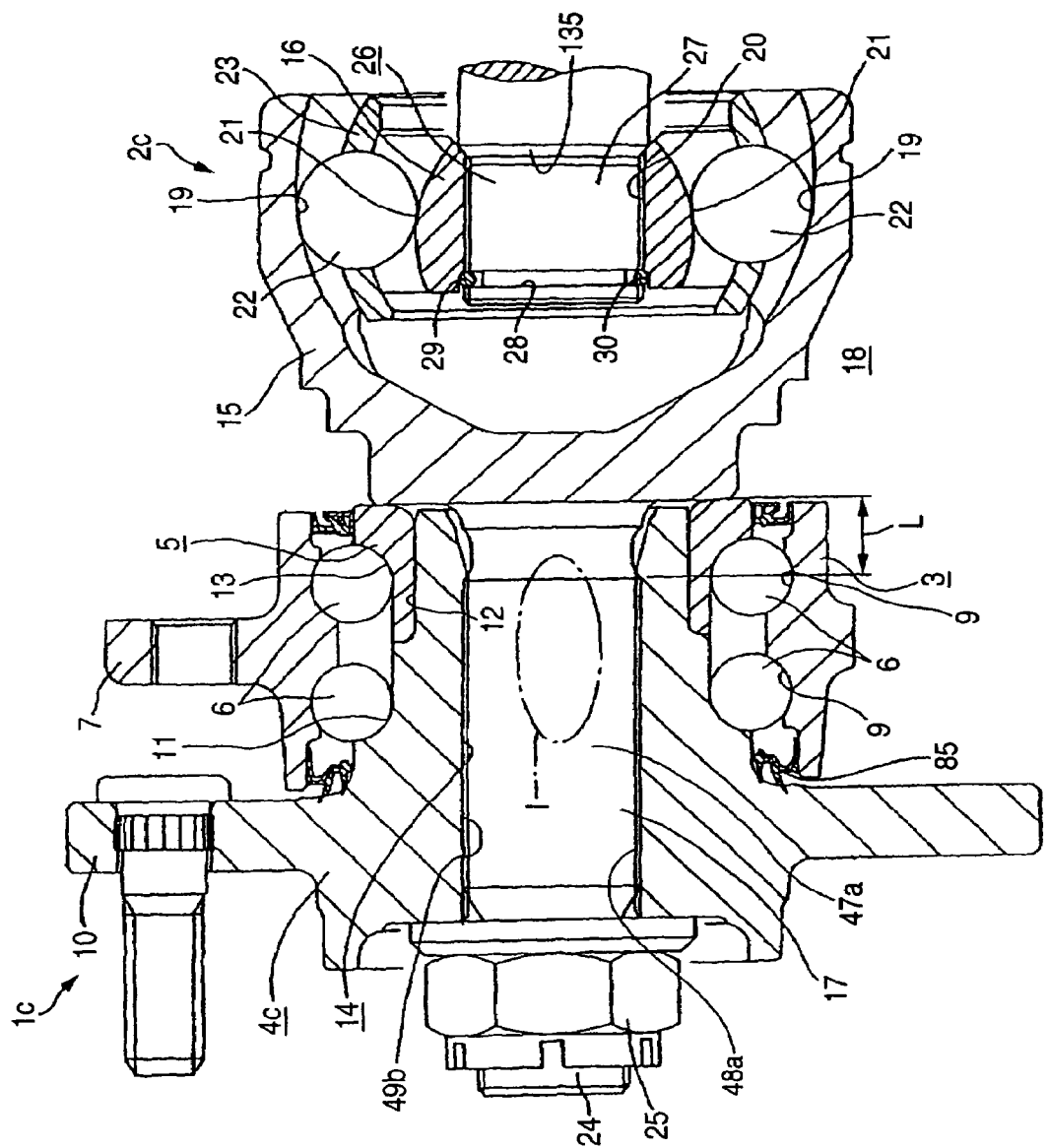
FIG. 22 is an enlarged view of the left section of FIG. 21.
Figure 23:
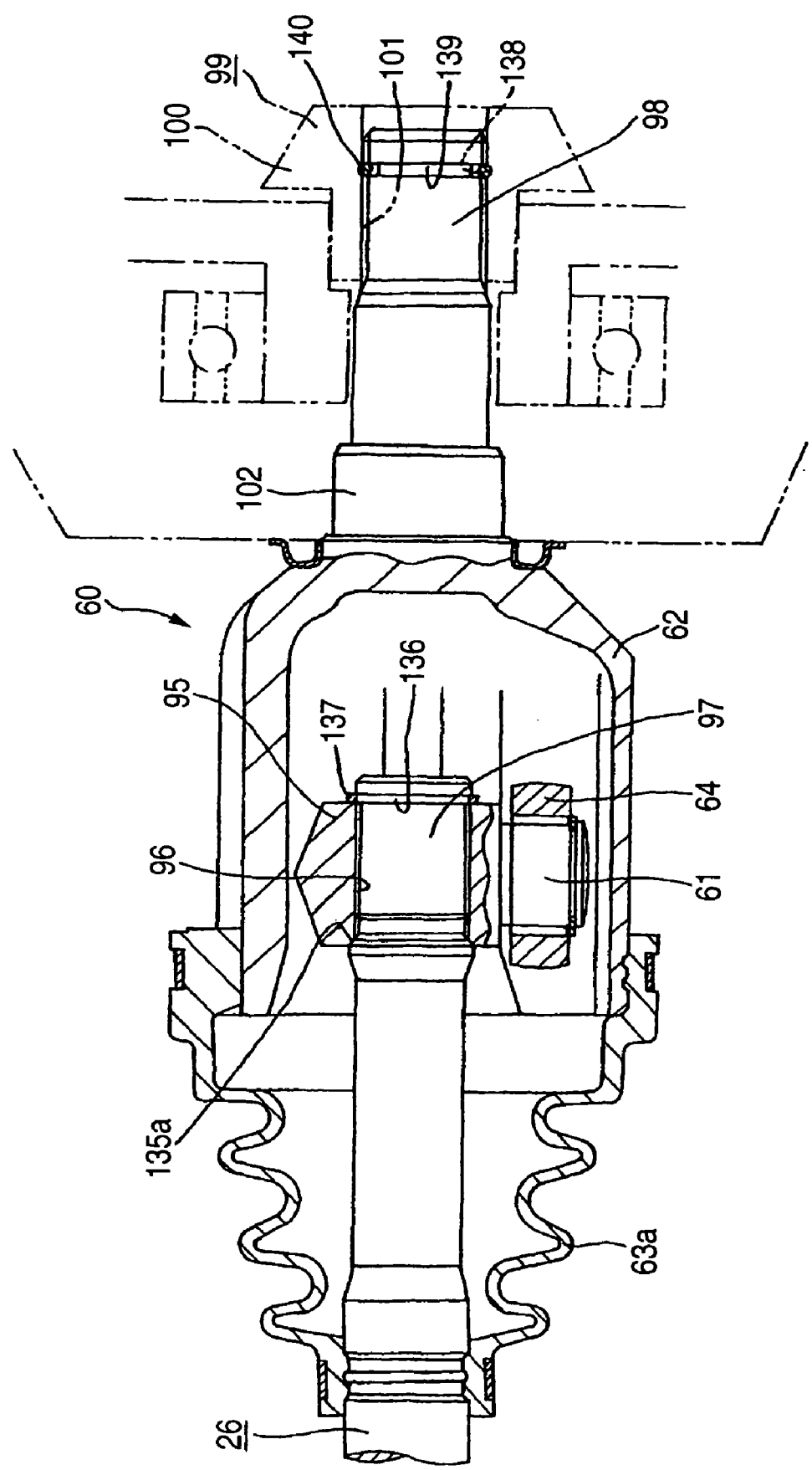
FIG. 23 is an enlarged view of the right section of FIG. 21.

Next, FIGS. 21–23 show a seventh embodiment of a wheel-driving unit according to a fourth aspect of the invention. By the way, the characteristic point of the present embodiment lies in the structure of a spline engaged portion disposed so as to construct the following four connecting portions in such a manner that they are able to transmit the rotation power: that is, specifically, a connecting portion between the output portion of a differential gear and the input portion of a tripod-type constant velocity joint 60 which is a differential-gear-side constant velocity joint; a connecting portion between the output portion of the tripod-type constant velocity joint 60 and one end portion of a drive shaft 26; a connecting portion between the other end portion of the drive shaft 26 and the input portion of a wheel-side constant velocity joint 2c; and, a connecting portion between a wheel-side constant velocity joint 2c and a wheel-supporting bearing unit 1c. The remaining structures and operations of the present embodiment are similar to the conventional structure or to the previously described first embodiment of the invention shown in FIGS. 1–5. Therefore, the duplicate description of the equivalent parts thereof are omitted or simplified and thus description will be given below mainly of the characteristic portions of the present embodiment.

Firstly, referring to the spline engaged portion 49b between the spline shaft 17, which is the output portion of the wheel-side constant velocity joint 2c, and the spline hole 14 of the hub 4c constituting the wheel-supporting bearing unit 1c, the spline engaged portion 49b, basically, is similar to the previously described third embodiment of the invention shown in FIGS. 8–14. However, in the case of the present embodiment, in the leading end portion (outer end portion) of the spline shaft 17, similarly to the previously described first example of the conventional structure shown in FIG. 39, there is formed a male screw portion 24. And, in a state where the spline shaft 17 is inserted into the spline hole 14 until the male screw portion 24 is projected out of the outer end opening of the spline hole 14, a nut 25 is threadedly engaged with the male screw portion 24 and is then tightened further.

In the case of the present embodiment, based on the threaded engagement and tightening of the nut 25, the spline shaft 17 is strongly drawn into the spline hole 14. And, when the spline shaft 17 is drawn into the spline hole 14, unquenched and relatively soft female spline teeth constituting a female spline portion 48a formed in the inner peripheral surface of the spline hole 14 are elastically deformed to thereby allow the spline shaft 17 to shift outwardly in the axial direction thereof. Also, there is further increased the pressure with which the circumferential-direction both-side surfaces of the female spline teeth constituting the female spline portion 48a and the circumferential-direction both-side surfaces of the male spline teeth constituting a male spline portion 47a formed in the outer peripheral surface of the spline shaft 17 are contacted with each other. In this state, the female spline portion 48a and male spline portion 47a are spline engaged with each other with no clearance between them almost over the entire lengths in the axial directions thereof.

As a result of this, even in case where the direction of torque to be transmitted between the wheel-side constant velocity joint 2c and wheel-supporting bearing unit 1c varies, it is possible to prevent occurrence of strange sounds which are caused because the one-side surfaces of the teeth of the male and female teeth are strongly butted against each other. Also, since the torsional deformation amount of the spline shaft 17 can be controlled down to a small amount, it is also possible to prevent occurrence of strange sounds which are caused by mutual rubbing between the inner end face of an inner ring 5 formed in the inner end portion of the wheel-supporting bearing unit 1c and the outer end face of an outer ring 15 for a constant velocity joint constituting the drive member 18. That is, since the female spline portion 48a and male spline portion 47a are spline engaged with each other with no clearance between them almost over the entire lengths in the axial directions thereof, when the direction of the above-mentioned torque varies, the torsional deformation length of the spline shaft 17 provides a length ranging from the inner end of the spline engaged portion 49b to the outer end face of the outer ring 15 for a constant velocity joint, that is, the length L shown in FIG. 22. And, because the torsional deformation amount in the L portion is very small, the mutual rubbing length between the inner end face of the spline engaged portion 49b and the outer end face of the outer ring 15 for a constant velocity joint is short, which can prevent occurrence of strange sounds caused by the mutual rubbing between these two end faces.

Figure 24:
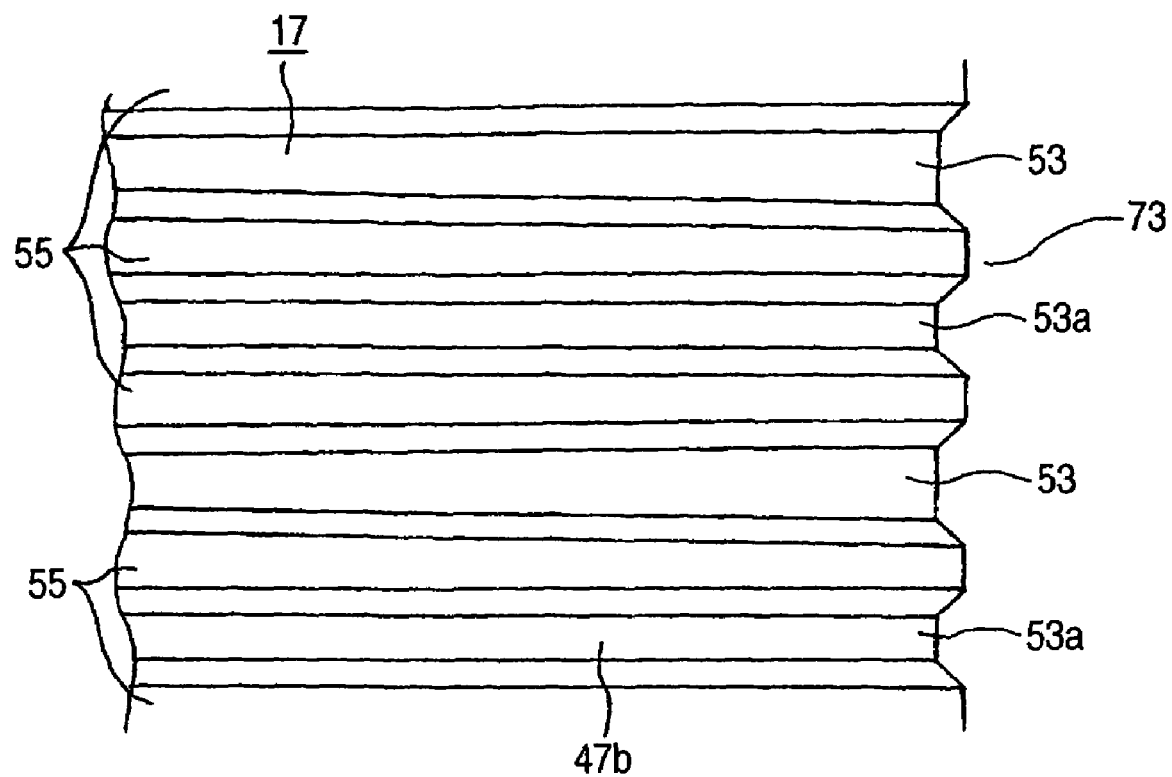
FIG. 24 is an enlarged view of the I portion shown in FIG. 22, showing a second embodiment of the shape of a male spline portion.

By the way, the foregoing description has been given on the assumption that the circumferential-direction both-side surfaces of all female spline teeth constituting the female spline portion 48a and the circumferential-direction both side surfaces of all male spline teeth constituting the male spline portion 47a are both inclined. On the other hand, as shown in FIG. 24, the male spline teeth 53, 53a constituting the male spline portion 47b can also be composed of even number of teeth; and, the male spline teeth 53, 53 the circumferential-direction both-side surfaces of which are inclined, and the male spline teeth 53a, 53a the circumferential-direction both-side surfaces of which are not inclined can be arranged alternately with respect to the circumferential direction of the male spline portion 47b. This similarly apply in the case of the female spline portion 48a. Employment of such shape, in the strong insertion of the spline shaft 17 into the spline hole 14 (see FIGS. 21 and 22), can secure escape portions respectively for the variable thicknesses of plastically or elastically deformed teeth, thereby being able to prevent a force necessary of the inserting operation of the spline shaft 17 from increasing excessively. Also, both of the side surfaces of the female spline teeth constituting the female spline portion 48a and the side surfaces of the male spline teeth constituting the male spline portion 47a may not be inclined, but one of them may be inclined. The point is that, as the male and female spline portions 47a, 48a are spline engaged with each other, the both-side surfaces of the female spline teeth constituting the female spline portion 48a and the both-side surfaces of the male spline teeth constituting the male spline portion 47a can be contacted with each other with no clearance between them almost over the entire lengths thereof in accordance with the deformation of one or both of the teeth thereof.

Also, the foregoing description has been given of the spline engaged portion between the spline shaft 17, which is the output portion of the wheel-side constant velocity joint 2c, and the spline hole 14 of the hub 4c which is a mating member. However, such spline engaged portion can also be enforced similarly in the input portion of the wheel-side constant velocity joint 2c as well as in the output portion and input portion of the tripod-type constant velocity joint 60.

Of them, in the case of the inner ring 16 for a constant velocity joint which is the input portion of the wheel-side constant velocity joint 2c, as shown in FIGS. 21 and 22, a second spline hole 20 formed in the inner peripheral surface of the inner ring 16 is spline engaged with a male spline portion 27 formed in the outer end portion of its mating member, that is, the drive shaft 26, whereby torque can be freely transmitted between the inner ring 16 and drive shaft 26. When the invention is applied to this portion, at least one of the circumferential-direction both-side surfaces of teeth constituting a female spline portion formed in the inner peripheral surface of the second spline hole 20 and the circumferential-direction both-side surfaces of teeth constituting the male spline portion 27 are inclined. The inner end face of the inner ring 16 for a constant velocity joint is contacted with or is disposed adjacent and opposed to a stepped portion 135 formed in the near-to-outer-end portion of the outer peripheral surface of the drive shaft 26. By the way, the operation for spline engagement of the male spline portion 27 with the second spline hole 20 is carried out by a manufacturer who assembles a constant velocity joint, using a machine. Therefore, even in case where the force necessary to pressure insert the male spline portion 27 into the second spline hole 20 increases to some degree, the constant velocity joint can be assembled positively.

Also, the output portion of the tripod-type constant velocity joint 60 is formed as a boss portion 95; and, as shown in FIGS. 21 and 23, a spline hole 96 formed in the inner peripheral surface of the boss portion 95 is spline engaged with a male spline portion 97 formed in the inner end portion of the drive shaft 26 which is a mating member of the joint 60, whereby the boss portion 95 can be connected to the drive shaft 26 in such a manner that torque can be transmitted between them. When the invention is applied to this portion, at least one of the circumferential-direction both-side surfaces of female spline teeth constituting a female spline portion formed in the inner peripheral surface of the spline hole 96 and the circumferential-direction both-side surfaces of male spline teeth constituting the male spline portion 97 are inclined. The outer end face of the boss portion 95 is contacted with or is disposed adjacent and opposed to a stepped portion 135a formed in the near-to-inner-end portion of the outer peripheral surface of the drive shaft 26. And, a retaining ring 137 is secured to a securing groove 136 formed in the inner end portion of the drive shaft 26. By the way, the operation to spline engage the male spline portion 97 of the inner end portion of the drive shaft 26 with the spline hole 96 is carried out by a manufacturer who assembles a constant velocity joint, using a machine. Therefore, even in case where the force necessary for pressure insertion of the inner-end-side male spline portion 97 into the second spline hole 96 increases to some degree, the constant velocity joint can be assembled positively.

Further, as the input portion of the tripod-type constant velocity joint 60, there is used a connecting shaft 102; and, as shown in FIGS. 21 and 23, a male spline portion 98 formed in the outer peripheral surface of the connecting shaft 102 is spline engaged with a spline hole 101 formed in the central portion of an output gear 100 of a differential gear 99 which is a mating member of the connecting shaft 102, whereby the connecting shaft 102 can be connected to the output gear 100 in such a manner that torque can be transmitted between them. And, a retaining ring 140 is bridgingly interposed between a securing groove 138 formed in the inner peripheral surface of the output gear 100 and a securing groove 139 formed in the outer peripheral surface of the connecting shaft 102, thereby preventing the two members 102, 100 from being separated from each other. When the invention is applied to this portion, at least one of the circumferential-direction both-side surfaces of male spline teeth constituting the male spline portion 98 and the circumferential-direction both-side surfaces of female spline teeth constituting a female spline portion formed in the inner peripheral surface of the spline hole 101 are inclined. By the way, since the operation to spline engage the connecting shaft 102 with the output gear 100 is carried out using a machine, even in case the force necessary to pressure insert the male spline portion 98 into the spline hole 101 increases to some degree, the constant velocity joint can be assembled positively.

Figure 25:
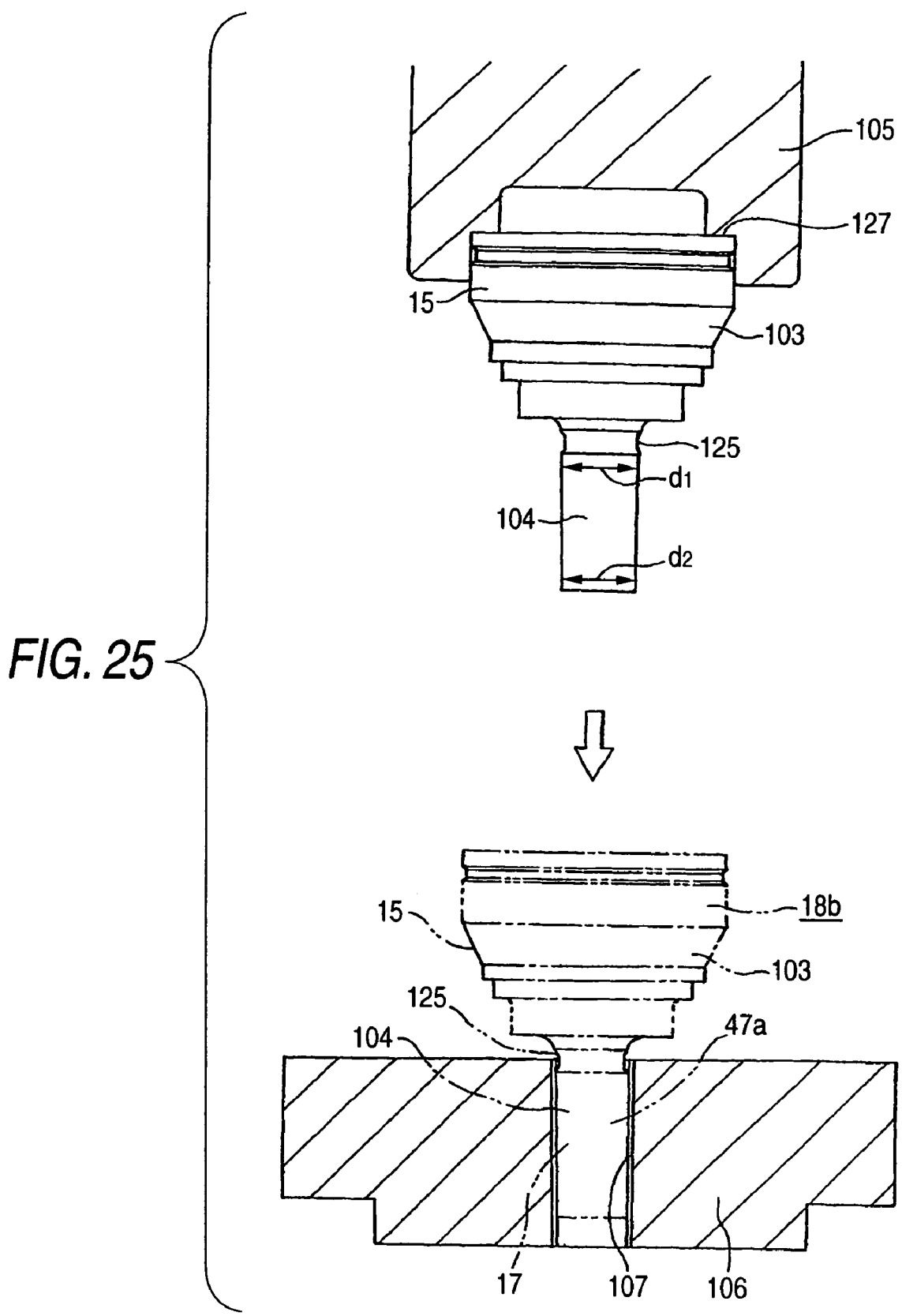
FIG. 25 is a section view of an eighth embodiment of a wheel-driving unit according to the invention, showing how to form a male spline tooth in the outer peripheral surface of a taper shaft to thereby provide a spline shaft.
Figure 26:
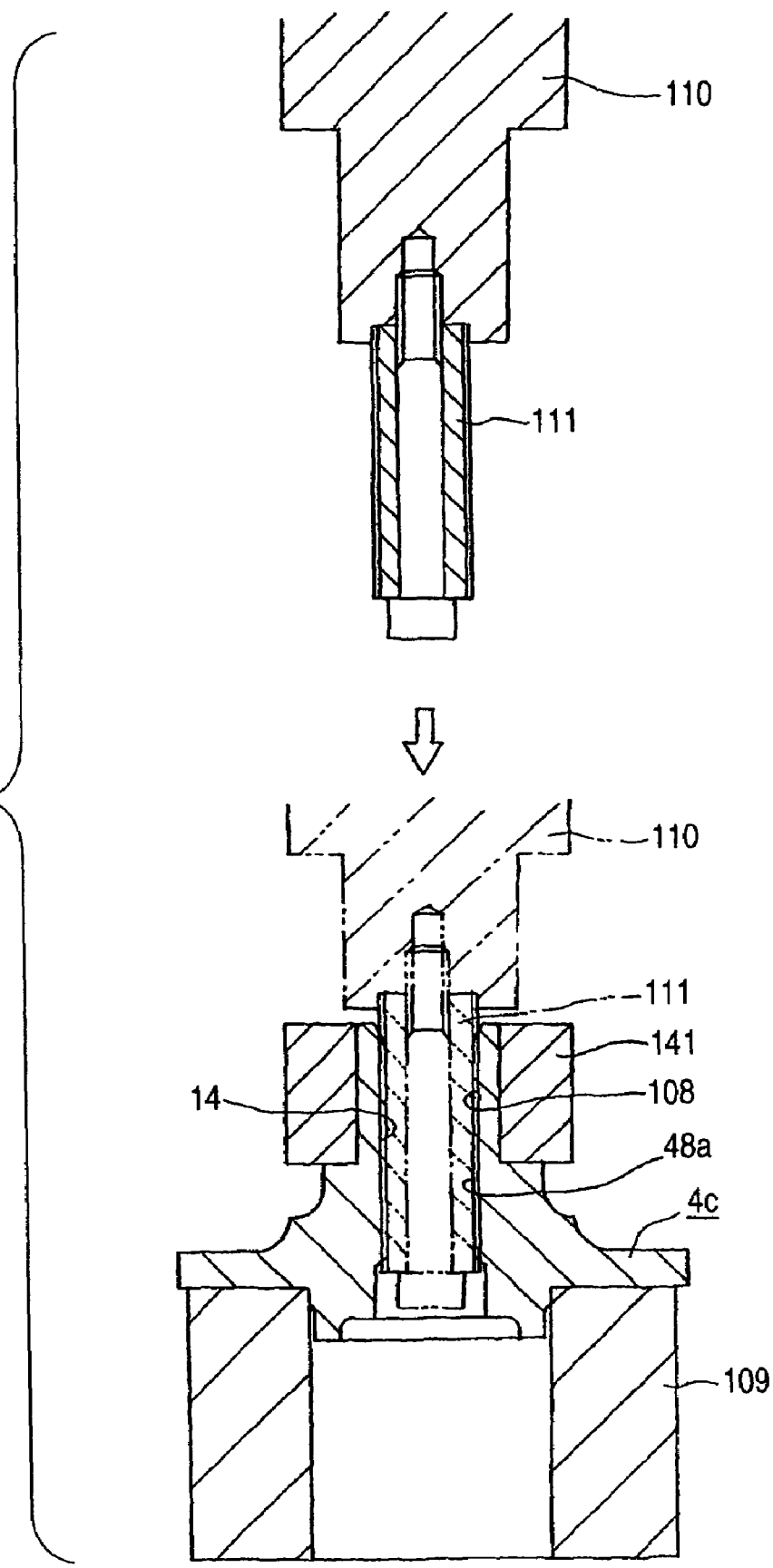
FIG. 26 is a section view of the eighth embodiment, showing how to form a female spline tooth in the inner peripheral surface of a blank hole to thereby provide a spline hole.

Next, FIGS. 25 and 26 show an eighth embodiment of a wheel-driving unit according to a fifth aspect of the invention. As has been described in the previously discussed respective embodiments, the both-side surfaces of the male and female spline teeth are inclined in the axial direction, while the angle of such inclination is set in consideration of not only the axial-direction positioning accuracy between the spline shaft 17 and spline hole 14 but also the workability of the male and female spline teeth. That is, as the inclination angle increases, the positioning accuracy can be enhanced, which can facilitate the arrangement of the retaining ring 33, 33b, 33c between the first engaging portion such as the securing stepped portion 35, 35a, 35b and the second engaging portion such as the securing groove 32, 32a. On the other hand, when the inclination angle is large, it is difficult to form the male and female spline teeth by pressing. In case where the male and female spline teeth are formed by other working methods, the degree of freedom of the inclination angle can be enhanced but, when the working cost is taken into account, it is preferred that the male and female spline teeth are worked by pressing. When taking these things into consideration, preferably, the inclination angle may be set in the range of 0.75–1.25° (in the case of a taper angle, which is an angle formed between the both-side surfaces of the male and female spline teeth, it may be set in the range of 1.5–2.5°).

Also, the axial-direction length of the spline shaft 17 and spline hole 14 is set in consideration of not only the durability thereof but also the workability of the male and female spline teeth. That is, as the present axial-direction length increases, in the torque transmission between the spline shaft 17 and spline hole 14, there can be reduced the surface pressure that is applied to the contact portion between the side surfaces of the male and female spline teeth, thereby being able to facilitate the securing of the durability of the spline shaft 17 and spline hole 14. On the other hand, when the axial-direction length is large, it is difficult to form the male and female spline teeth by pressing. When these things are taken into account, preferably, the axial-direction length may be set in the range of 20–35 mm.

In case where the inclination angle of the male and female spline teeth respectively constituting the spline shaft 17 and spline hole 14 as well as the axial-direction length of the spline shaft 17 and spline hole 14 are regulated in the above-mentioned manner, the module of the spline shaft 17 and spline hole 14 is set in the range of 1.25–1.75 to thereby prevent the thicknesses of the male and female spline teeth from differing excessively in the axial-direction two ends thereof. That is, since the both-side surfaces of these spline teeth are inclined with respect to the axial direction, even in the smallest width portion, when the securement of sufficient strength is taken into account, the width of the widest portion becomes larger than necessary, which results in a badly-balanced design. In view of this, as described above, by employing a value larger than 1 which is the value of the module that is generally used in the case of a normal parallel spline, the ratio of widths between the axial-direction two end portions of the spline teeth is controlled down to 2.0 or less, thereby being able to provide a well-balanced design.

Now, description will be given below of a method for forming the male and female spline teeth of the male spline portion 47a (for example, see FIGS. 8–10) and female spline portion 48a (for example, see FIGS. 8, 11, 12, 13) having the above-mentioned specifications by pressing.

Firstly, description will be given below of a method for working the spline shaft 17 including the male spline portion 47a in the outer peripheral surface thereof with reference to FIG. 25. To produce a portion which is to be formed into the spline shaft 17, a taper shaft 104 is formed by cutting the outer end portion of a blank member 103 constituting the drive member 18b using a lathe.

This taper shaft 104 has a truncated cone shape in which the outside diameter $d_1$ of the inner end portion (in FIG. 25, the upper end portion) thereof is larger than the outside diameter $d_2$ of the outer end portion (in FIG. 25, the lower end portion) thereof (that is, $d_1 > d_2$). By the way, the operation to decide these outside diameters $d_1$, $d_2$ is executed in the following manner. That is, the diameter dimensions of circles, which not only form the sections of the taper shaft 104 at right angles to the spline shaft 17 after the male spline teeth are (assumed to be) formed in the male spline portion 47a but also are equal in section area to the spline shaft 17, are found in the axial-direction two end portions of the taper shaft 104; and, the values of the thus found diameter dimensions are considered as the above outside diameters $d_1$, $d_2$. The blank member 103 including the thus structured taper shaft 104, in a state where a portion thereof to be formed into an outer ring 15 for a constant velocity joint is gripped by a pushing jig 105, is disposed opposed to a die 106 which is used to form the male spline portion 47a.

This die 106 is made of sintered high speed steel which is produced by sintering the ultra fine particles of carbide tissues according to a powder metallurgy method; and, the die 106 includes a working hole 107. In the inner peripheral surface of the working hole 107, there are formed a plurality of projecting strips such as female spline teeth the widths of which vary in such a manner that they increase gradually as they go toward the axial-direction outer ends thereof. However, the inside diameter of the working hole 107, except for the chamfered portions thereof that are formed in the two-end openings thereof, unvary with respect to the axial direction thereof. In the case of the present embodiment, the section shape of each of the projecting strips is formed as an involute tooth. Also, a hard film made of TiC or TiN is coated on the inner peripheral surface of each projecting strip including the front surface thereof according to a formed evaporation method using electronic beam evaporation, that is, according to an ARE (Activated Reactive Evaporation) method, thereby enhancing the wear resistance of the present inner peripheral surface.

In a state where the blank member 103 is gripped by the pushing jig 105 as well as the taper shaft 104 and working hole 107 are held concentrically with each other, in case where the pushing jig 105 is made to approach the die 106 and the taper shaft 104 is pushed into the working hole 107, the shape of the inner peripheral surface of the working hole 107 can be transferred to the outer peripheral surface of the taper shaft 104. That is, with the thus executed pushing operation, the male spline portion 47a is formed in the outer peripheral surface of the taper shaft 104 to thereby form the spline shaft 17 the outside diameter of which does not vary with respect to the axial direction thereof. Of course, in this state, in the outer peripheral surface of the spline shaft 17, there are formed the above-mentioned male spline teeth the widths of which increase as they go toward the inner end portions thereof. A heat treatment such as a high frequency quenching treatment is enforced on the thus structured male spline portion 47a to thereby harden the surface thereof.

Next, description will be given below of a method for working the spline hole 14 with reference to FIG. 26. Prior to formation of the spline hole 14, in such portion of the central portion of the hub 4c as to be worked for formation of the spline portion 14, there is formed a blank hole 108, namely, a conically-cylindrical-shaped taper hole in which the inside diameter of the inner end (in FIG. 26, the upper end) side thereof is larger than the inside diameter of the outer end (in FIG. 26, the lower end) side thereof. The manner of finding the inside diameter of the blank hole 108 is similar to the taper shaft 104 for the above-mentioned blank member 103, except that, in the case of the blank hole 108, the inside diameter is found and, in the case of the blank member 103, the outside diameter is found. The hub 4c with such blank hole 108 formed therein, while it is supported on a support jig 109, is disposed opposed to a punch 111 which is supported on a ram 110 constituting a press working machine.

The punch 111 is made of sintered high speed steel which is similar to the die 106. In the outer peripheral surface of the punch 111, there are formed a plurality of projecting strips such as male spline teeth the widths of which vary so as to increase gradually as they go toward the axial-direction inner ends thereof. However, the outside diameter of the punch 111 does not vary in the axial direction thereof, except for the chamfered portions formed in the two end portions thereof. In the case of the present embodiment, the section shape of each of the projecting strips is an involute tooth. Also, the outer peripheral surfaces of the respective projecting strips including the front surfaces thereof, similarly to the inner peripheral surface of the working hole 107 of the die 106, are coated with hard thick films formed of TiC or TiN, so that the present outer peripheral surfaces are enhanced in wear resistance.

In a state where the hub 4c is supported by the support jig 109 as well as the blank hole 108 and punch 111 are held concentric with each other, in case where the ram 110 is moved near to the support jig 109 and the punch 111 is pushed into the blank hole 108, the shape of the outer peripheral surface of the punch 111 can be transferred to the inner peripheral surface of the blank hole 108. That is, with the thus executed push-in operation, the female spline portion 48a is formed in the inner peripheral surface of the blank hole 108, thereby forming the spline hole 14 the outside diameter of which does not vary in the axial direction thereof. Of course, in this state, in the inner peripheral surface of the blank hole 108, there are formed the above-mentioned female spline teeth the widths of which decrease as they go toward the inner end portions thereof. No heat treatment such as a high frequency quenching treatment is enforced on the thus formed female spline portion 48a, so that the surface of the female spline portion 48a remains soft. The reason why only the male spline portion 47a is quenched is that, as the spline shaft 17 is pushed into the spline hole 14, the side surfaces of the male and female spline teeth can be closely contacted with each other more easily and, when the present embodiment is in use, the teeth of the male and female spline portions 47a, 48a can be prevented from being cracked.

By the way, a circular ring 141, which is fitted with the outside of the cylindrical surface of the inner end side of the hub 4c, is used to prevent the hub 4c from expanding outwardly in the diameter direction thereof during the working of the female spline portion 48a. In the illustrated embodiment, the circular ring 141 is fitted only with the inner end side of the hub 4c; however, preferably, a circular ring having such an inner peripheral surface shape as to be able to hold the outer peripheral surface of the hub 4c may be fitted with the outer surface of the hub 4c over the entire length of the portion of the hub 4c where the female spline portion 48a is to be formed.

Now, a constant velocity joint 2c incorporating therein the drive member 18b with the above formed spline shaft 17 and a wheel-supporting bearing unit 1c incorporating therein the hub 4c with the above formed spline hole 14 are connected to each other, similarly, for example, to the previously described third embodiment of the invention shown in FIGS. 8–14. And, in the case of the present embodiment as well, not only it is possible to prevent occurrence of the above-mentioned teeth striking sounds while the car is running, but also the durability of the spline teeth of the male and female spline portions 47a, 48a can be enhanced.

Figure 27:
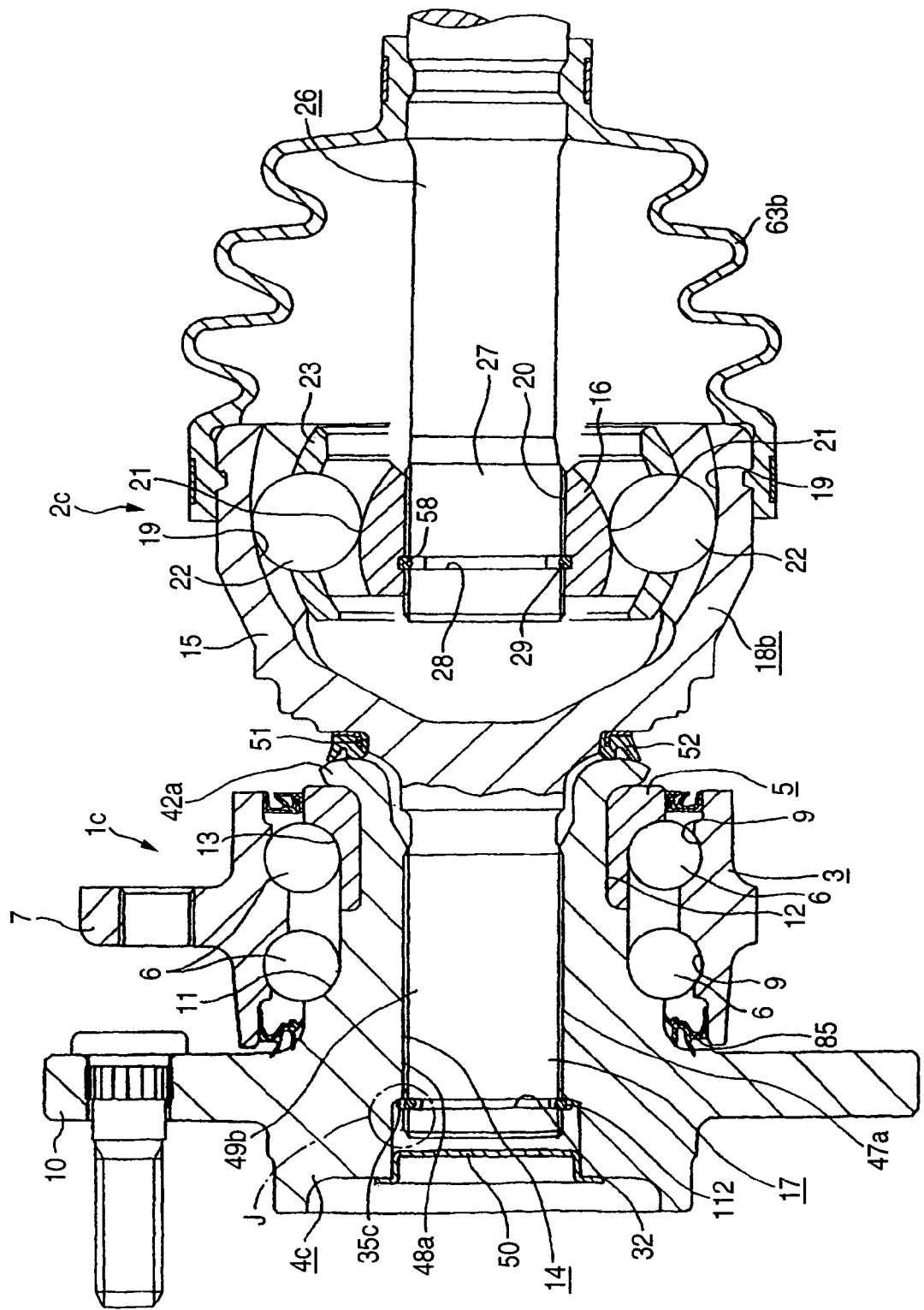
FIG. 27 is a section view of a ninth embodiment of a wheel-driving unit according to the invention.
Figure 28:
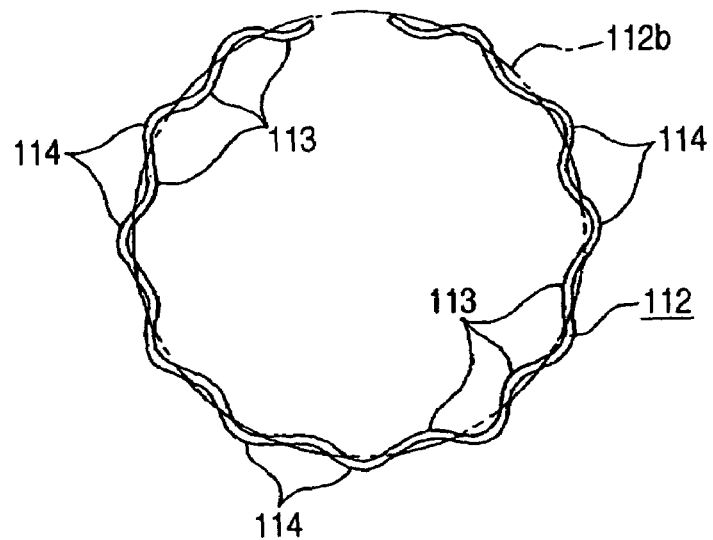
FIG. 28 is a view seen from laterally of FIG. 27 with a retaining ring taken out therefrom.
Figure 29:
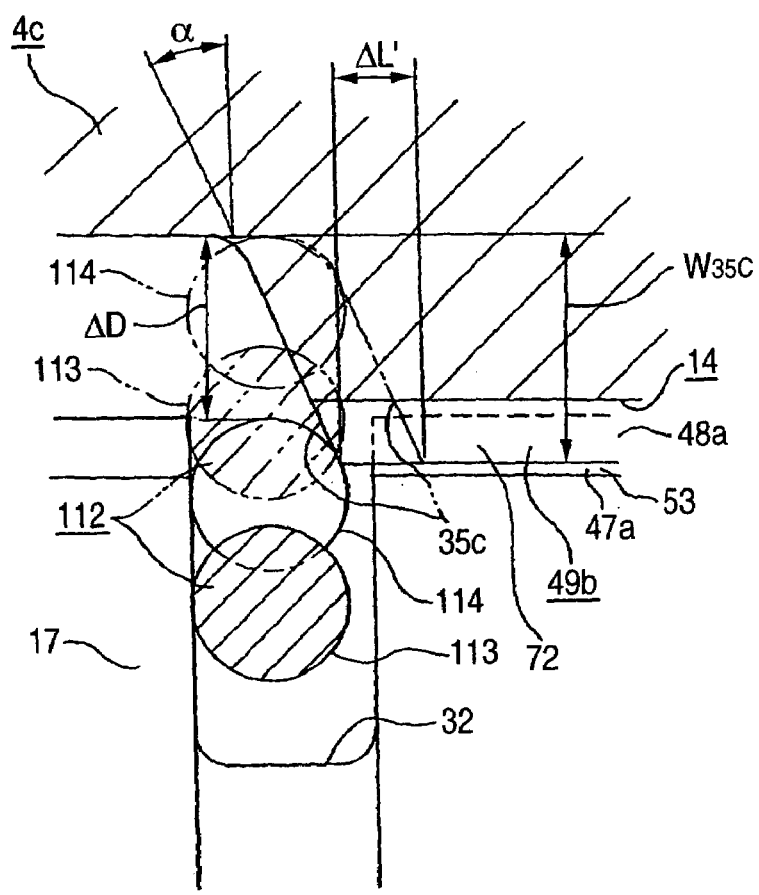
FIG. 29 is an enlarged view of the J portion shown in FIG. 27.

Next, FIGS. 27–29 show a ninth embodiment of a wheel-driving unit according to a sixth aspect of the invention. According to the present embodiment, there is provided a structure that, even in case where the dimensions and shapes of the composing parts thereof are not worked with high accuracy, the male and female spline portions 47a, 48a can be prevented from shifting in the axial direction thereof with respect to each other, that is, the spline engaged portion 49b can be prevented against shaky motion. For example, in the case of the previously described third embodiment shown in FIGS. 8–14, the dimensions and shapes of the composing parts thereof must be worked with high accuracy, for example, in the above-mentioned manner as shown in FIGS. 15 and 16. In case where the working accuracy is poor, in a state where the wheel-supporting bearing unit 1c and constant velocity joint 2c are connected together, as in the previously described FIG. 14, it is difficult to bring the incomplete-ring-shaped retaining ring 33b secured to the securing groove 32 formed in the constant velocity joint 2c into contact with the diameter-direction middle portion of the securing stepped portion 35b formed in the wheel-supporting bearing unit 1c.

Figure 30:
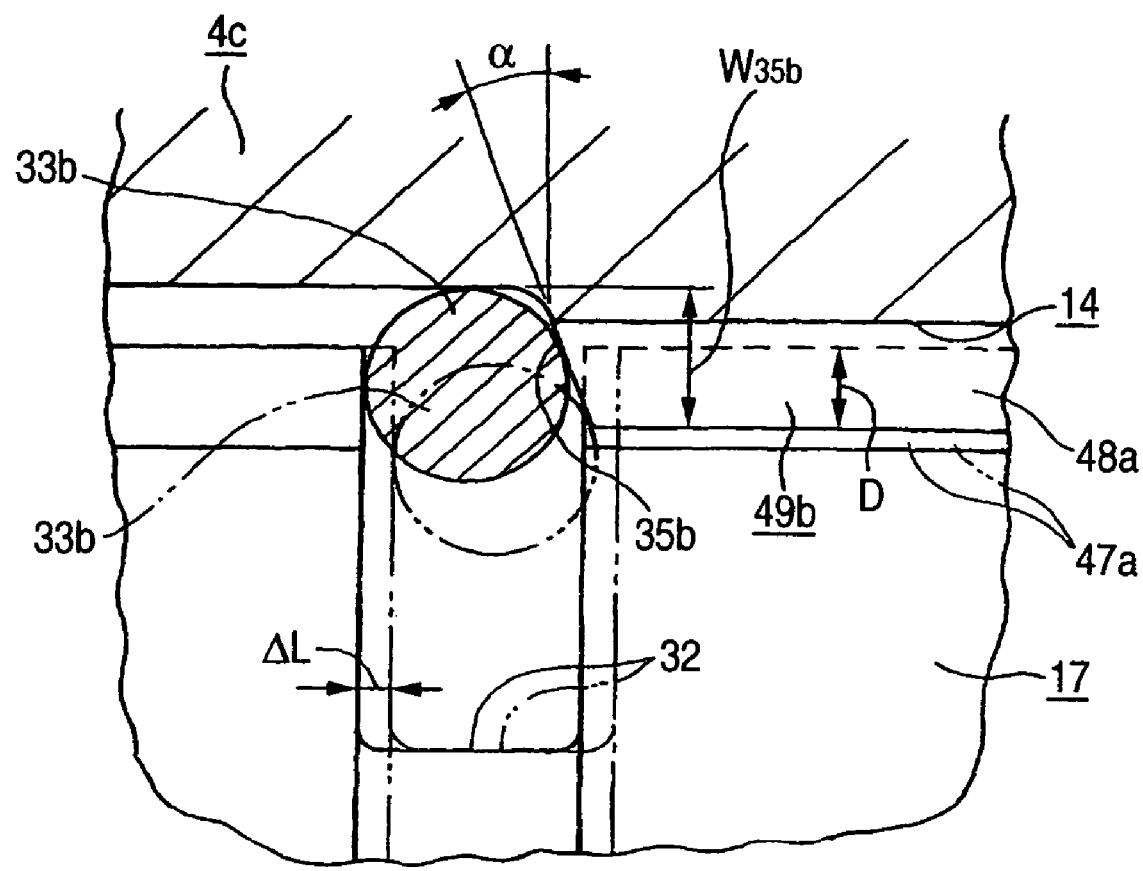
FIG. 30 is a view similar to FIG. 29, explaining the reason why an error in the shape dimension gives rise to the shaky motion.

That is, the securing stepped portion 35b, as previously described in the third embodiment of the invention, is inclined by the angle α with respect to a virtual plane existing at right angles to the center axis of the hub 4c. And, in case where, in a state where the side surfaces of the male and female spline teeth of the male and female spline portions 47a, 48a are closely contacted with each other, due to the existence of the inclination angle α, the retaining ring 33b, as shown in FIG. 14, bites into between the securing stepped portion 35b and the inner surface of the securing groove 32 in a wedge-like manner, the above-mentioned axial-direction shifting can be prevented. In other words, in order for the retaining ring 33b to be able to positively connect together the wheel-supporting bearing unit 1c and constant velocity joint 2c, as shown by a chained line in FIG. 30, part of the retaining ring 33b must be positively contacted not with the inner peripheral edge of the securing stepped portion 35b but with the portion of the securing stepped portion 35b that is situated more outwardly in the diameter direction thereof than the present inner peripheral edge.

The reason for this is as follows: that is, in case where the retaining ring 33b is not contacted with the above-mentioned portion of the securing stepped portion 35b but is contacted with the edge of the inner peripheral edge portion of the securing stepped portion 35b, the direction of a load vector applied from the contact portion onto the retaining ring 33b is different from that of the normal contact state, thereby increasing a load component which goes inwardly in the radial direction to reduce the diameter of the retaining ring 33b. And, in case where the retaining ring 33b is reduced in diameter due to this load component and is then inserted into the bottom of the securing groove 32, there is a possibility that the spline shaft 17 can slip out of the spline hole 14. On the other hand, as shown by a solid line in FIG. 30, in a state where the outer peripheral edge of the retaining ring 33b is contacted with the inner peripheral surface of the cylindrical surface portion existing outwardly of the spline hole 14, in order to be able to prevent occurrence of the above-mentioned axial-direction shifting, in this state, the surface of the retaining ring 33b must be contacted with both of the securing stepped portion 35b and the inner surface of the securing groove 32. Therefore, the allowable value of an error in the axial-direction position relationship between the hub 4c and spline shaft 17 in a state where the side surfaces of the male and female spline teeth are closely contacted with each other is only δL shown in FIG. 30.

To increase the δL so as to be able to ensure the above-mentioned wedge-like biting of the retaining ring 33b regardless of the dimensional errors and shape errors of the composing parts, it is necessary to increase a width dimension $W_{35b}$ in the diameter direction of the securing stepped portion 35b or to increase the above-mentioned inclination angle α. In the case of the inclination angle α being increased, there is a limit to the size of the diameter of the retaining ring 33b: that is, even when there is applied a strong force going in a direction to pull the spline shaft 17 out of the spline hole 14, in order to be able to prevent the engagement between the retaining ring 33b and securing stepped portion 35b from being removed and thus to prevent the spline shaft 17 from slipping out of the spline hole 14, the diameter of the retaining ring 33b must be regulated in such a manner that it is prevented from being reduced. For this reason, the angle α, as described above, is generally set at a value in the range of 15–20°.

On the other hand, in the case of the structure according to the previously described third embodiment of the invention shown in FIGS. 8–14, there is also a limit to an increase in the width dimension $W_{35b}$, in view of the fact that the spline shaft 17 must be prevented from slipping out of the spline hole 14. That is, to increase the width dimension $W_{35b}$, it is necessary to reduce the inside diameter of the securing stepped portion 35b or to increase the outside diameter thereof. Also, in order to prevent the spline shaft 17 from slipping out of the spline hole 14, the axial-direction two side edges of the retaining ring 33b must be contacted with not only the side surface of the securing groove 32 but also the securing stepped portion 35b. Therefore, to increase the width dimension $W_{35b}$ simply is not sufficient and thus it is necessary to increase the diameter-direction dimension D of the portion where the male and female spline portions 47a and 48a are spline engaged with each other. In consideration of the fact that the side edge of the retaining ring 33b is contacted not with the inner peripheral edge of the securing stepped portion 35b or the opening peripheral edge portion of the securing groove 32 but with the portion of the securing stepped portion 35b having a linear section shape or with the plane surface portion of the securing groove 32, the allowable value δ L of the error in the axial-direction position relationship between the hub 4c and spline shaft 17 is approximately D×sin α or less (δ L≦D×sin α)). To increase the dimension D is difficult, not only because there is a limit to the dimension of the unit but also because it gives rise to a great increase in the manufacturing costs of the male and female spline portions 47a and 48a.

For example, when there is used an involute tooth having a module of 1.5, in the case of D=1.2 mm and α=150, the value of δ L is approximately 0.31 mm. Thus, in a case where the male and female spline portions 47a and 48a are worked with a general dimension allowance, the axial-direction position shift amount between a hub and a spline shaft (which is hereinafter referred to as a position shift amount) is compared with the δ L. Assuming that the male and female spline portions 47a and 48a are worked while the tooth width of the male and female spline teeth in the axial-direction central portion thereof is 2.353±0.015 mm and the inclination angle of these two spline teeth is at 1°±5', the position shift amount is °0.015/tan(1°–5')=±0.937 mm; and, the difference range between the maximum value and minimum value is approximately 1.9 mm. This value is much greater than 0.31 mm that is the value of the δ L, which shows that it is difficult to prevent the shaky motion in the axial direction. To prevent this shaky motion, the working accuracy may be enhanced so as to reduce the position shift amount, or, the outside and inside engaging portions may be worked according to the method previously described with reference to FIGS. 15 and 16 to thereby reduce the position shift amount down to 0.31 mm or less. In this case, in a state where the side surfaces of the male and female spline teeth are contacted with each other, the retaining ring can be engaged with its mating surface in a normal state, whereby the hub and spline shaft can be assembled in such a manner that occurrence of shaky motion in the axial direction thereof is prevented.

On the other hand, in the case of the present embodiment, even in case where not only the dimensions and shapes of the composing parts thereof are not worked with high accuracy but also the diameter-direction width dimension $W_{35c}$ of a securing stepped portion 35c formed in the middle portion of the inner peripheral surface of a hub 4c is increased so as to prevent the shaky motion of a spline engaged portion 49b, a retaining ring 112 can be positively arranged between the securing stepped portion 35c and a securing groove 32 formed in the outer peripheral surface of the leading end portion of a spline shaft 17. The remaining portions of the present embodiment are similar in structure and operation to the previously described third embodiment of the invention. Therefore, the duplicate description of the equivalent parts is omitted or simplified here and thus description will be given below mainly of the characteristic portions of the present embodiment.

Figure 9:
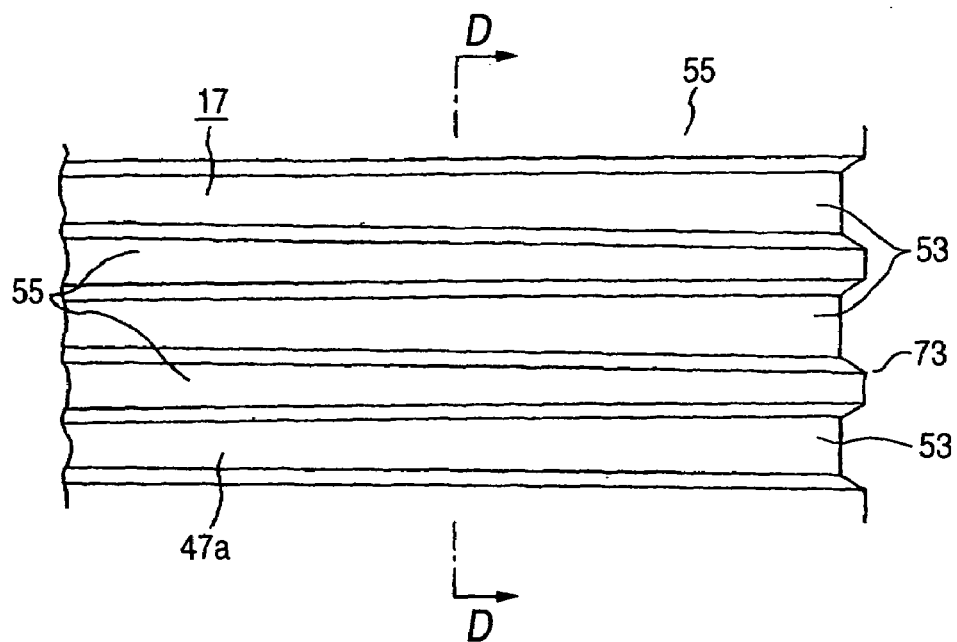
FIG. 9 is an enlarged view of the C portion of FIG. 8, showing the details of a male spline portion.
Figure 10:
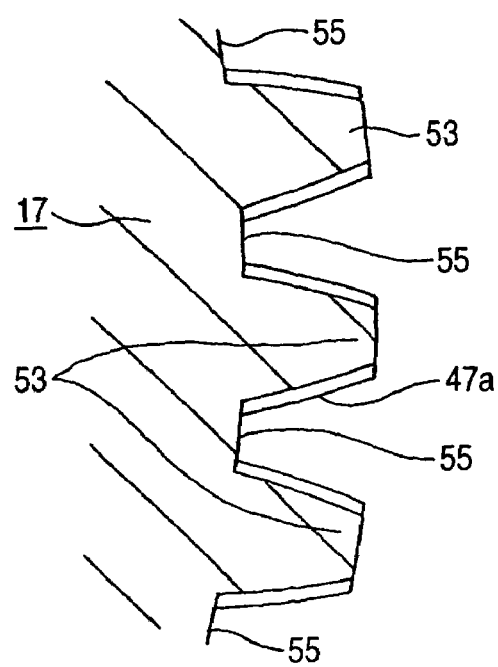
FIG. 10 is a section view taken along the line D—D shown in FIG. 9.
Figure 11:
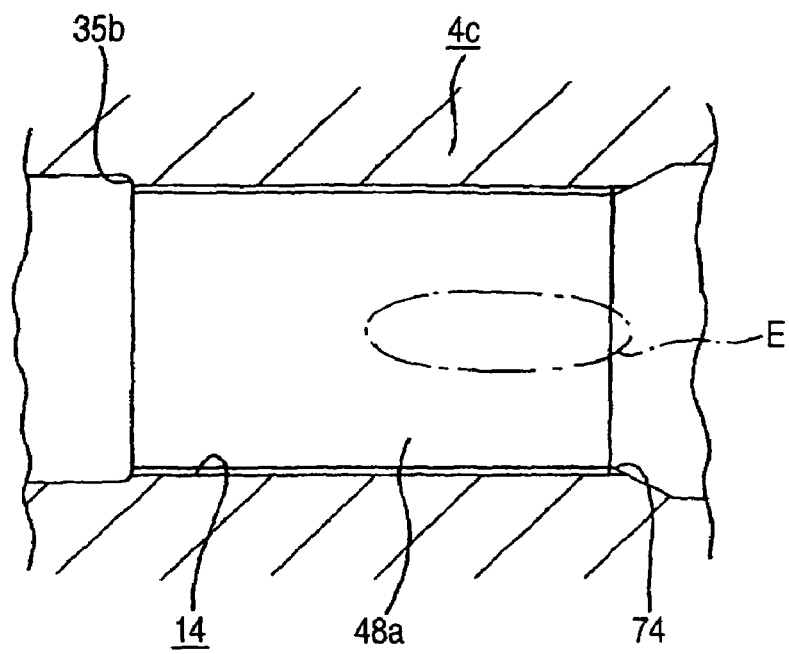
FIG. 11 is a view seen from the same direction as FIG. 8 with a drive member taken out therefrom, showing a female spline portion disposed in the central portion of a hub.
Figure 12:
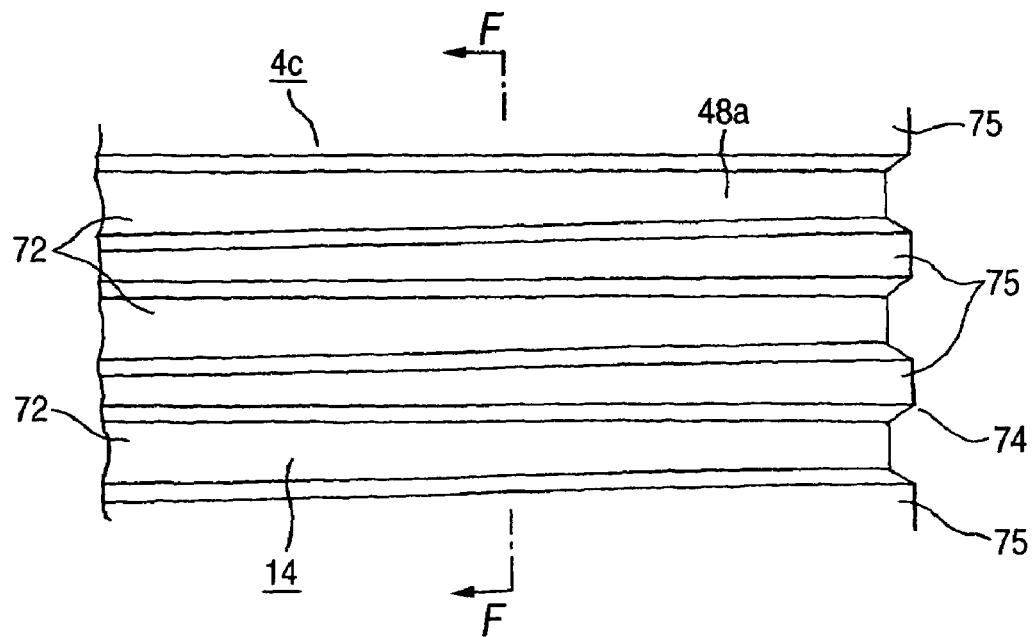
FIG. 12 is an enlarged view of the E portion shown in FIG. 11.
Figure 13:
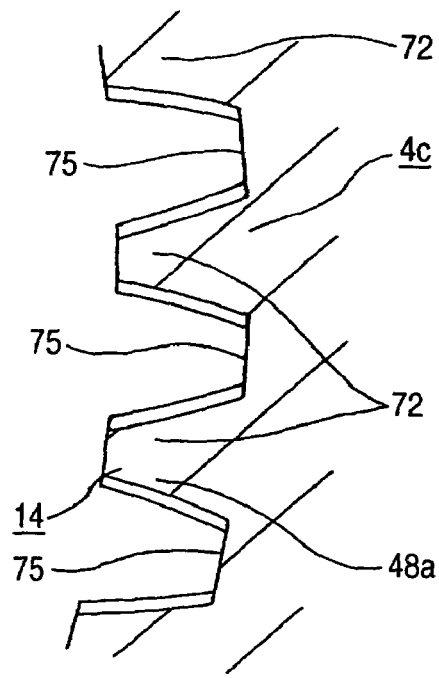
FIG. 13 is a section view taken along the line F—F shown in FIG. 12.

In the case of the present embodiment as well, the male spline teeth 53 of a male spline portion 47a (see FIG. 29), as previously shown in FIGS. 9 and 10, are formed as taper spline teeth the circumferential-direction widths of which increase as they go toward the inner end sides thereof; and, the female spline teeth 72 of a female spline portion 48a (see FIG. 29), as previously shown in FIGS. 12 and 13, are formed as taper spline teeth the circumferential-direction widths of which increase as they go toward the outer end sides thereof. And, the male and female spline portions 47a and 48a can be engaged with each other with no circumferential-direction shaky motion between them as the spline shaft 17 is inserted into the spline hole 14 from the inner end opening thereof.

Especially, in the case of the present embodiment, the diameter-direction width dimension $W_{35c}$ of the securing stepped portion 35c formed in the middle portion of the inner peripheral surface of the hub 4c is set larger than the previously described third embodiment ($W_{35c} > W_{35b}$). And, correspondingly to this, as the retaining ring 112 to be bridgingly interposed between the securing stepped portion 35c and securing groove 32 formed in the outer peripheral surface of the leading end portion of the spline shaft 17 constituting a drive member 18b, there is used a retaining ring the circumferential-direction shape of which, as shown in FIG. 28, is a corrugated shape.

That is, a wire member made of spring steel, which is used to form the retaining ring 112, is alternately curved in the mutually opposite directions at a equal pitch with respect to the diameter direction thereof in a completed state thereof, and is further bent formed into an incomplete circular ring shape, thereby forming a retaining ring 112 having such a shape as shown in FIG. 28. Therefore, the retaining ring 112 includes, in a plurality of circumferential-direction portions of the inner peripheral edge portion thereof, a plurality of inwardly projecting portions 113, 113 projecting more inwardly in the diameter direction thereof than the remaining portions of the present inner peripheral edge portion and, in a plurality of circumferential-direction portions of the outer peripheral edge portion thereof, a plurality of outwardly projecting portions 114, 114 projecting more outwardly in the diameter direction thereof than the remaining portions of the present outer peripheral edge portion. In other words, the retaining ring 112 has a shape which projects alternately on the outside diameter side and on the inside diameter side of a pitch circle shown by a chained line 112b in FIG. 28, with the chained line as the boundary between them.

In case where the retaining ring 112 having the above shape is bridgingly interposed between the securing stepped portion 35c and securing groove 32 in order that the retaining ring 112 can prevent the spline shaft 17 from slipping out of the spline hole 14, the outwardly projecting portions 114, 114 are engaged with the securing stepped portion 35c and the inwardly projecting portions 113, 113 are engaged with the securing groove 32, respectively. The diameter-direction positions of the outer peripheral edges of the outwardly projecting portions 114, 114 and the diameter-direction positions of the inner peripheral edges of the inwardly projecting portions 113, 113 are both much larger than the diameter of the section of the wire member for forming the retaining ring 112. For this reason, as described above, even in case where the diameter-direction width dimension $W_{35c}$ of the securing stepped portion 35c is increased, the retaining ring 112 can be positively arranged between the securing stepped portion 35c and securing groove 32. Thanks to this, even in case where the dimensions and shapes of the composing parts are not worked with high accuracy, the shaky motion of the spline engaged portion 49b can be prevented. Description will be given below of this point with reference to FIG. 29.

Four round marks, which are shown by solid and chained lines in FIG. 29, respectively show the section of the retaining ring 112. A state shown by the solid lines is a state in which, in the range that can effectively prevent the spline shaft 17 from slipping out of the spline hole 14, the diameter of the retaining ring 112 is smallest. In this state, the side surfaces of the outwardly projecting portions 114 are contacted with the slightly-near-to-outside-diameter portion of the inner peripheral edge portion (that is, the portion that is situated nearer a little to the outside diameter side than the inner peripheral edge) of the securing stepped portion 35c. On the other hand, a state shown by the chained lines is a state in which, in the range that can effectively prevent the spline shaft 17 from slipping out of the spline hole 14, the diameter of the retaining ring 112 is largest. In this state, the side surfaces of the inwardly projecting portions 113 are contacted with the slightly-near-to-inside-diameter portion of the opening peripheral edge portion (that is, the portion that is situated nearer a little to the inside diameter side than the inner peripheral edge) of the securing groove 32.

In case where the diameter-direction positions of the inwardly projecting portions 113, 113 and the outwardly projecting portions 114, 114 exist between the position shown by the solid line in FIG. 29 and the position shown by the chained line in FIG. 29, the spline shaft 17 can be prevented from slipping out of the spline hole 14. And, in a state where the spline shaft 17 is completely pushed into the spline hole 14, in case where not only the outwardly projecting portions 114 are present between the state shown by the solid line and the state shown by the chained line but also the outwardly projecting portions 114 are contacted with the securing stepped portion 35c, the spline engaged portion 49b between the spline hole 14 and spline shaft 17 can be prevented against shaky motion. As can be clearly seen from FIG. 29, the diameter-direction difference δD between the position shown by the solid line in FIG. 29 and the position shown by the chained line in FIG. 29 is much larger than the previously described third embodiment of the invention. Therefore, the diameter-direction width dimension $W_{35c}$ of the securing stepped portion 35c can be increased, which makes it possible to increase the axial-direction tolerance δ L' between the securing stepped portion 35c and securing groove 32 that can be obtained from δ D×sin α. To be able to increase the tolerance δ L' means that, even in case where the dimensions and shapes of the composing parts are not worked with high accuracy, the shaky motion of the spline engaged portion 49b can be prevented.

By the way, in a state where such a retaining ring 112 as shown in FIG. 28 is bridgingly interposed between the securing stepped portion 35c and securing groove 32, in case where there is applied a force going in a direction to pull the spline shaft 17 out of the spline hole 14, a thrust load is applied to the retaining ring 112 in a direction to shift the inwardly projecting portions 113, 113 and the outwardly projecting portions 114, 114 in the axial direction. The thus-applied thrust load causes the retaining ring 112 to incline slightly from the state shown in FIG. 29; however, since the thrust load applied during the driving of the car is not so large, there can be raised no practical problem. Also, in case where the pitch of the corrugated shape of the retaining ring 112 is reduced to thereby increase the number of the inwardly projecting portions 113, 113 and the outwardly projecting portions 114, 114, a moment load to be applied between the two kinds of projecting portions 113 and 114 can be reduced and thus the elastic deformation amount of the retaining ring 112 can be controlled down to a small amount.

Figure 31:
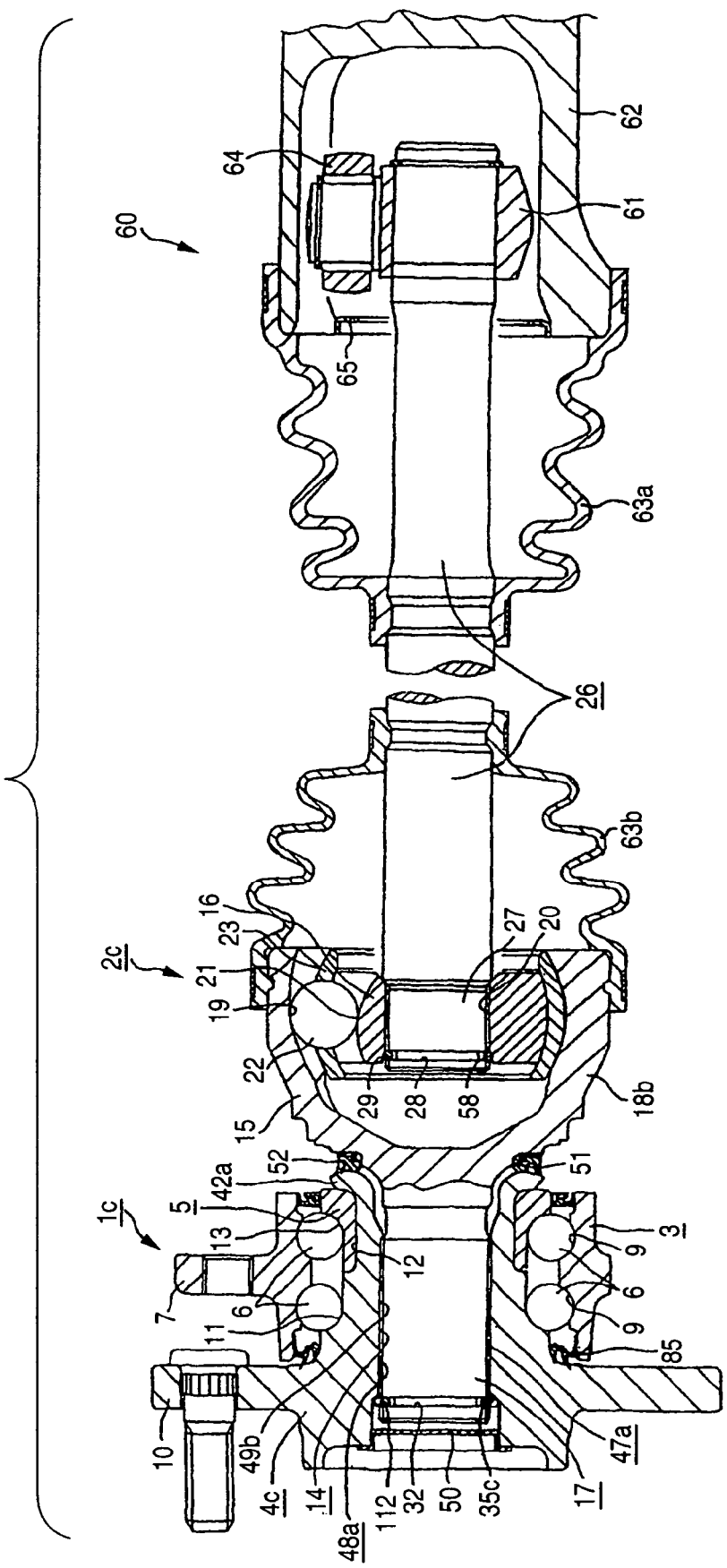
FIG. 31 is a section view of a wheel-supporting unit, showing a state thereof in which it is combined with a constant velocity joint unit.

The above-structured wheel-driving bearing unit according to the present embodiment is incorporated into the car as a wheel-driving unit as shown in FIG. 31. That is, the output portion of a tripod-type constant velocity joint 60, which is a differential-side constant velocity joint, is combined with the input portion of a wheel-side constant velocity joint 2c through a drive shaft 26. When the present wheel-driving unit is in operation, two-direction thrust loads generated in the tripod-type constant velocity joint 60 portion thereof are transmitted to a drive member 18*b* constituting the wheel-side constant velocity joint 2*c*, whereas no shaky motion can occur in the spline engaged portion 49*b* portion of the wheel-driving bearing unit with the retaining ring 112 incorporated therein.

Figure 32:
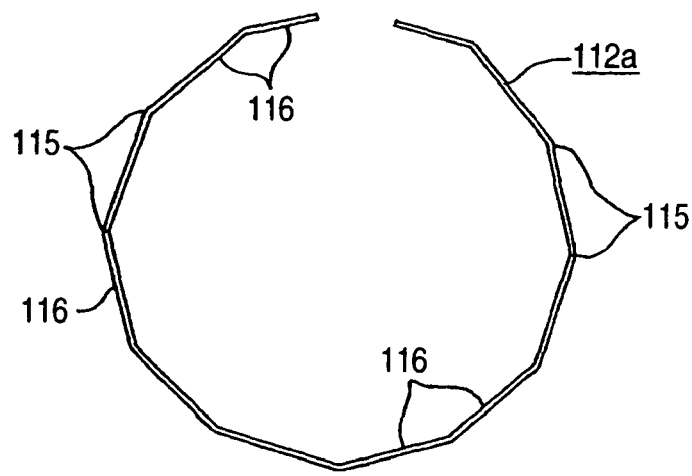
FIG. 32 is similar to FIG. 28, showing a second embodiment of a retaining ring.

By the way, in the above embodiment, description has been given of the case employing the retaining ring 112 the circumferential-direction shape of which provides a corrugated shape. However, as a retaining ring which is used to constitute a wheel-driving bearing unit according to the present embodiment, there can also be used a polygonal-shaped retaining ring 112*a* in which, as shown in FIG. 32, bent portions 115, 115 and straight line portions 116, 116 are arranged alternately so as to continue with each other in the circumferential direction of the retaining ring 112*a*. In the case of the thus-arranged polygonal-shaped retaining ring 112*a*, the bent portions 115, 115 function as outwardly projecting portions, while the straight line portions 116, 116 function as inwardly projecting portions.

Figure 33:
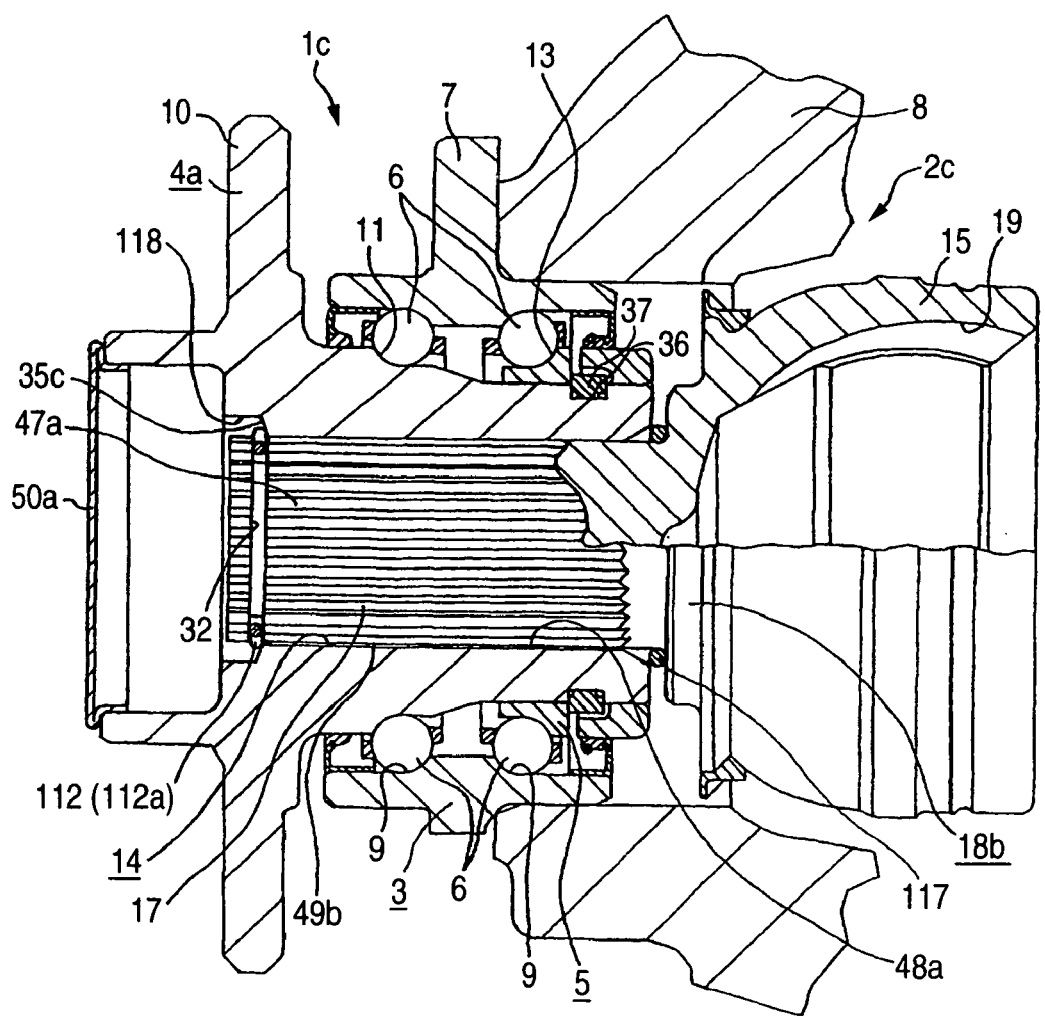
FIG. 33 is a section view of a tenth embodiment of a wheel-driving unit according to the invention.

Next, FIG. 33 shows a tenth embodiment of a wheel-driving unit according to the sixth aspect of the invention. In the case of the present embodiment, there is shown an embodiment in which the invention is applied based on the second example of the conventional structure previously shown in FIG. 40. Accordingly, description will be given below of the portions of the present embodiment that are different from the structure shown in FIG. 40. The spline teeth of male and female spline portions 47*a* and 48*a* constituting the spline engaged portion 49*b* between the spline hole 14 and spline shaft 17 are composed of taper spline teeth; and, the spline shaft 17 and spline hole 14 are structured such that the former can be inserted into the latter with a light force and thus, in the leading end face of the spline shaft 17, there is not formed such securing portion 31 as in the conventional structure shown in FIG. 40. Also, a cap 50*a* is disposed on the outer end portion of a hub 4*a* to thereby close the outer end opening of the hub 4*a* and a member to be interposed between the inner end face of the hub 4*a* and the outer end face of an outer ring for a constant velocity joint is changed from the elastic ring 34 (FIG. 40) to an O ring 117. And, the O ring 117 and cap 50*a* cooperate together in preventing foreign substances such as rainwater from getting into the spline engaged portion 49*b*.

Also, in order to apply the invention to the structure shown in FIG. 33, in the case of the present embodiment, in the outer end portion of the spline hole 14 formed in the central portion of the hub 4*a*, there is formed a cylindrical surface portion 118 which is larger in diameter than the groove bottom circle of the female spline portion 48*a* formed in the inner peripheral surface of the spline hole 14; and, the cylindrical surface portion 118 and the outer end portion of the female spline portion 48*a* are continuously connected to each other through a securing stepped portion 35*c*. Also, in the portion of the outer end portion of the spline shaft 17 that is matched in position to the securing stepped portion 35*c*, there is formed a securing groove 32 in such a manner that it extends over the entire periphery of such portion. And, between the securing stepped portion 35*c* and securing groove 32, there is bridgingly arranged such a retaining ring 112 as shown in FIG. 28 or such a retaining ring 112*a* as shown in FIG. 32.

In the case of the present embodiment, the basic structure of the wheel-driving bearing unit is similar to the second example of the conventional structure previously shown in FIG. 40; and, the structure of the portion for preventing the spline shaft 17 from slipping out of the spline hole 14 is similar to the previously described ninth embodiment of the invention. Therefore, equivalent parts are given the same designations and thus the duplicate description thereof is omitted here.

Figure 34:
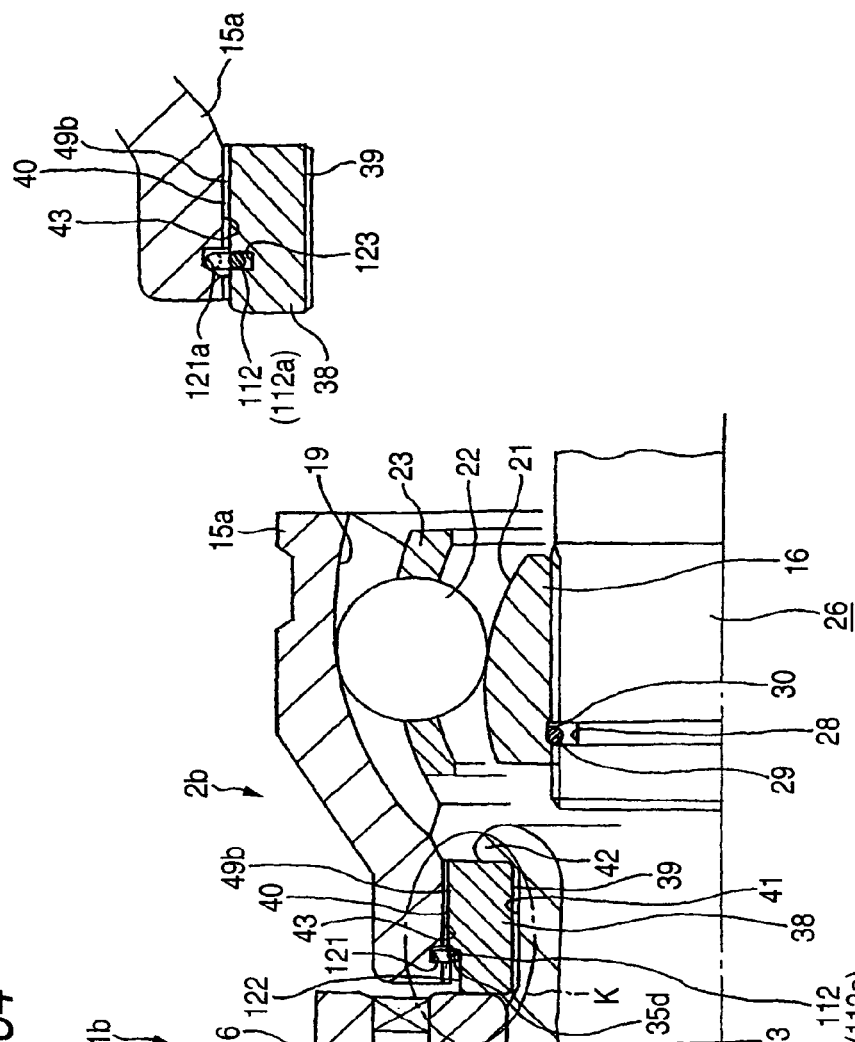
FIG. 34 is a section view of an eleventh embodiment of a wheel-driving unit according to the invention.

Next, FIG. 34 shows an eleventh embodiment of a wheel-driving unit according to the seventh aspect of the invention. In the case of the present embodiment, there is shown an embodiment in which the invention is applied based on the third example of the conventional structure previously shown in FIG. 41. Accordingly, description will be given below of the portions of the present embodiment that are different from the structure shown in FIG. 41. According to the present embodiment, the axial-direction middle portion of a hub 4*b* is closed by a partition wall portion 119 to thereby not only secure the strength of the hub 4*b* but also prevent foreign substances such as rainwater from getting into the inner end side of the hub 4*b* from the outer end side thereof. However, a cap 50*b* is disposed on the outer end portion of the hub 4*b* to thereby prevent mud and small stones from getting into a recessed portion 120 existing in the outer end portion of the hub 4*b*.

Figure 41:
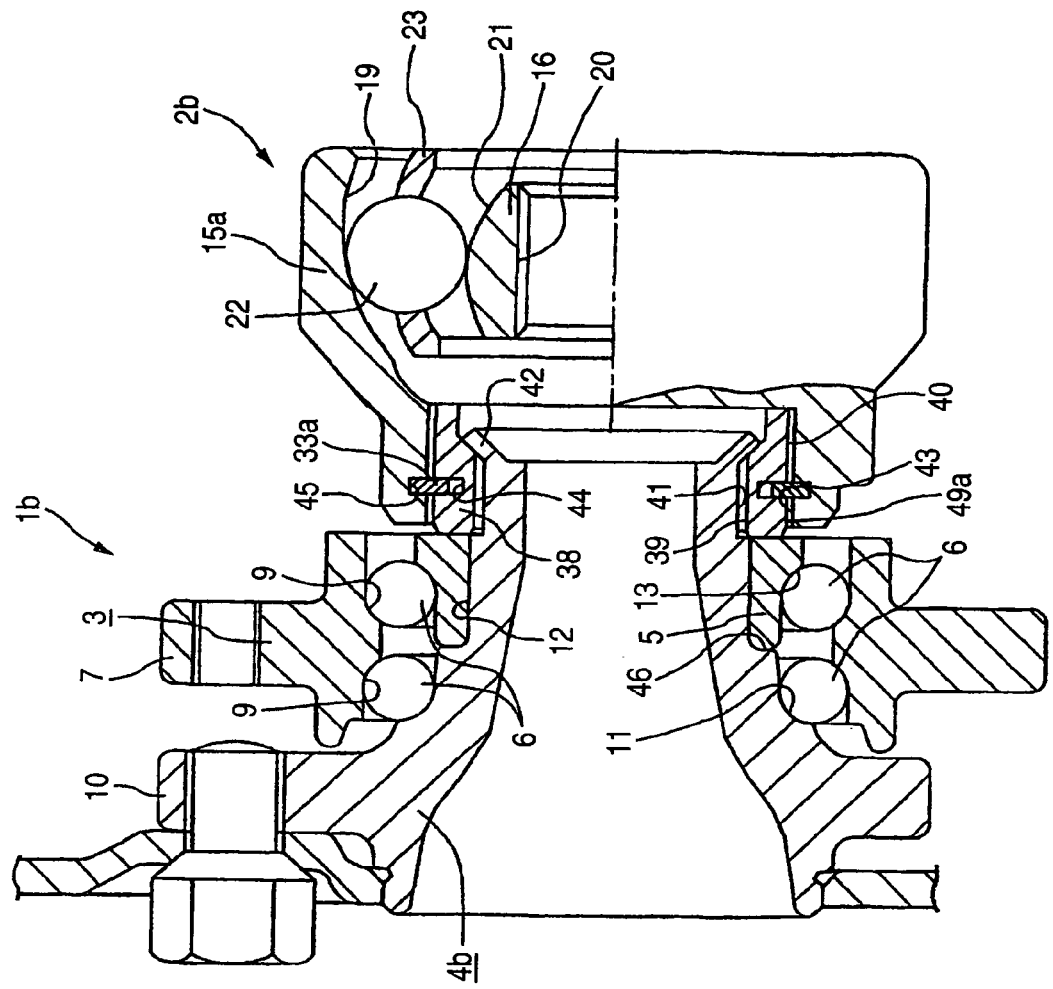

Also, in order to apply the invention to the structure shown in FIG. 41, in the case of the present embodiment, in the inner peripheral surface of the outer end portion of an outer ring 15*a* for a constant velocity joint which constitutes a wheel-side constant velocity joint 2*b* and corresponds to part of a drive member set forth in the appended claims of the present specification, there is formed an outside securing groove 121. This outside securing groove 121 is similar in shape to the outside securing groove 45 employed in the structure shown in FIG. 41. On the other hand, in the outer peripheral surface of the outer end portion of an intermediate seat 38, there is formed a cylindrical surface portion 122 which is smaller in diameter than the root circle of an outside-diameter-side male spline portion 40 formed in the outer peripheral surface of the intermediate seat 38; and, the cylindrical surface portion 122 is continuously connected to the outer end portion of the outside-diameter-side male spline portion 40 through a securing stepped portion 35*d*. And, between the securing stepped portion 35*d* and outside securing groove 121, there is bridgingly interposed such a retaining ring 112 as shown in FIG. 28 or such a retaining ring 112*a* as shown in FIG. 32.

In the case of the present embodiment, the basic structure of a wheel-driving bearing unit is similar to the third example of the conventional structure previously shown in FIG. 41, while the structure of the portion for preventing the outer ring 15*a* for a constant velocity joint and intermediate seat 38 against separation from each other as well as the structure of the spline engaged portion 49*a* are similar to the previously described ninth and tenth embodiments of the invention. Therefore, equivalent parts are given the same designations and thus the duplicate description thereof is omitted here.

Figure 35:
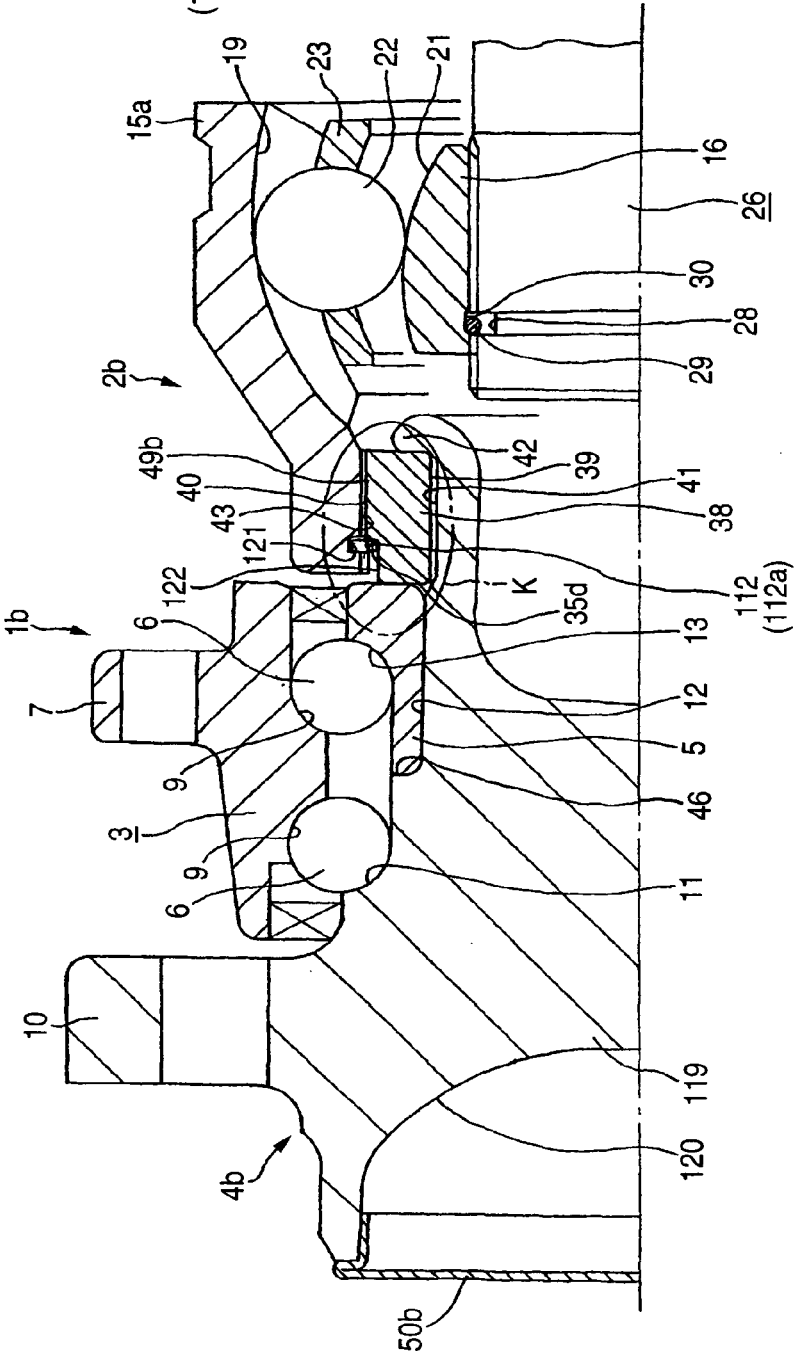
FIG. 35 is a section view of a portion of a twelfth embodiment of a wheel-driving unit according to the invention, while the present portion corresponds to the K portion shown in FIG. 34.

By the way, although not shown, a portion corresponding to the intermediate seat 38 can also be formed integrally with an inner ring 5. Also, a portion, which is formed in the inner peripheral surface of the outer ring 15*a* for a constant velocity joint and corresponds to a second engaging portion set forth in the appended claims of the present specification, as in FIG. 35 showing a twelfth embodiment of a wheel-driving unit according to the invention, can be formed as an outside securing groove 121*a* the axial-direction-outside inner surface of which is formed as an inclined surface; and, a portion, which is formed in the outer peripheral surface of the outer end portion of the intermediate seat 38 and corresponds to a first engaging portion set forth in the appended claims of the present specification, can be formed as an inside securing groove 123.

Figure 36:
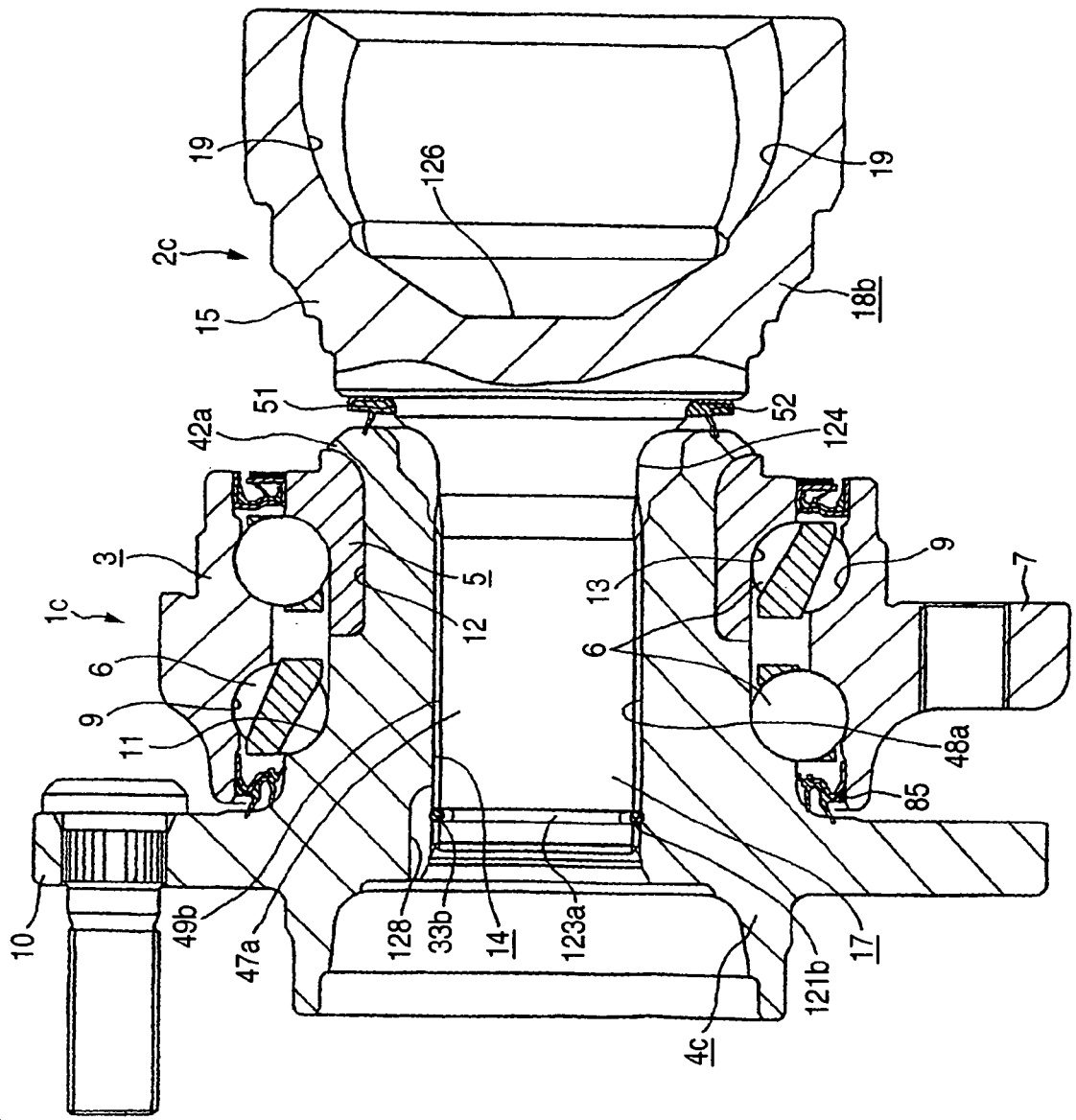
FIG. 36 is a partially omitted section view of a thirteenth embodiment of a wheel-driving unit according to the invention.
Figure 37:
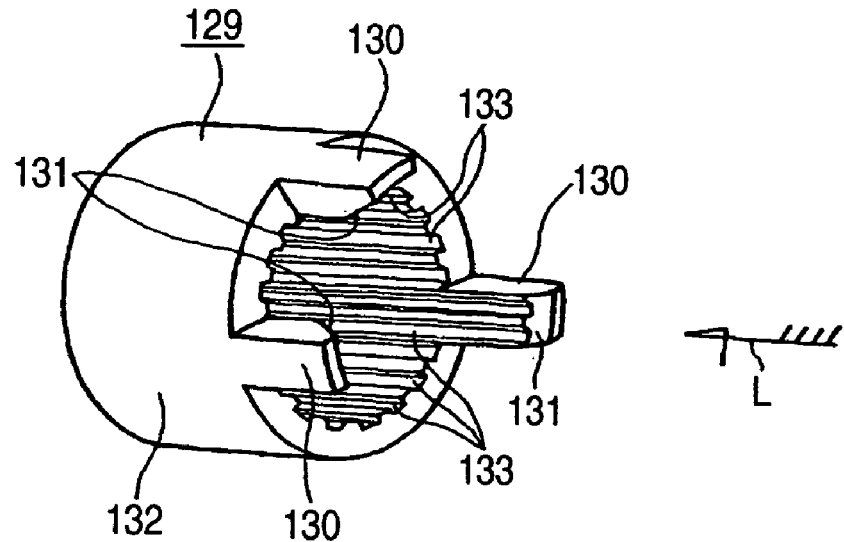
FIG. 37 is a perspective view of a diameter reducing jig.
Figure 38:
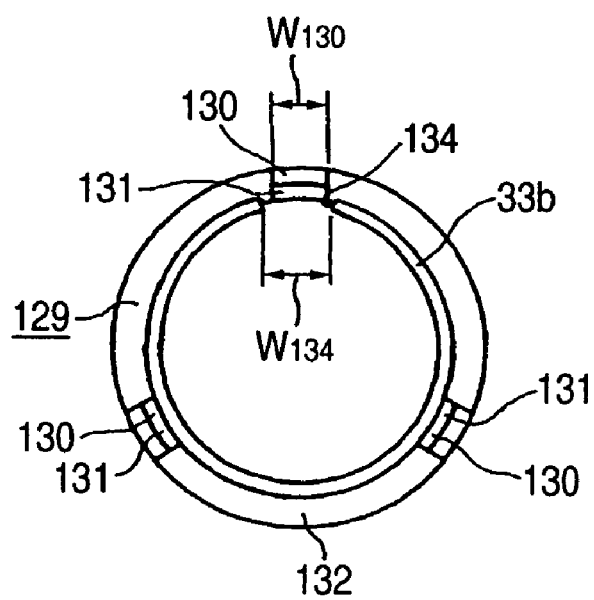
FIG. 38 is a view taken from the direction of the arrow mark L shown in FIG. 37, explaining the reason for regulation of the width dimension of a projecting piece.

Next, FIGS. 36–38 show a thirteenth embodiment of a wheel-driving unit according to the invention, which corresponds to the appended claims 1, 5, 6 and 7. In the case of the present embodiment as well, for example, similarly to the previously described third embodiment of the invention shown in FIGS. 8–13, the circumferential-direction widths of male spline teeth constituting a male spline portion 47a press formed in the outer peripheral surface of a spline shaft 17 vary so as to increase as they go inwardly in the axial direction thereof. Also, the circumferential-direction widths of female spline teeth constituting a female spline portion 48a press formed in the inner peripheral surface of a spline hole 14 vary so as to decrease as they go inwardly in the axial direction thereof. And, in a state where the spline shaft 17 is inserted into the spline hole 14 while the male spline portion 47a is spline engaged with the female spline portion 48a, the circumferential-direction both-side surfaces of the male spline teeth are respectively contacted with the circumferential-direction both-side surfaces of the female spline teeth with no clearance between them.

Especially, in the case of the present embodiment, in the base end portion of the spline shaft 17, there is formed a cylindrical portion 124 which is larger in diameter than the root circle of the complete spline portion of the male spline portion 47a. That is, the base end portion of the spline shaft 17 (the taper shaft 104 of the blank member 103 shown in FIG. 25) prior to formation of the male spline portion 47a provides a shape which can be obtained by extending the portion for formation of the male spline portion 47a as it is (that is, without reducing the diameter thereof). Therefore, in a state after the male spline portion 47a is formed, the outside diameter of the cylindrical portion 124 is smaller than the diameter of the addendum circle of the male spline portion 47a and is larger than the diameter of the above-mentioned root circle.

On the other hand, in the case of the eighth embodiment of the invention previously shown in FIG. 25, in the base end portion of the spline portion 17, there is formed the escape portion 125 (FIG. 25) which is smaller in diameter than the root circle of the complete spline portion of the male spline portion 47a. When the male spline portion 47a is formed in such a structure as shown in FIG. 25, an axial-direction load of the order of 200–250 KN is applied to the spline shaft 17; and, therefore, unless the press working operation is carried out carefully, there is a possibility that the escape portion 125 can buckle and deform. However, in the case of the present embodiment, since the outside diameter of the cylindrical portion 124 is secured, the base end portion of the spline shaft 17 is hard to buckle and deform, thereby being able to enhance the yield of the drive member 18b including the male spline portion 47a.

By the way, in the case of the present embodiment, the press working operation for forming the male spline portion 47a is carried out in two separate steps. Firstly, in the first step, in the outer peripheral surface of a taper shaft of a blank member, there are formed parallel male spline teeth the circumferential-direction both-side surfaces of which are parallel to each other with respect to the axial direction of the taper shaft. Next, in the second step, the parallel male spline teeth are formed as taper male spline teeth the circumferential-direction widths of which decrease as they go toward the outer end portions thereof. This applies similarly to an operation for forming the female spline portion 48a in the inner peripheral surface of the spline hole 14 formed in the central portion of the hub 4c. By the way, when forming the male spline portion 47a by press working, the inner peripheral surface of a die for working the taper male spline teeth is meshingly engaged with the just-formed taper male spline teeth in a wedge-like manner, thereby making it difficult to separate the drive member 18b and die from each other, so that a large pull-out load is required for separation of the two members. For this reason, preferably, there may be used a press working apparatus having large pull-out capability.

Also, in the case of the present embodiment, in the central portion of the deep surface of the outer ring 15 for a constant velocity joint disposed on the inner end portion of the drive member 18b, there is formed a flat surface 126. And, when pushing the taper shaft of the blank member into the die in order to press work the male spline portion 47a, the flat surface 126 can be pressed freely. The flat surface 126 is worked by turning into a plane exactly at right angles to the center axis of the blank member so that, when the blank member is pushed into the die, the blank member can be prevented against shaky motion. That is, when manufacturing the drive member 18b, the respective parts thereof are finished to their respective desired shapes and properties through the steps of: [forging the blank member]; [turning the flat surface 126 (the outer peripheral surface of the taper shaft is left as it is forged but is not turned)]; [pressing the male spline shaft 47a]; [turning the respective parts except for the flat surface 126]; and, [grinding the outside engaging grooves 19, 19 formed in the inner peripheral surface of the outer ring 15 for a constant velocity joint and the inner surface of the retainer].

On the other hand, in the case of the previously described eighth embodiment shown in FIG. 25, in manufacturing the drive member 18b, the respective parts thereof are finished to their respective desired shapes and properties through the steps of: [forging the blank member]; [turning the respective parts thereof (the flat surface 126 is not formed)]; [pressing the male spline shaft 47a]; [turning the outer peripheral surface of the leading end portion of the spline shaft 17 to thereby form the securing groove 32]; and, [grinding the outside engaging grooves 19, 19 formed in the inner peripheral surface of the outer ring 15 for a constant velocity joint and the inner surface of the retainer]. In the case of the eighth embodiment, when press working the male spline shaft 47a, the inner end face 127 of the outer ring 15 for a constant velocity joint is strongly pushed by the push-in jig 105 (see FIG. 25). However, since the inner end portion of the outer ring 15 for a constant velocity joint is small in thickness, in case where a large load is applied to the outer ring 15 by the push-in jig 105, there is a possibility that the inner end portion of the outer ring 15 can be plastically deformed. Therefore, the thickness of the inner end portion of the outer ring 15 provides a limit to the workability of the male spline portion 47a, thereby raising a possibility that the drive member 18b according to the eighth embodiment cannot be reduced in weight to a sufficient degree. On the other hand, in the case of the present embodiment, there is eliminated such limit and thus the drive member 18b including the outer ring 15 for a constant velocity joint can be reduced in weight.

Further, in the case of the present embodiment, in order to be able to facilitate the separation of the wheel-supporting bearing unit 1c and wheel-side constant velocity joint 2c from each other for check and repair thereof, the retaining ring 33b for connecting them together is structured such that the diameter thereof can be reduced easily. That is, in the case of the present embodiment, the retaining ring 30a is bridgingly interposed between an outside securing groove 121b formed in the near-to-outer-end portion of the inner peripheral surface of the spline hole 14 and an inside securing groove 123a formed in the near-to-outer-end portion of the spline shaft 17. Therefore, in a state where the retaining ring 33b is arranged between the two securing grooves 121b, 123a, the axial-direction position relationship between the two members 1c, 2c can be determined just uniquely. The operation for such arrangement of the retaining ring 33b between the two securing grooves 121b, 123a, similarly to the previously described respective embodiments, can be carried out automatically; however, special consideration must be given in order to be able to reduce the diameter of the retaining ring 33b for dismantlement.

For this purpose, in a plurality portions (in the illustrated embodiment, three portions) in the circumferential direction of the inner peripheral surface of the outer end portion of the spline hole 14, there are formed recessed grooves 128 which are respectively recessed outwardly in the diameter direction of the spline hole 14. Accordingly, when reducing the diameter of the retaining ring 33b for dismantlement, projecting pieces 130, 130 of a diameter reducing jig 129 shown in FIG. 37 are respectively inserted into their associated recessed grooves 128. In the inner peripheral side surfaces of the leading end portions of the respective projecting pieces 130, 130, there are formed guide inclined surfaces 131, 131 which are inclined in a direction to go outwardly in the diameter direction as they go toward the leading end portions thereof. Also, in the projecting pieces 130, 130 and in the inner peripheral surface of a cylindrical-shaped base portion 132, there are formed recessed grooves 133, 133 which extend along the axial direction thereof and are used to prevent interference with the male spline teeth existing in the outer peripheral surface of the spline shaft 17. In case where the projecting pieces 130, 130 of the diameter reducing jig 129 are inserted into their respective recessed grooves 128 and the plurality of portions of the outer-peripheral edge of the retaining ring 33b are pressed inwardly in the diameter direction thereof by the guide inclined surfaces 131, 131, the diameter of the retaining ring 33b can be reduced and thus the retaining ring 33b can be pulled out from the outside securing groove 121b inwardly in the diameter direction thereof. In this state, in case where the spline shaft 17 is removed from the spline hole 14, the wheel-supporting bearing unit 1c and wheel-side constant velocity joint 2c can be dismantled.

By the way, the circumferential-direction width $W_{130}$ of the projecting pieces 130, 130 is set larger than the circumferential-direction width $W_{134}$ of the discontinuous portion 134 (in a state where the retaining ring 33b is mounted on the outside securing groove 121b) of the retaining ring 33b ($W_{130} > W_{134}$). The reason for this is that, in case where, as shown in FIG. 37, $W_{134}$ is smaller than $W_{130}$, any one of the projecting pieces 130 can be inserted into the discontinuous portion 134; and, as a result of this, there arises a possibility that, even in case where the projecting pieces 130, 130 are pushed further into their respective recessed grooves 128, the diameter of the retaining ring 33b cannot be reduced.

INDUSTRIAL APPLICABILITY

Since the present invention is structured and operates in the above-mentioned manner, it not only can facilitate the assembling operation to thereby reduce the manufacturing cost thereof but also can prevent generation of teeth striking sounds which jar the nerves of an occupant.

What is claimed is:

1. A wheel-driving unit comprising a wheel-supporting bearing unit and a constant velocity joint unit connected together through a retaining ring,
   said wheel-supporting bearing unit comprising:
   an outer ring including a double row of outer raceways formed in the inner peripheral surface thereof and unrotatable even when it is in use;
   a hub including a flange for supporting wheels in the near-to outer-end portion of the outer peripheral surface thereof, and a first inner raceway formed directly or through a separately disposed inner ring in the middle portion thereof, with the inner ring including a second inner raceway formed in the outer peripheral surface thereof being fitted with and fixed to the outer surface of the near-to-inner-end portion of the outer peripheral surface of said hub;
   rolling elements rollably interposed between one of said outer raceways and said first inner raceway as well as between the other of said outer raceways and said second inner raceway respectively by twos or more; and
   a first spline portion formed in said hub or in a portion of a peripheral surface of a member connected to and fixed to said hub,
   said constant velocity joint unit comprising a differential-side constant velocity joint and a wheel-side constant velocity joint respectively connected to both end portions of a drive shaft, said constant velocity joint unit further comprising a drive member including, in the outer end portion thereof, a second spline portion to be spline engaged with said first spline portion and also having an inner end portion formed as an outer ring for the constant velocity joint constituting said wheel-side constant velocity joint, and
   said retaining ring applying an axial force between said first and second spline portions, wherein said retaining ring is resilient and is shaped as an incomplete circular ring,
   said retaining ring being bridgingly interposable between a first engaging portion formed in said hub or in a portion of the peripheral surface of a member connected and fixed to said hub and a second engaging portion formed in a portion of the peripheral surface of the outer end portion of said drive member to thereby prevent removal of the engagement between said first and second spline portions,
   wherein the circumferential-direction widths of at least part of a plurality of teeth constituting at least one of said first and second spline portions are varied gradually in the axial direction of said at least one spline portion, whereby, as said second spline portion is inserted into said first spline portion, said teeth bite into the groove portions of its mating spline portion in a wedge-like manner with no circumferential clearance due to the axial force applied by said retaining ring.

* * * * *